(12) United States Patent
Inoue et al.

(10) Patent No.: US 10,611,876 B2
(45) Date of Patent: Apr. 7, 2020

(54) EPOXY-AMINE ADDUCT, THERMOPLASTIC RESIN COMPOSITION, SIZING AGENT, SIZING AGENT COATED CARBON FIBER, AND FIBER-REINFORCED COMPOSITE MATERIAL

(71) Applicant: DAICEL CORPORATION, Osaka-shi, Osaka (JP)

(72) Inventors: Hiroko Inoue, Ohtake (JP); Hiroto Tanigawa, Ohtake (JP); Masanori Sakane, Ohtake (JP); Toshihiko Nijukken, Myoko (JP); Tomio Ozaki, Myoko (JP); Tomoyuki Ono, Myoko (JP); Hiroshi Sakurai, Matsuyama (JP); Hiroshi Kimura, Matsuyama (JP); Takeshi Naito, Matsuyama (JP)

(73) Assignee: DAICEL CORPORATION, Osaka-Shi (JP)

( * ) Notice: Subject to any disclaimer, the term of this patent is extended or adjusted under 35 U.S.C. 154(b) by 104 days.

(21) Appl. No.: 15/301,654

(22) PCT Filed: Dec. 16, 2014

(86) PCT No.: PCT/JP2014/083288
§ 371 (c)(1),
(2) Date: Oct. 3, 2016

(87) PCT Pub. No.: WO2015/151348
PCT Pub. Date: Oct. 8, 2015

(65) Prior Publication Data
US 2017/0029557 A1    Feb. 2, 2017

(30) Foreign Application Priority Data

Apr. 4, 2014 (JP) .................. 2014-078091
Apr. 4, 2014 (JP) .................. 2014-078092
(Continued)

(51) Int. Cl.
*C08G 59/50* (2006.01)
*C08J 5/24* (2006.01)
(Continued)

(52) U.S. Cl.
CPC ......... *C08G 59/50* (2013.01); *C08G 59/1477* (2013.01); *C08J 5/042* (2013.01);
(Continued)

(58) Field of Classification Search
CPC ...... C08G 59/50; C08G 59/1477; C08J 5/042; C08J 5/06; C08J 5/24; C08J 2377/02;
(Continued)

(56) References Cited

U.S. PATENT DOCUMENTS 4,304,700 A * 12/1981 Shimp .................. C08G 59/184
428/418
4,761,337 A * 8/1988 Guagliardo .......... C09D 5/4473
428/425.8
(Continued)

FOREIGN PATENT DOCUMENTS

EP    2365015 A1    9/2011
JP    47-39396    12/1972
(Continued)

OTHER PUBLICATIONS

International Search Report issued in PCT/JP2014/083288, dated Jan. 27, 2015.
(Continued)

*Primary Examiner* — David T Karst
(74) *Attorney, Agent, or Firm* — Birch, Stewart, Kolasch & Birch, LLP

(57) ABSTRACT

Provided is an epoxy-amine adduct. The epoxy-amine adduct is a compound that may be a compound I containing two or more amino groups per molecule, a compound
(Continued)

corresponding to the compound I, except being modified with a compound II-1 containing two or more (meth)acryloyl groups per molecule, a compound corresponding to the compound I, except being modified with a lactone II-2, or a salt of the compound I. The compound I is an adduct between an epoxide (A) containing two or more cycloaliphatic epoxy groups per molecule and an amine (B) containing two or more amino groups per molecule. The compound I includes a constitutional unit represented by Formula (I) and a constitutional unit represented by Formula (II) and contains amino groups at both ends. Formulae (I) and (II) are expressed as follows:

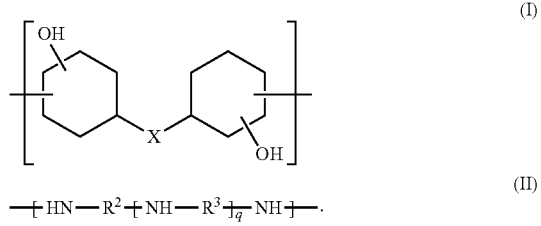

30 Claims, 19 Drawing Sheets

(30) Foreign Application Priority Data

| Apr. 4, 2014 | (JP) | 2014-078093 |
| Apr. 4, 2014 | (JP) | 2014-078094 |
| Apr. 4, 2014 | (JP) | 2014-078095 |
| Oct. 6, 2014 | (JP) | 2014-205845 |

(51) Int. Cl.
| D06M 15/564 | (2006.01) |
| C09D 175/16 | (2006.01) |
| C08J 5/06 | (2006.01) |
| C08G 59/14 | (2006.01) |
| C08J 5/04 | (2006.01) |
| C08L 63/00 | (2006.01) |
| C09D 163/00 | (2006.01) |
| D06M 15/55 | (2006.01) |
| D06M 101/40 | (2006.01) |

(52) U.S. Cl.
CPC . *C08J 5/06* (2013.01); *C08J 5/24* (2013.01); *C08L 63/00* (2013.01); *C09D 163/00* (2013.01); *C09D 175/16* (2013.01); *D06M 15/55* (2013.01); *D06M 15/564* (2013.01); *C08J 2363/00* (2013.01); *C08J 2377/02* (2013.01); *D06M 2101/40* (2013.01); *D06M 2200/40* (2013.01)

(58) Field of Classification Search
CPC .... C08J 2363/00; C08L 63/00; C09D 163/00; C09D 175/16; D06M 15/55; D06M 15/564; D06M 2101/40; D06M 2200/40
USPC .......................................................... 523/402
See application file for complete search history.

(56) References Cited

U.S. PATENT DOCUMENTS

| 9,388,294 | B2 | 7/2016 | Sakane | |
| 2007/0244268 | A1* | 10/2007 | Usui | ...................... C08G 59/18 525/524 |
| 2012/0259040 | A1* | 10/2012 | Schroetz | .............. C08G 59/184 523/400 |
| 2015/0111994 | A1 | 4/2015 | Sakane | |
| 2015/0152259 | A1 | 6/2015 | Sakane | |

FOREIGN PATENT DOCUMENTS

| JP | S56-034767 A | 4/1981 |
| JP | 56-155222 A | 12/1981 |
| JP | 57-100127 A | 6/1982 |
| JP | 61-228018 A | 10/1986 |
| WO | WO 95/18167 A1 | 7/1995 |
| WO | WO 2009/079643 A2 | 6/2009 |
| WO | WO 2013/172199 A1 | 11/2013 |
| WO | WO 2013/172200 A1 | 11/2013 |

OTHER PUBLICATIONS

Written Opinion of the International Searching Authority issued in PCT/JP2014/083288 (PCT/ISA/237), dated Jan. 27, 2015.
Extended European Search Report issued in European Application No. 14888315.0 dated Feb. 27, 2017.
Taiwanese Office Action for Application No. 103144038, dated May 16, 2018, with English language translation.

* cited by examiner

EPOXY-AMINE ADDUCT, THERMOPLASTIC RESIN COMPOSITION, SIZING AGENT, SIZING AGENT COATED CARBON FIBER, AND FIBER-REINFORCED COMPOSITE MATERIAL

TECHNICAL FIELD

The present invention relates to: epoxy-amine adducts, thermoplastic resin compositions including the epoxy-amine adducts, and fiber-reinforced composites (fiber-reinforced composite materials) formed from prepregs which are obtained by impregnating or coating reinforcement fibers with the thermoplastic resin compositions. The present invention also relates typically to: sizing agents including the epoxy-amine adducts, sizing-agent-coated carbon fibers obtained by coating carbon fibers with the sizing agents, and fiber-reinforced composites including the sizing-agent-coated carbon fibers. This application claims priority to Japanese Patent Application No. 2014-078091 filed Apr. 4, 2014 to Japan, to Japanese Patent Application No. 2014-078092 filed Apr. 4, 2014 to Japan, to Japanese Patent Application No. 2014-078093 filed Apr. 4, 2014 to Japan, to Japanese Patent Application No. 2014-078094 filed Apr. 4, 2014 to Japan, to Japanese Patent Application No. 2014-078095 filed Apr. 4, 2014 to Japan, and to Japanese Patent Application No. 2014-205845 filed Oct. 6, 2014 to Japan, the entire contents of each of which are incorporated herein by reference.

BACKGROUND ART

Epoxy-amine adducts, also called "amine adducts", have been known, where the amine adducts are formed by reacting an amine and an epoxide with each other. Patent Literature (PTL) 1 and PTL 2 disclose, as examples of the amine adducts, an adduct prepared by reacting a glycidyl-containing epoxy resin with a dialkylamine; and a neutralized product of the adduct, where the neutralized product is obtained by pulverizing the adduct, and subjecting the pulverized product to a surface treatment with an acidic substance. PTL 3 discloses an epoxy-amine adduct obtained typically by reacting an amino compound and an epoxy resin in specific proportions, where the amino compound contains an amino group and a N,N-dialkylamino group, and the epoxy resin contains an average of more than one glycidyl group per molecule.

CITATION LIST

Patent Literature

PTL 1: Japanese Unexamined Patent Application Publication (JP-A) No. S56-155222
PTL 2: JP-A No. S57-100127
PTL 3: JP-A No. S61-228018

SUMMARY OF INVENTION

Technical Problem

PTL 1, PTL 2, and PTL 3 describe the uses of the amine adducts as curing agents (latent curing agents) for epoxy resins. However, the amine adducts are expected to be applied to other various uses, in addition to the curing agent use. This is because the amine adducts can offer various properties by the choice of starting materials amine and epoxide. Specifically, while making use of their reactivity, the amine adducts are expected to be used typically as adhesion improvers for use in polymer composites such as fiber-reinforced composites and nanocomposites. The fiber-reinforced composites are composite materials each including a resin and reinforcement fibers such as carbon fibers. The nanocomposites each include a resin and a nano-sized filler dispersed in the resin, where the nano-sized filler is exemplified by talc, kaolin, and layered silicate. The adhesion improvers improve adhesion between a resin and an additive material such as reinforcement fibers and fillers. The amine adducts are also expected to be used typically as adhesives, paints (coating materials), and adhesiveness improvers. The adhesiveness improvers are used in such adhesives and paints so as to improve adhesiveness to adherends.

However, the amine adducts disclosed in PTL 1, PTL 2, and PTL 3 do not have sufficient reactivity, because they have no active hydrogen such as a hydrogen atom directly bonded to a nitrogen atom, or have, if any, an active hydrogen that is masked by any of various compounds such as inorganic acids, organic acids, and phenols. The disclosed amine adducts, when used typically as adhesion improvers in polymer composites, hardly offer better adhesion between the resin and the additive material sufficiently effectively.

The amine adducts are required to be easily blended with other materials (e.g., thermoplastic resins, and curable resins such as epoxides) on the assumption that the amine adducts are used as additives for such other materials. However, adducts between polyamines and glycidyl-containing epoxides (e.g., bisphenol-A diglycidyl ether), which adducts are conventionally known amine adducts, are hardly blendable with other materials uniformly, because the adducts have a crosslinked structure and do not soften or melt even by heating.

In addition, the amine adducts, when used as intact typically as adhesives or sizing agents, are required to be tough (tenacious) so as to offer excellent adhesiveness or sufficient compactness. The amine adducts, if being brittle by themselves, may disadvantageously fail to offer desired properties typically as adhesives, or may disintegrate into fragments which cause contamination. Such brittle amine adducts, when used as additives, may cause polymer composites to be inferior in properties such as mechanical properties.

The amine adducts preferably have excellent solubility in water (water solubility) so as to be usable in the form of aqueous solutions or water dispersions. This is preferred from the viewpoints typically of environmental protection and working environment safety. The amine adducts, typically when having excellent water solubility, are applicable to water-based paints (water-soluble paints) and other products including, as a medium, water or a solvent mainly containing water. In addition, the amine adducts are required to have such excellent heat resistance as to endure upon processing of the polymer composites at high temperatures and are required to have a somewhat high glass transition temperature (e.g., a glass transition temperature of equal to or higher than room temperature) so as to eliminate or minimize contamination by deposition typically on processing devices.

Accordingly, the present invention has an object to provide a compound (epoxy-amine adduct) that can improve adhesion between a resin and an additive material (such as reinforcement fibers) in polymer composites (such as fiber-reinforced composites) and is easily blendable with another component such as the resin.

The present invention has another object to provide the compound (epoxy-amine adduct) that has at least one property selected from high reactivity, excellent heat resistance, excellent water solubility, a somewhat high glass transition temperature, and excellent toughness.

The present invention has yet another object to provide a thermoplastic resin composition that has high reactivity and can form a polymer composite including a thermoplastic resin and an additive material with excellent adhesion between them.

The present invention has still another object to provide a sizing agent that allows carbon fibers to have better processability in higher order processing and to offer better adhesiveness to a matrix resin.

The present invention has another object to provide a sizing-agent-coated carbon fiber and a fiber-reinforced composite including the sizing-agent-coated carbon fiber, where the sizing-agent-coated carbon fiber has excellent processability in higher order processing and includes a carbon fiber and a matrix resin with excellent adhesiveness between them.

The present invention has another object to provide a water-dispersed resin composition and a method for producing the water-dispersed resin composition, where the water-dispersed resin composition contributes to better adhesion between a thermoplastic resin and reinforcement fibers in fiber-reinforced composites and is useful particularly as a sizing agent.

The present invention has another object to provide a prepreg capable of forming a fiber-reinforced composite that includes a thermoplastic resin and reinforcement fibers with excellent adhesion between them.

In addition, the present invention has another object to provide a fiber-reinforced composite that includes a thermoplastic resin and reinforcement fibers with excellent adhesion between them and has high mechanical properties (such as toughness).

Solution to Problem

After intensive investigations to achieve the objects, the inventors of the present invention have found a group of compounds having a structure derived from an epoxy-amine adduct in common, where the epoxy-amine adduct is obtained by reacting a specific epoxide and a specific amine. The inventors have found that the group of compounds contributes to better adhesion between a resin and additive material (such as reinforcement fibers) and is easily blendable with another component such as the resin, in polymer composites (such as fiber-reinforced composites). The present invention has been made based on these findings.

Specifically, the present invention relates to followings.

(1) The present invention relates to an epoxy-amine adduct which is a compound selected from the group consisting of a compound I containing two or more amino groups per molecule, a compound corresponding to the compound I, except being modified with a compound II-1 containing two or more (meth)acryloyl groups per molecule, a compound corresponding to the compound I, except being modified with a lactone II-2, and a salt of the compound I.

The compound I is an adduct between an epoxide (A) and an amine (B). The epoxide (A) contains two or more cycloaliphatic epoxy groups per molecule, and the amine (B) contains two or more amino groups per molecule. The compound I includes a constitutional unit represented by Formula (I) and a constitutional unit represented by Formula (II) and contains amino groups at both ends. Formulae (I) and (II) are expressed as follows:

[Chem. 1]

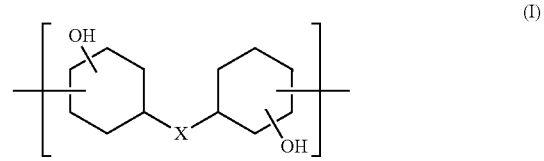

where X is selected from the group consisting of a single bond and a divalent group containing one or more atoms,

[Chem. 2]

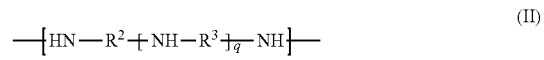

where $R^2$ and $R^3$ are, identically or differently in each occurrence, selected from the group consisting of a linear, branched, or cyclic divalent aliphatic hydrocarbon group, and a divalent group including a linear or branched aliphatic hydrocarbon group or groups and an alicyclic hydrocarbon group or groups linked to each other directly or through a heteroatom-containing linkage group; and q represents an integer of 0 or more.

(2) In the epoxy-amine adduct according to (1), the compound I may further include at least one constitutional unit selected from the group consisting of constitutional units represented by Formula (III) and constitutional units represented by Formula (IV). Formulae (III) and (IV) are expressed as follows:

[Chem. 3]

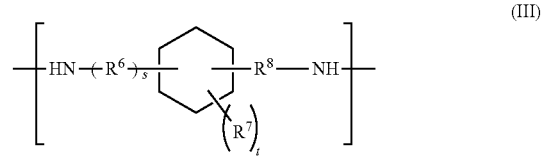

where $R^6$ and $R^8$ are, identically or differently in each occurrence, selected from the group consisting of $C_1$-$C_4$ alkylene and $C_6$-$C_{12}$ arylene; s represents 0 or 1; $R^7$ is, independently in each occurrence, selected from the group consisting of a monovalent organic group, an oxygen-containing group, a sulfur-containing group, a nitrogen-containing group, and halogen; and t represents an integer of 0 to 10,

[Chem. 4]

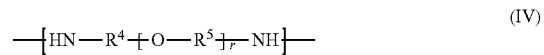

where $R^4$ and $R^5$ are, identically or differently in each occurrence, selected from the group consisting of a linear, branched, or cyclic divalent aliphatic hydrocarbon group, and a divalent group including a linear or branched aliphatic hydrocarbon group or groups and an alicyclic hydrocarbon group or groups linked to each other; and r represents an integer of 1 or more.

(3) In the epoxy-amine adduct according to one of (1) and (2), the ratio (cycloaliphatic epoxy to amino ratio) (equivalence ratio) of the cycloaliphatic epoxy groups of the epoxide (A) to the amino groups of the amine (B) to be reacted may be 0.05 to 1.00.

(4) In the epoxy-amine adduct according to any one of (1) to (3), the compound I may contain 1 to 200 —NH— groups per molecule.

(5) In the epoxy-amine adduct according to any one of (1) to (4), the compound I may have a number-average molecular weight of 200 to 40000.

(6) In the epoxy-amine adduct according to any one of (1) to (5), the compound I may have a glass transition temperature (Tg) of −50° C. to 200° C.

(7) In the epoxy-amine adduct according to any one of (1) to (6), the compound I may have a 5% weight loss temperature ($Td_5$) of 280° C. or higher.

(8) The epoxy-amine adduct according to any one of (1) to (7) may be such that the epoxy-amine adduct is the compound corresponding to the compound I containing two or more amino groups per molecule, except being modified with the compound II-1 containing two or more (meth)acryloyl groups per molecule and is an adduct between the compound I and the compound I-II, where the compound II-1 includes a multifunctional urethane (meth)acrylate.

(9) In the epoxy-amine adduct according to (8), the multifunctional urethane (meth)acrylate may have a weight-average molecular weight (Mw) of 500 to 10000.

(10) In the epoxy-amine adduct according to one of (8) and (9), the multifunctional urethane (meth)acrylate may have a glass transition temperature (Tg) of −70° C. to 30° C.

(11) In the epoxy-amine adduct according to any one of (8) to (10), the ratio (acryloyl and methacryloyl to amino ratio) (equivalence ratio) of (meth)acryloyl groups (acryloyl groups and methacryloyl groups) of the multifunctional urethane (meth)acrylate to the amino groups (—$NH_2$) of the compound I to be reacted may be 0.05 to 1.00.

(12) The epoxy-amine adduct according to any one of (8) to (11) may contain 2 to 10 amino groups (—$NH_2$).

(13) The epoxy-amine adduct according to any one of (8) to (12) may contain 1 to 200 —NH— groups per molecule.

(14) The epoxy-amine adduct according to any one of (8) to (13) may have a number-average molecular weight of 600 to 80000.

(15) The epoxy-amine adduct according to any one of (8) to (14) may have a glass transition temperature (Tg) of −50° C. to 150° C.

(16) The epoxy-amine adduct according to any one of (8) to (15) may have a 5% weight loss temperature ($Td_s$) of 280° C. or higher.

(17) The epoxy-amine adduct according to any one of (1) to (7) may be the compound corresponding to the compound I containing two or more amino groups per molecule, except being modified with the lactone II-2 and is a ring-opening adduct of the lactone II-2 to the compound I.

(18) In the epoxy-amine adduct according to (17), the compound I may contain 2 to 200 hydroxy groups.

(19) In the epoxy-amine adduct according to one of (17) and (18), the proportions of the compound I and the lactone II-2 to be reacted may be such that the proportion of the lactone II-2 is 1 to 300 moles per mole of the amino groups of the compound I.

(20) In the epoxy-amine adduct according to any one of (17) to (19), the amount of the lactone II-2 to be reacted may be 3 to 200 parts by weight per 100 parts by weight of the compound I.

(21) The epoxy-amine adduct according to any one of (17) to (20) may contain 1 to 200 —NH— groups per molecule.

(22) The epoxy-amine adduct according to any one of (17) to (21) may have a number-average molecular weight of 600 to 80000.

(23) The epoxy-amine adduct according to any one of (17) to (22) may have a glass transition temperature (Tg) of −50° C. to 150° C.

(24) The epoxy-amine adduct according to any one of (17) to (23) may have a 5% weight loss temperature (TdO of 280° C. or higher.

(25) The epoxy-amine adduct according to any one of (1) to (7) may be the salt of the compound I containing two or more amino groups per molecule and may be a salt of the compound I with an acid II-3.

(26) The epoxy-amine adduct according to (25) may be selected from the group consisting of a carbonate and an organic acid salt.

(27) In the epoxy-amine adduct according to any one of (1) to (26), the amine (B), which is a starting material to form the compound I, may include an amine (B1) in a proportion of 10 weight percent or more based on the total weight (100 weight percent) of the amine (B), where the amine (B1) gives the constitutional unit represented by Formula (II).

(28) In the epoxy-amine adduct according to any one of (2) to (27), the amine (B), which is a starting material to form the compound I, may include an amine (B3) in a proportion of 10 to 70 weight percent based on the total weight (100 weight percent) of the amine (B), where the amine (B3) gives the constitutional unit represented by Formula (III).

(29) In the epoxy-amine adduct according to any one of (1) to (28), the epoxide (A), which is a starting material to form the compound I, may include a compound represented by Formula (a) in a proportion of 80 weight percent or more based on the total weight (100 weight percent) of the epoxide (A), where the compound represented by Formula (a) gives the constitutional unit represented by Formula (I).

(30) The present invention also relates to a thermoplastic resin composition including the epoxy-amine adduct according to any one of (1) to (29) and a thermoplastic resin.

(31) The thermoplastic resin composition according to (30) may be a resin composition for fiber-reinforced composites.

(32) The present invention also relates to a water-based paint including the epoxy-amine adduct according to any one of (1) to (29).

(33) The present invention also relates to an aqueous solution containing the epoxy adduct according to any one of (1) to (29).

(34) The present invention also relates to a water-dispersed resin composition including the epoxy adduct according to any one of (1) to (29) and a urethane resin.

(35) The water-dispersed resin composition according to (34) may contain the epoxy-amine adduct in a content (blending amount) of 0.1 to 98 weight percent based on the total weight (100 weight percent) of non-volatile contents in the water-dispersed resin composition.

(36) The water-dispersed resin composition according to one of (34) and (35) may contain the urethane resin in a content (blending amount) of 0.1 to 98 weight percent based on the total weight (100 weight percent) of non-volatile contents in the water-dispersed resin composition.

(37) In the water-dispersed resin composition according to any one of (34) to (36), the ratio (weight ratio; non-volatile contents) of the epoxy-amine adduct to the urethane resin may be from 1:99 to 99:1.

(38) The water-dispersed resin composition according to any one of (34) to (37) may further include a surfactant.

(39) The water-dispersed resin composition according to (38) may contain the surfactant in a content (blending amount) of 0.01 to 500 parts by weight per 100 parts by weight of the epoxy-amine adduct.

(40) In the water-dispersed resin composition according to one of (38) and (39), the surfactant may be at least one surfactant selected from the group consisting of anionic surfactants and nonionic surfactants.

(41) In the water-dispersed resin composition according to (40), the ratio (weight ratio) of the anionic surfactant(s) to the nonionic surfactant(s) may be from 95:5 to 10:90.

(42) The present invention also relates to a method for producing a water-dispersed resin composition. The method includes mixing a urethane resin emulsion with a water dispersion containing the epoxy adduct according to any one of (1) to (29).

(43) In the method according to (42) for producing a water-dispersed resin composition, the water dispersion containing the epoxy-amine adduct may further contain a surfactant.

(44) In the method according to (43) for producing a water-dispersed resin composition, the surfactant may be at least one surfactant selected from the group consisting of anionic surfactants and nonionic surfactants.

(45) The present invention also relates to a carbon-fiber sizing agent (sizing agent for carbon fibers) including the epoxy adduct according to any one of (1) to (29).

(46) The present invention also relates to a water-based paint including the carbon-fiber sizing agent according to (45).

(47) The present invention also relates to an aqueous solution including the carbon-fiber sizing agent according to (45).

(48) The present invention also relates to a water-dispersed resin composition including the carbon-fiber sizing agent according to (45) and a urethane resin.

(49) The water-dispersed resin composition according to (48) may further include a surfactant.

(50) In the water-dispersed resin composition according to (49), the surfactant may be at least one surfactant selected from the group consisting of anionic surfactants and nonionic surfactants.

(51) In the carbon-fiber sizing agent according to (45), the epoxy-amine adduct may be soluble in water.

(52) The present invention also relates to a carbon-fiber sizing agent including the water-dispersed resin composition according to any one of (34) to (41).

(53) The present invention also relates to a carbon-fiber sizing agent including an epoxy-amine adduct. The epoxy-amine adduct is at least one compound selected from the group consisting of a compound I containing two or more amino groups per molecule, a compound corresponding to the compound I, except being modified with a compound II-1 containing two or more (meth)acryloyl groups per molecule, a compound corresponding to the compound I, except being modified with a lactone II-2, and a salt of the compound I. The compound I is an adduct between an epoxide (A) and an amine (B). The epoxide (A) contains two or more cycloaliphatic epoxy groups per molecule. The amine (B) contains two or more amino groups per molecule.

(54) The present invention also relates to a carbon-fiber sizing agent including the epoxy-amine adduct according to (53). The epoxy-amine adduct is a compound corresponding to a compound I containing two or more amino groups per molecule, except being modified with a compound II-1 containing two or more (meth)acryloyl groups per molecule and is an adduct between the compound I and the compound II-1, where the compound II-1 is a multifunctional urethane (meth)acrylate.

(55) The present invention also relates to a carbon-fiber sizing agent including the epoxy-amine adduct according to (53). The epoxy-amine adduct is a compound corresponding to the compound I containing two or more amino groups per molecule, except being modified with a lactone II-2 and is a ring-opening adduct of the lactone II-2 to the compound I.

(56) The present invention also relates to a carbon-fiber sizing agent including the epoxy-amine adduct according to (53). The epoxy-amine adduct is the salt of the compound I containing two or more amino groups per molecule and is a salt of the compound I with an acid II-3.

(57) The present invention also relates to a sizing-agent-coated carbon fiber including a carbon fiber and the carbon-fiber sizing agent according to any one of (45) and (51) to (56). The sizing agent is disposed on or over the carbon fiber.

(58) The present invention also relates to a fiber-reinforced composite including the sizing-agent-coated carbon fiber according to (57).

(59) The present invention also relates to a fiber-reinforced composite including the thermoplastic resin composition according to one of (30) and (31) and a carbon fiber.

(60) The present invention also relates to a carbon-fiber treatment agent including the epoxy adduct according to any one of (1) to (29).

(61) The present invention also relates to a carbon fiber bundle including a bundle of carbon fibers, and the carbon-fiber sizing agent according to any one of (45), and (51) to (56). The sizing agent is disposed on or over the carbon fibers.

(62) The present invention also relates to a prepreg including the sizing-agent-coated carbon fiber according to (57).

(63) The present invention also relates to a prepreg including the epoxy adduct according to any one of (1) to (29), a thermoplastic resin, and a carbon fiber.

(64) The present invention also relates to a fiber-reinforced composite derived from the prepreg according to (63).

(65) The present invention also relates to a fiber-reinforced composite including the sizing-agent-coated carbon fiber according to (57), and a thermoplastic resin.

Advantageous Effects of Invention

The epoxy-amine adducts according to the present invention, as having the configurations, have high reactivity with functional groups (reactive functional groups) present on additive materials such as reinforcement fibers and fillers, where the functional groups are exemplified by hydroxy groups, carboxy groups, and epoxy groups (in particular, glycidyl groups). The epoxy-amine adducts effectively contribute to better adhesion between thermoplastic resins and additive materials in polymer composites such as fiber-reinforced composites and nanocomposites. The epoxy-amine adducts can at least soften or melt by heating, or is highly soluble typically in solvents and/or resins, and are more readily blendable with such other components. In an embodiment, the epoxy-amine adduct according to the present invention is formed from (derived from) specific compounds (in particular, a specific amine) as starting materials. The epoxy-amine adduct in this embodiment can have a high decomposition temperature and offers excellent heat resistance. The epoxy-amine adduct, when having excellent heat resistance as above, is applicable to processing at high temperatures and can contribute to better productivity of polymer composites. The epoxy-amine adduct can also have a somewhat high glass transition temperature and, in this case, less causes contamination typically of processing devices (such as rollers) and can be handled satisfactorily. In addition, the epoxy-amine adducts according to the present invention (in particular, after-mentioned epoxy-amine adducts according to a first embodiment and a fourth embodiment of the present invention) can be excellent particularly in water solubility and can be readily prepared in the form typically of an aqueous solution or a water dispersion. Usability of the epoxy-amine adducts in the form of such an aqueous solution or a water dispersion is advantageous in environmental protection and working safety securing. The epoxy-amine adducts according to the present invention (in particular, after-mentioned epoxy-amine adducts according to a second embodiment and a third embodiment of the present invention) can be excellent particularly in toughness and are preferably usable in uses that require such excellent toughness.

The use of the epoxy-amine adducts according to the present invention gives thermoplastic resin compositions capable of forming polymer composites (such as fiber-reinforced composites) that include a thermoplastic resin and an additive material (such as reinforcement fibers) with excellent adhesion to each other. In addition, the use gives fiber-reinforced composites with high productivity, where the fiber-reinforced composites include a thermoplastic resin and reinforcement fibers with excellent adhesion to each other and have high mechanical properties (in particular, toughness).

The sizing agents according to the present invention, as having the configurations, allow carbon fibers to have better processability in higher order processing and to have better adhesiveness with a matrix resin. The sizing agents, when using the epoxy-amine adduct having excellent heat resistance, are applicable to heating processing (e.g., sizing-agent-coated carbon fiber production) performed at high temperatures and can contribute to better productivity of fiber-reinforced composites. The sizing agents having this configuration less cause contamination of processing devices (such as rollers) and, when applied onto reinforcement fibers (to form, for example, sizing-agent-coated carbon fibers), can impart excellent feel and texture and/or excellent handleability to the reinforcement fibers. When any of the sizing agents according to the present invention is applied onto carbon fibers to give sizing-agent-coated carbon fibers, the resulting sizing-agent-coated carbon fibers have excellent processability in higher order processing and offer excellent adhesiveness and adhesion between the carbon fibers and a matrix resin. In addition, the fiber-reinforced composite including the sizing-agent-coated carbon fibers has excellent heat resistance and mechanical strength and offers high productivity.

The water-dispersed resin composition according to an embodiment of the present invention includes any of the epoxy-amine adducts and thereby has high affinity for functional groups, such as hydroxy and carboxy groups, present on reinforcement fibers. The water-dispersed resin composition, as further including a urethane resin in combination with the epoxy-amine adduct, effectively contributes to better adhesion between a thermoplastic resin and reinforcement fibers in fiber-reinforced composites. In particular, the water-dispersed resin composition according to the present invention allows a matrix resin, even when selected within a wide range, to develop good adhesion to the reinforcement fibers and is very useful. The water-dispersed resin composition, as being in the form of a water-dispersed resin composition, can be easily applied to a resin by impregnation and/or coating, where the resin is to be reinforced. In an embodiment, the water-dispersed resin composition according to the present invention is a water-dispersed resin composition (water dispersion) being approximately devoid of, or containing a small amount of, organic solvents. This water-dispersed resin composition is usable without limitations of working environment and is also advantageous in environmental protection. Accordingly, the water-dispersed resin composition according to the present invention, when used, gives a prepreg capable of forming a fiber-reinforced composite with excellent productivity, where the fiber-reinforced composite includes a thermoplastic resin and reinforcement fibers with excellent adhesion to each other. The prepreg gives a fiber-reinforced composite that includes a thermoplastic resin and reinforcement fibers with excellent adhesion to each other and has high mechanical properties (in particular, toughness).

DESCRIPTION OF EMBODIMENTS

Epoxy-Amine Adducts

Figure 1:
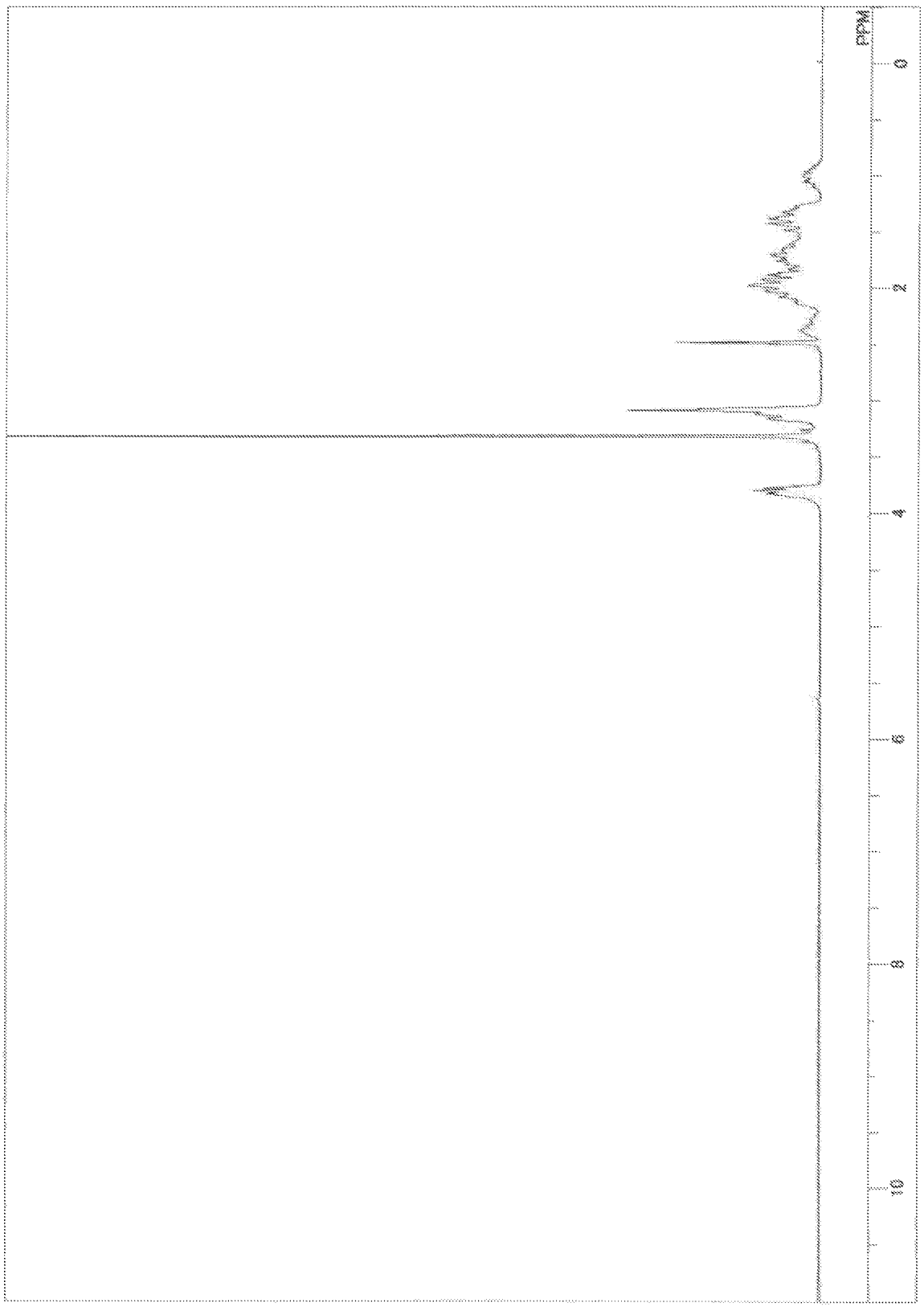
FIG. 1 depicts a $^1$H-NMR spectrum chart (solvent: DMSO-d6) for an epoxide (CELLOXIDE 2021P) used as a starting material to form a compound I in examples (working examples)
Figure 2:
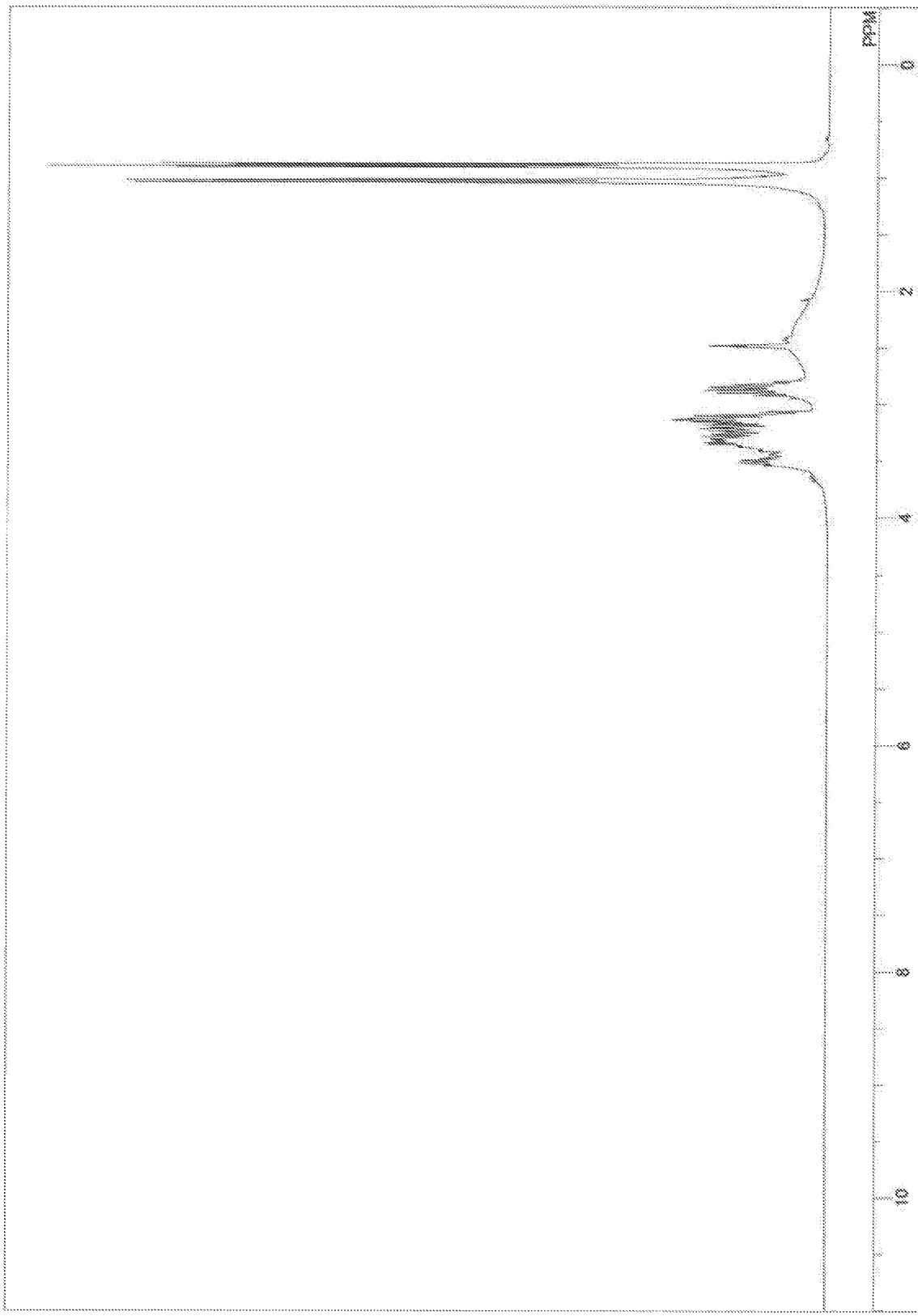
FIG. 2 depicts a $^1$H-NMR spectrum chart (solvent: DMSO-d6) for an amine (JEFFAMINE D-230) used as a starting material to form a compound I in the examples.
Figure 3:
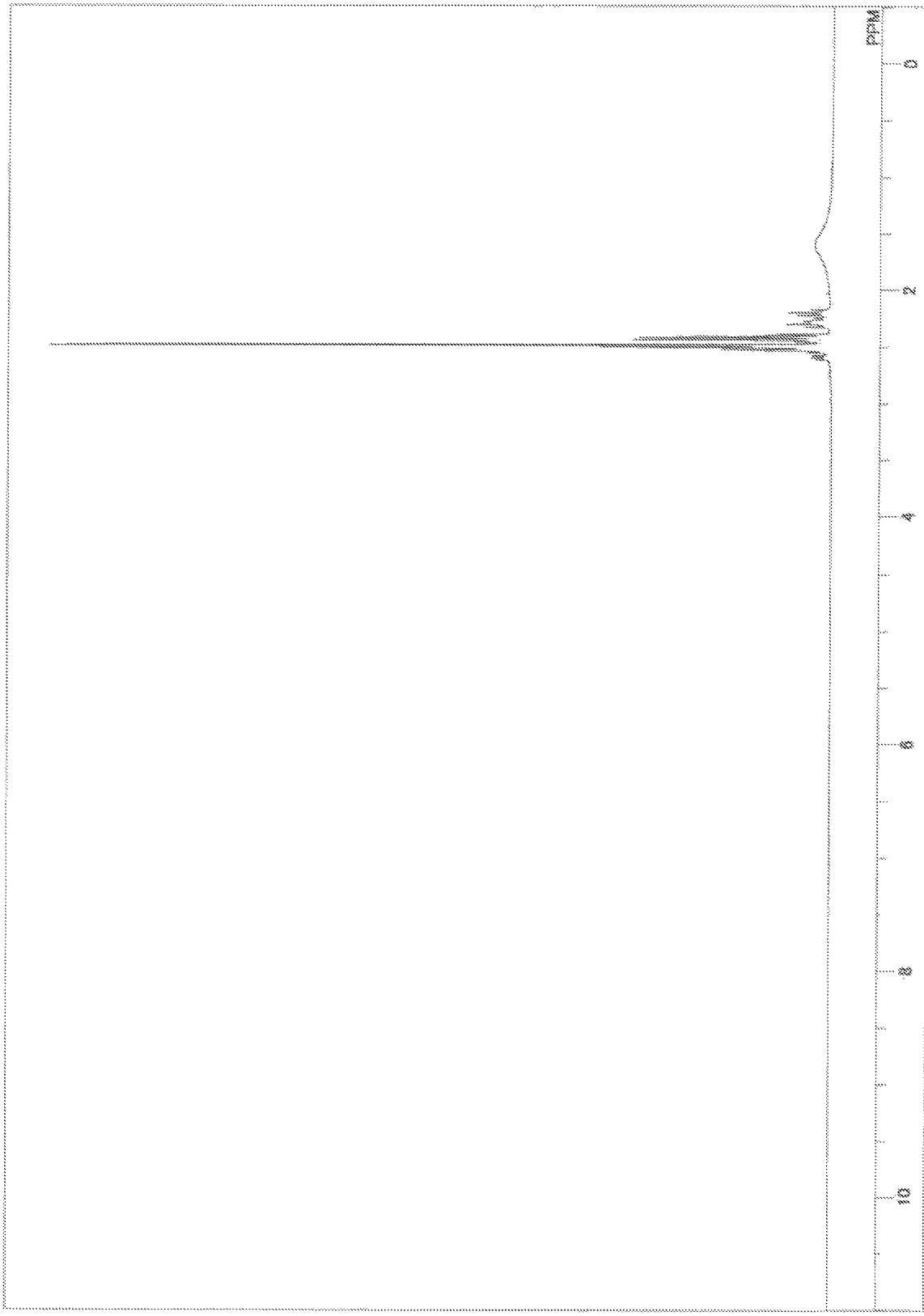
FIG. 3 depicts a $^1$H-NMR spectrum chart (solvent: DMSO-d6) for an amine (triethylenetetramine) used as a starting material to form a compound I in the examples.
Figure 4:
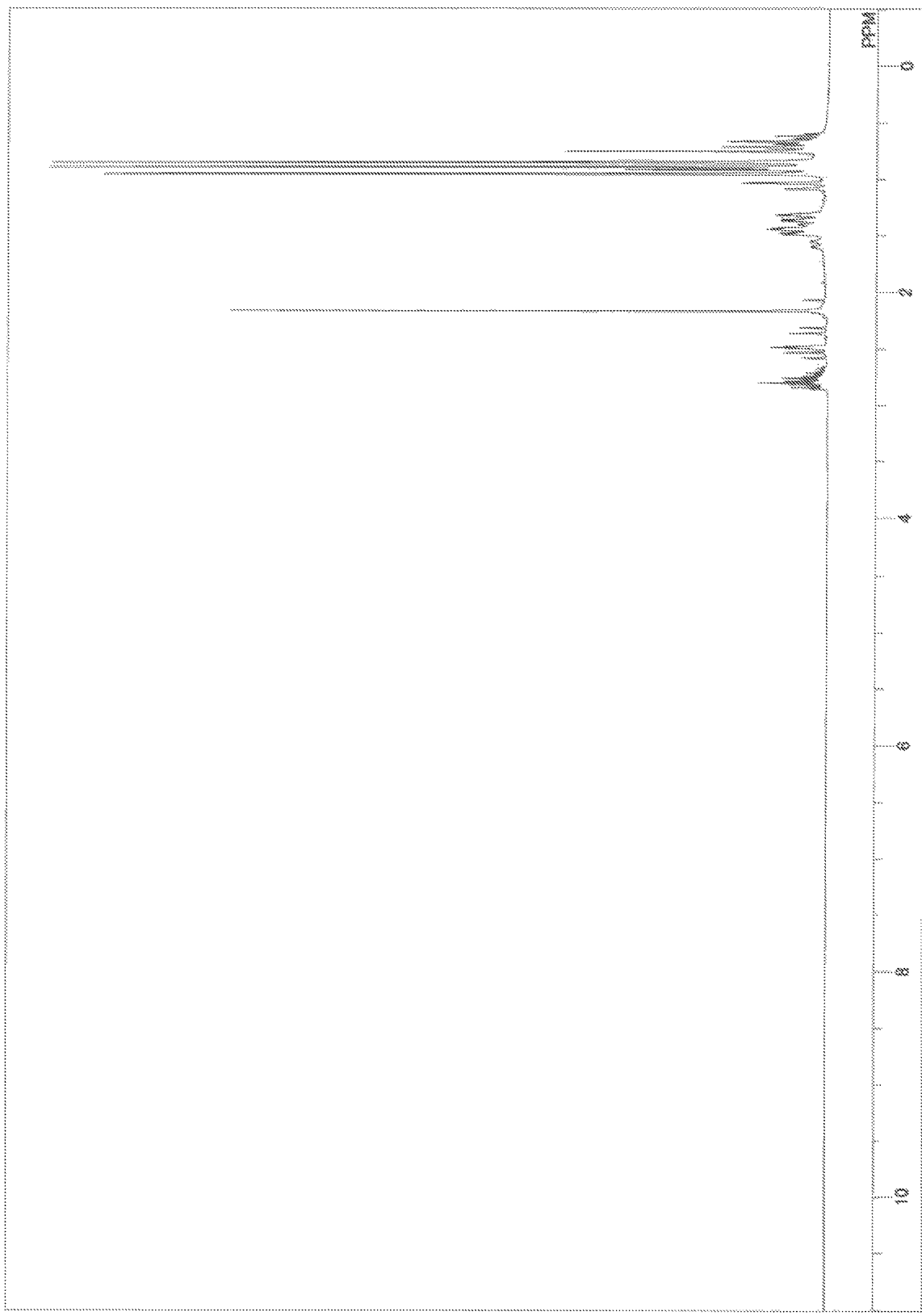
FIG. 4 depicts a $^1$H-NMR spectrum chart (solvent: DMSO-d6) for an amine (isophoronediamine) used as a starting material to form an epoxy-amine adduct in the examples.
Figure 5:
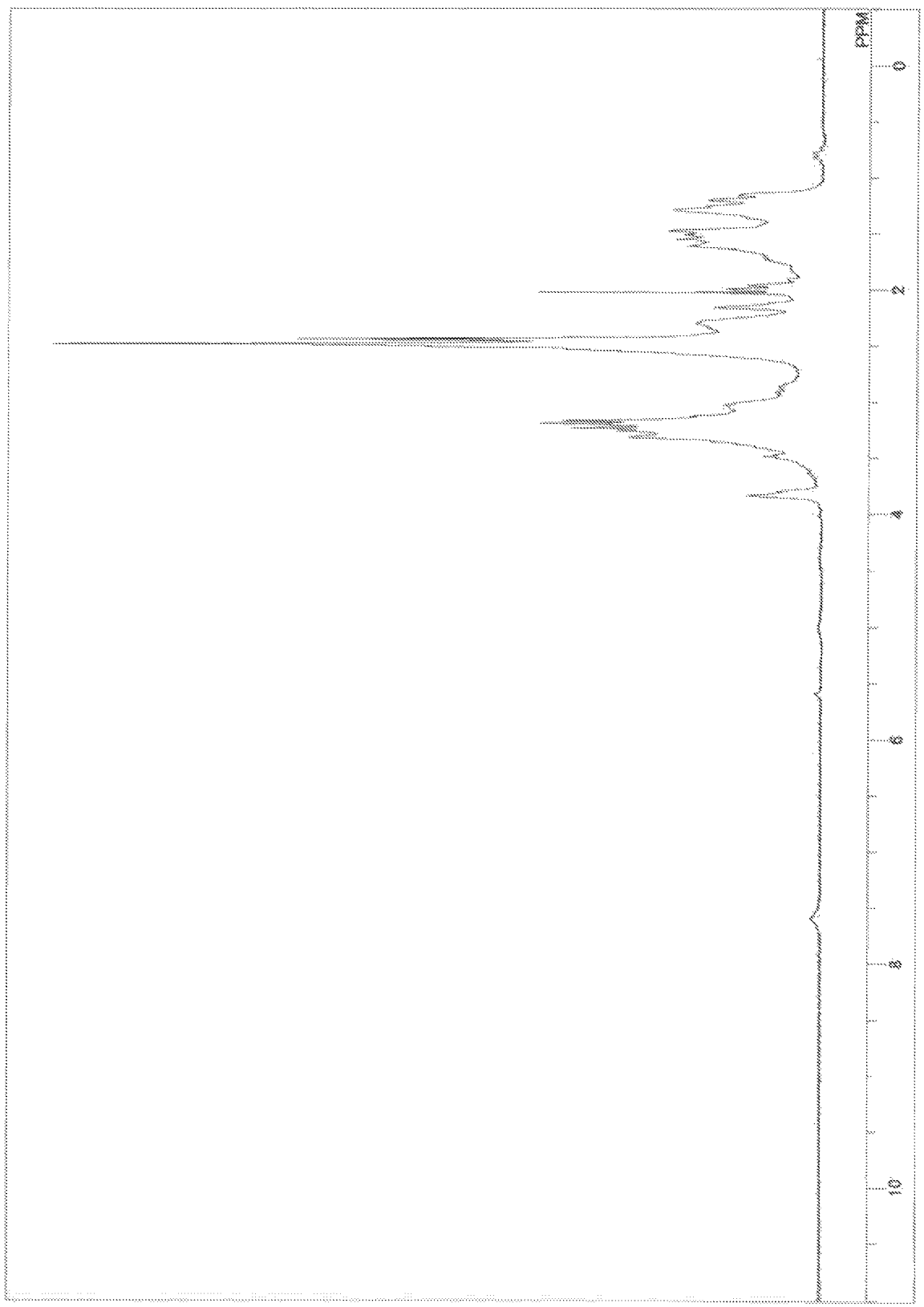
FIG. 5 depicts a $^1$H-NMR spectrum chart (solvent: DMSO-d6) for an epoxy-amine adduct obtained in Example 1-1.
Figure 6:
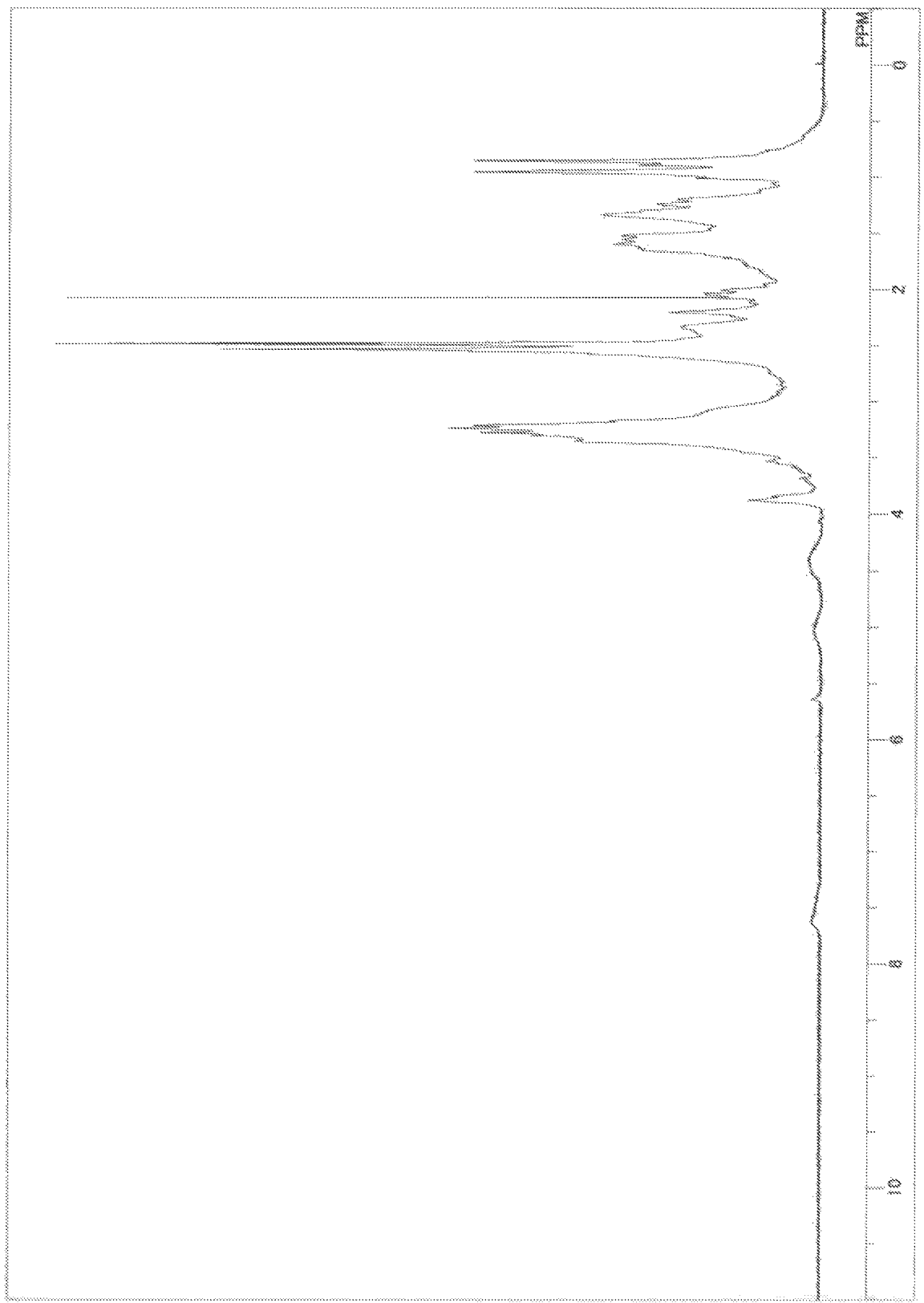
FIG. 6 depicts a $^1$H-NMR spectrum chart (solvent: DMSO-d6) for an epoxy-amine adduct obtained in Example 1-2.
Figure 7:
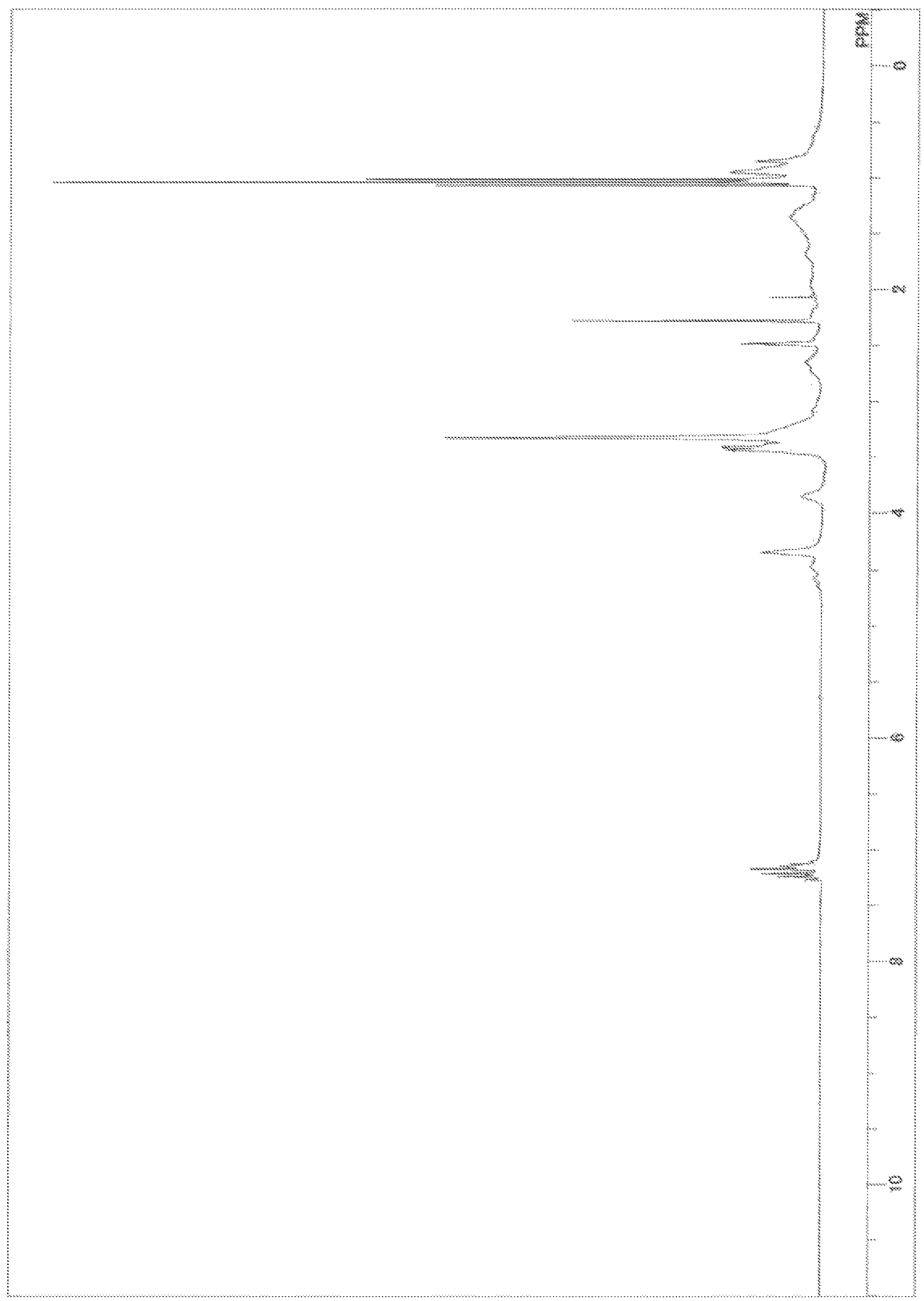
FIG. 7 depicts a $^1$H-NMR spectrum chart (solvent: DMSO-d6) for an epoxy-amine adduct obtained in Example 1-4.
Figure 8:
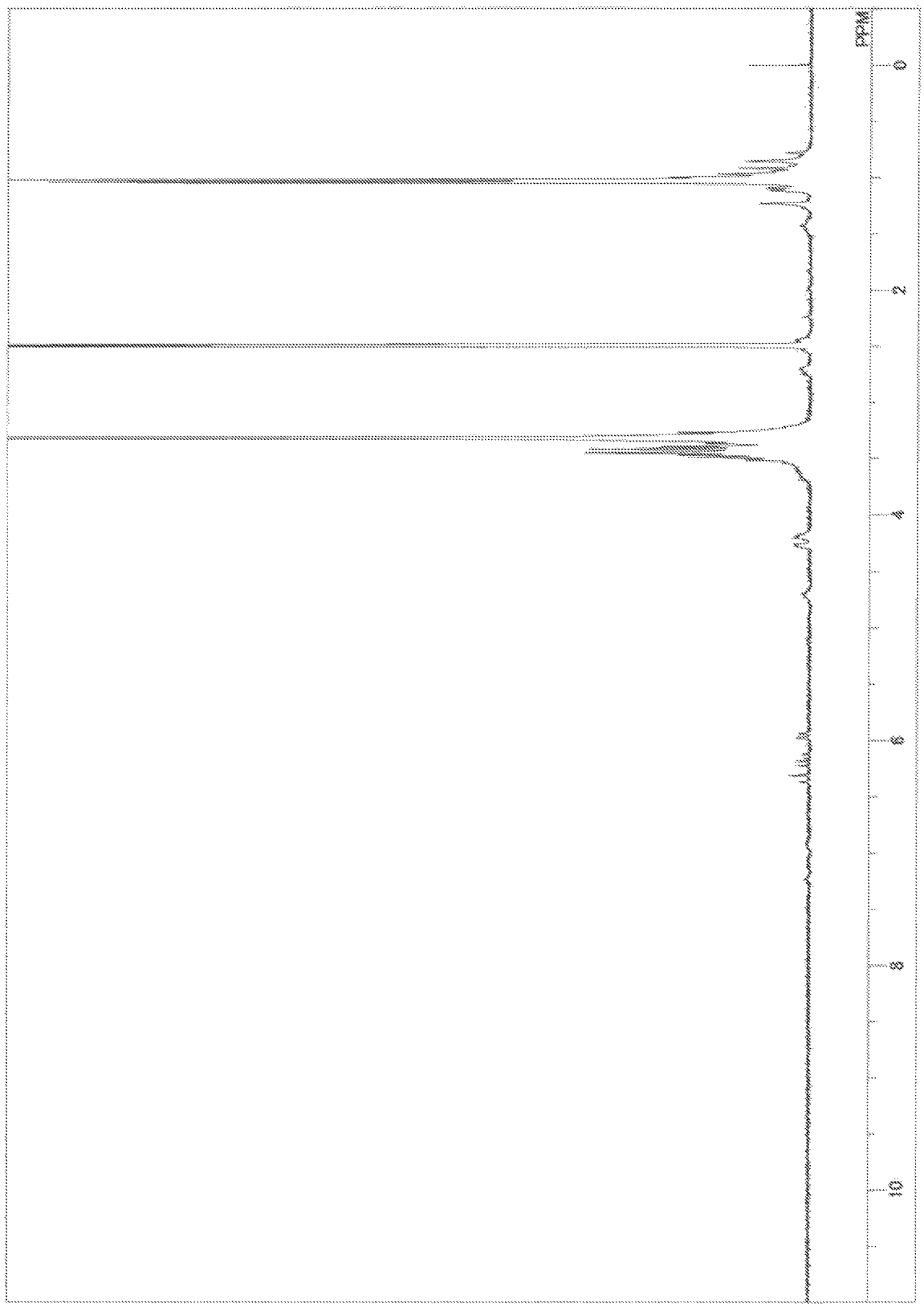
FIG. 8 depicts a $^1$H-NMR spectrum chart (solvent: DMSO-d6) for a multifunctional urethane (meth)acrylate (EBECRYL 230) used as a starting material to form a multifunctional urethane (meth)acrylate-modified epoxy-amine adduct in the examples.
Figure 9:
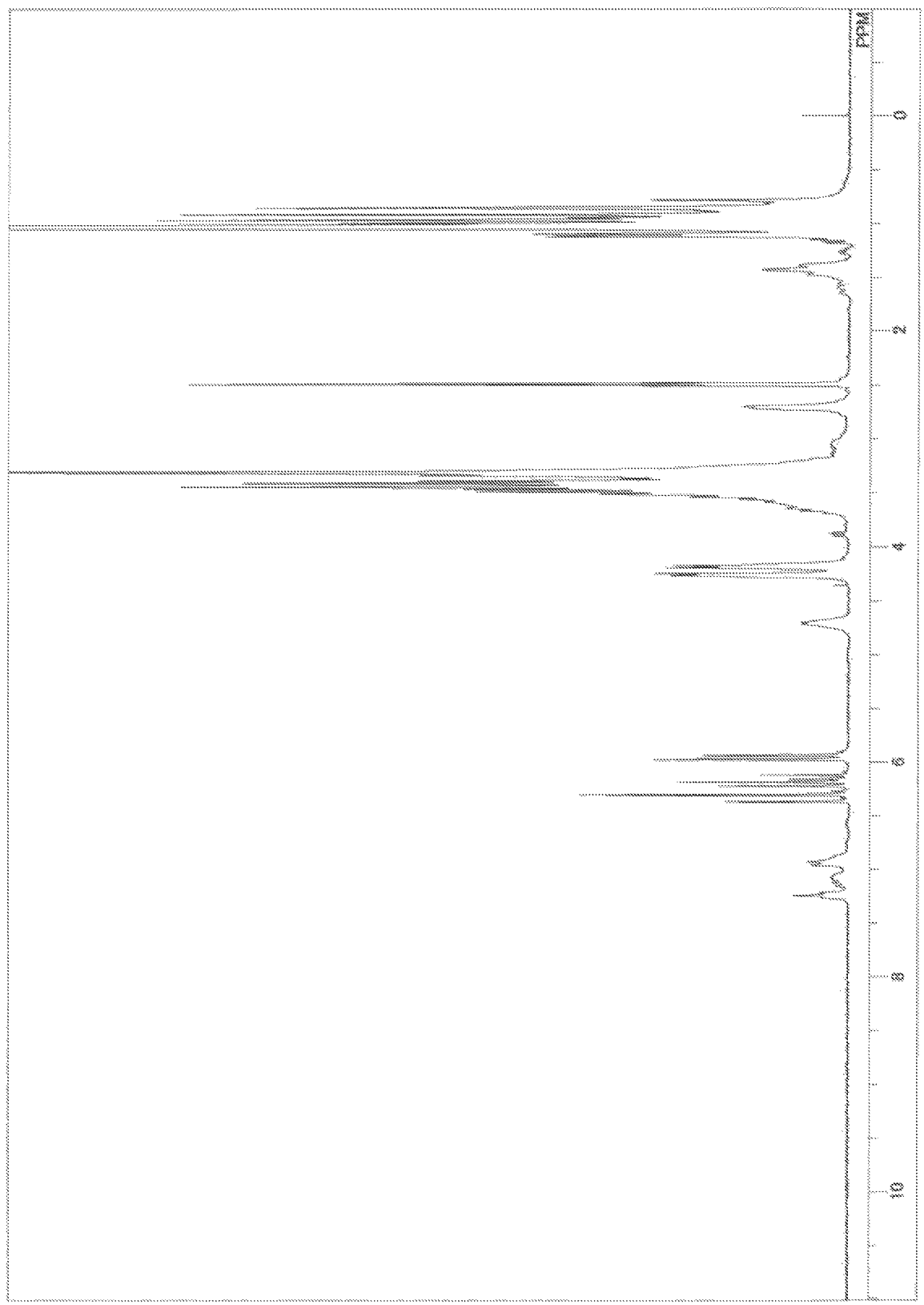
FIG. 9 depicts a $^1$H-NMR spectrum chart (solvent: DMSO-d6) for a multifunctional urethane (meth)acrylate (EBECRYL 270) used as a starting material to form a multifunctional urethane (meth)acrylate-modified epoxy-amine adduct in the examples.
Figure 10:
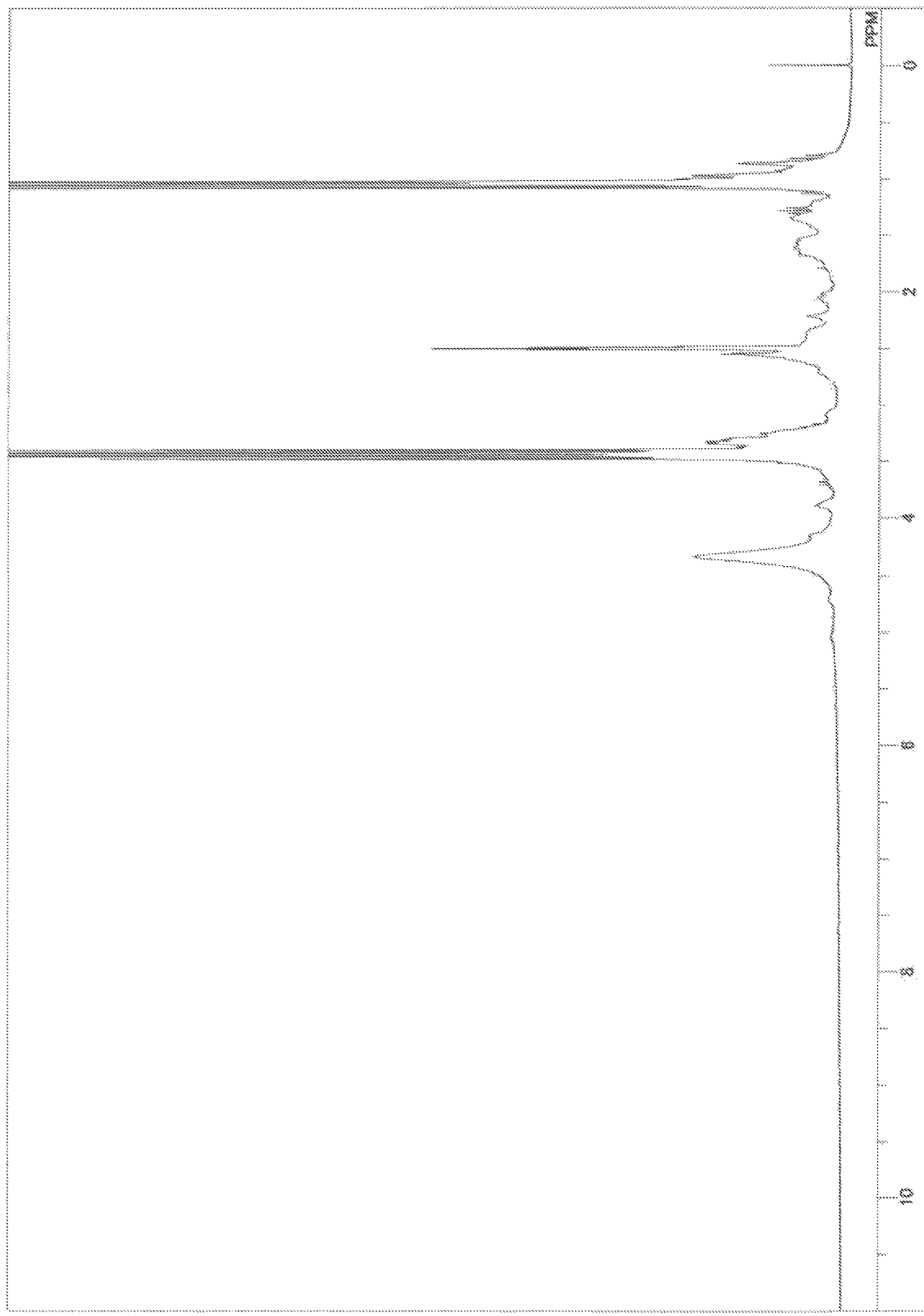
FIG. 10 depicts a $^1$H-NMR spectrum chart (solvent: DMSO-d6) for a multifunctional urethane (meth)acrylate-modified epoxy-amine adduct obtained in Example 2-1.
Figure 11:
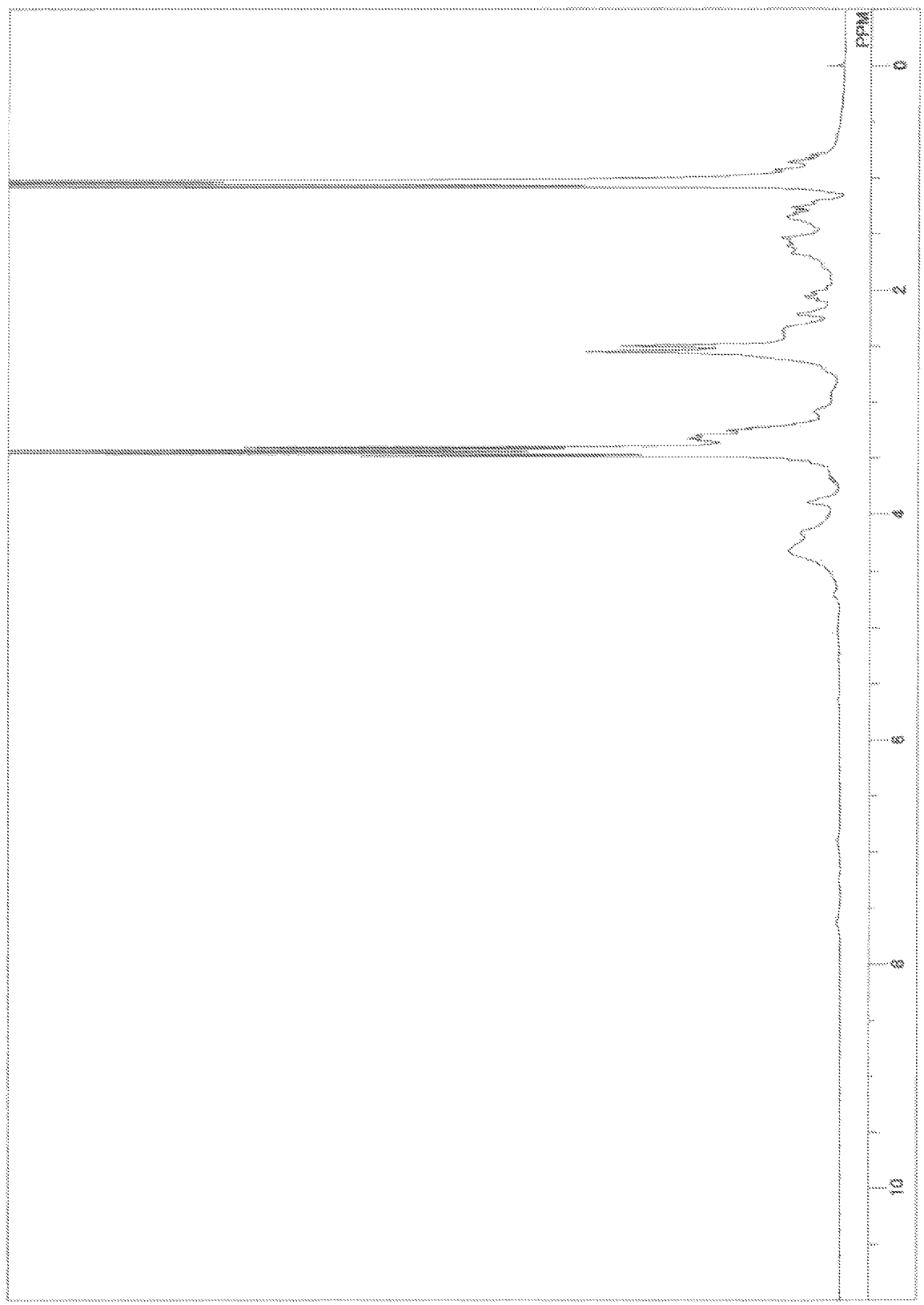
FIG. 11 depicts a ¹H-NMR spectrum chart (solvent: DMSO-d6) for a multifunctional urethane (meth)acrylate-modified epoxy-amine adduct obtained in Example 2-2.
Figure 12:
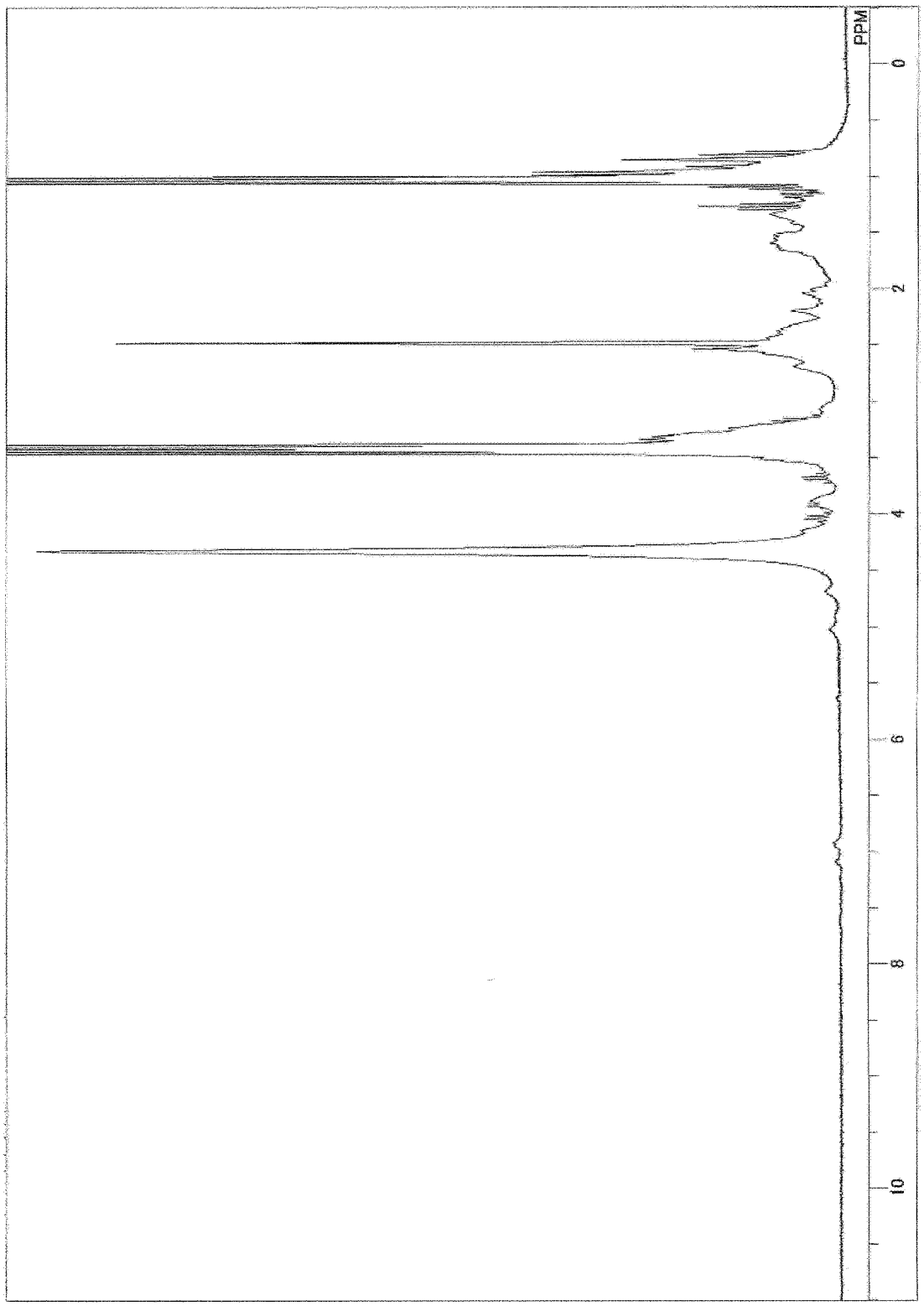
FIG. 12 depicts a ¹H-NMR spectrum chart (solvent: DMSO-d6) for a multifunctional urethane (meth)acrylate-modified epoxy-amine adduct obtained in Example 2-3.
Figure 13:
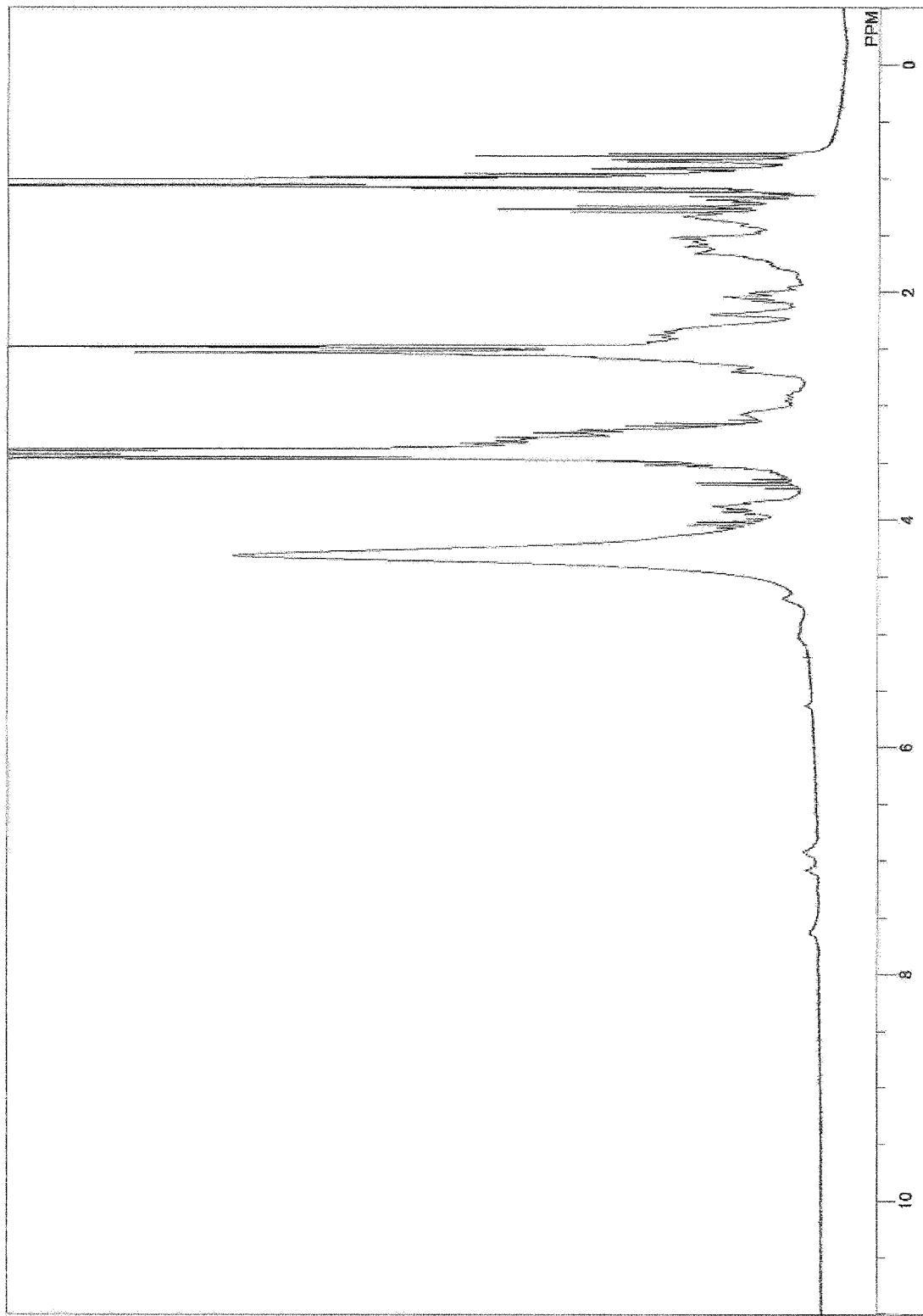
FIG. 13 depicts a ¹H-NMR spectrum chart (solvent: DMSO-d6) for a multifunctional urethane (meth)acrylate-modified epoxy-amine adduct obtained in Example 2-4.
Figure 14:
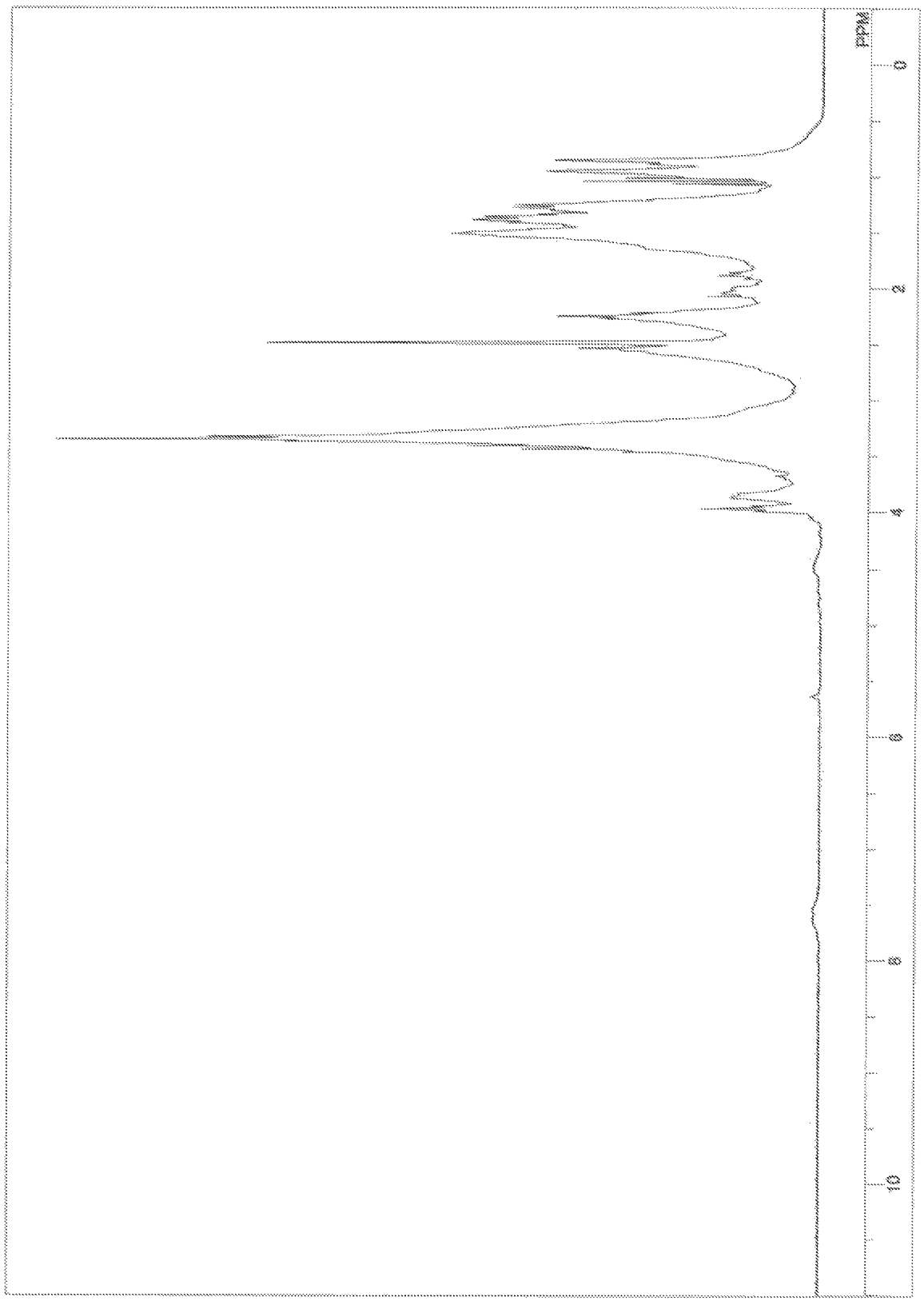
FIG. 14 depicts a ¹H-NMR spectrum chart (solvent: DMSO-d6) for a lactone-modified epoxy-amine adduct obtained in Example 3-1.
Figure 15:
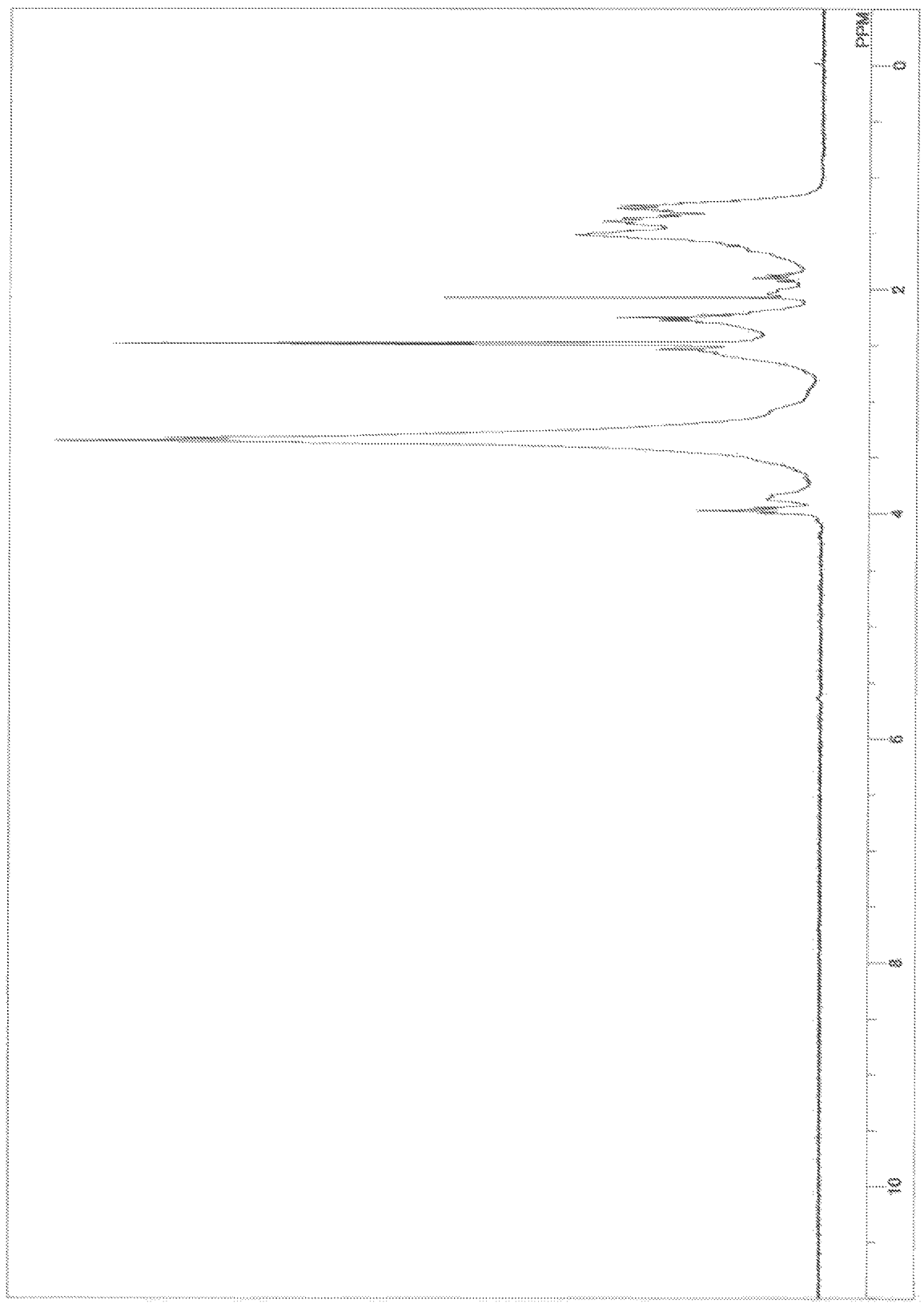
FIG. 15 depicts a ¹H-NMR spectrum chart (solvent: DMSO-d6) for a lactone-modified epoxy-amine adduct obtained in Example 3-2.
Figure 16:
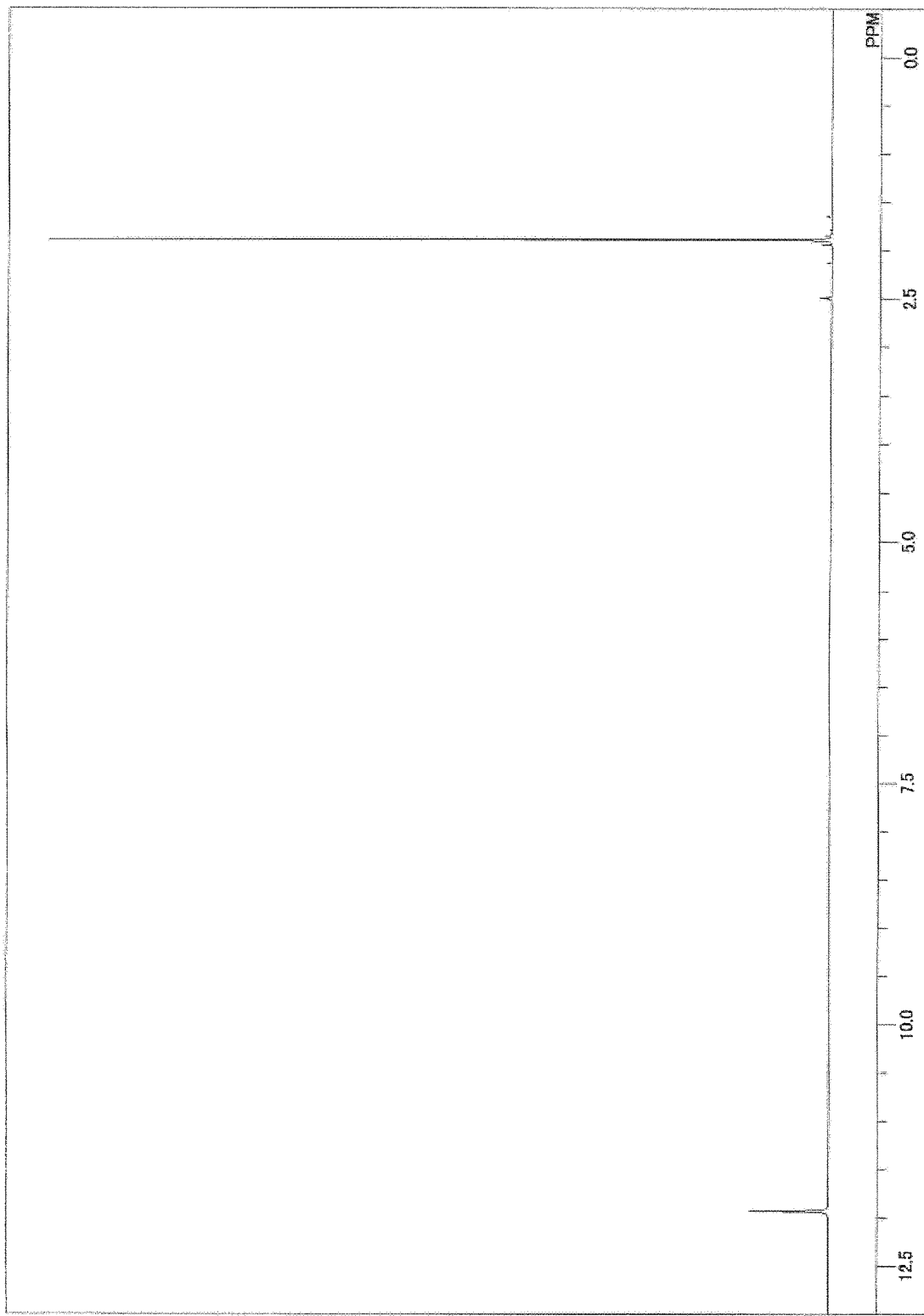
FIG. 16 depicts a ¹H-NMR spectrum chart (solvent: DMSO-d6) for ε-caprolactone used as a starting material to form a lactone-modified epoxy-amine adduct in the examples.
Figure 17:
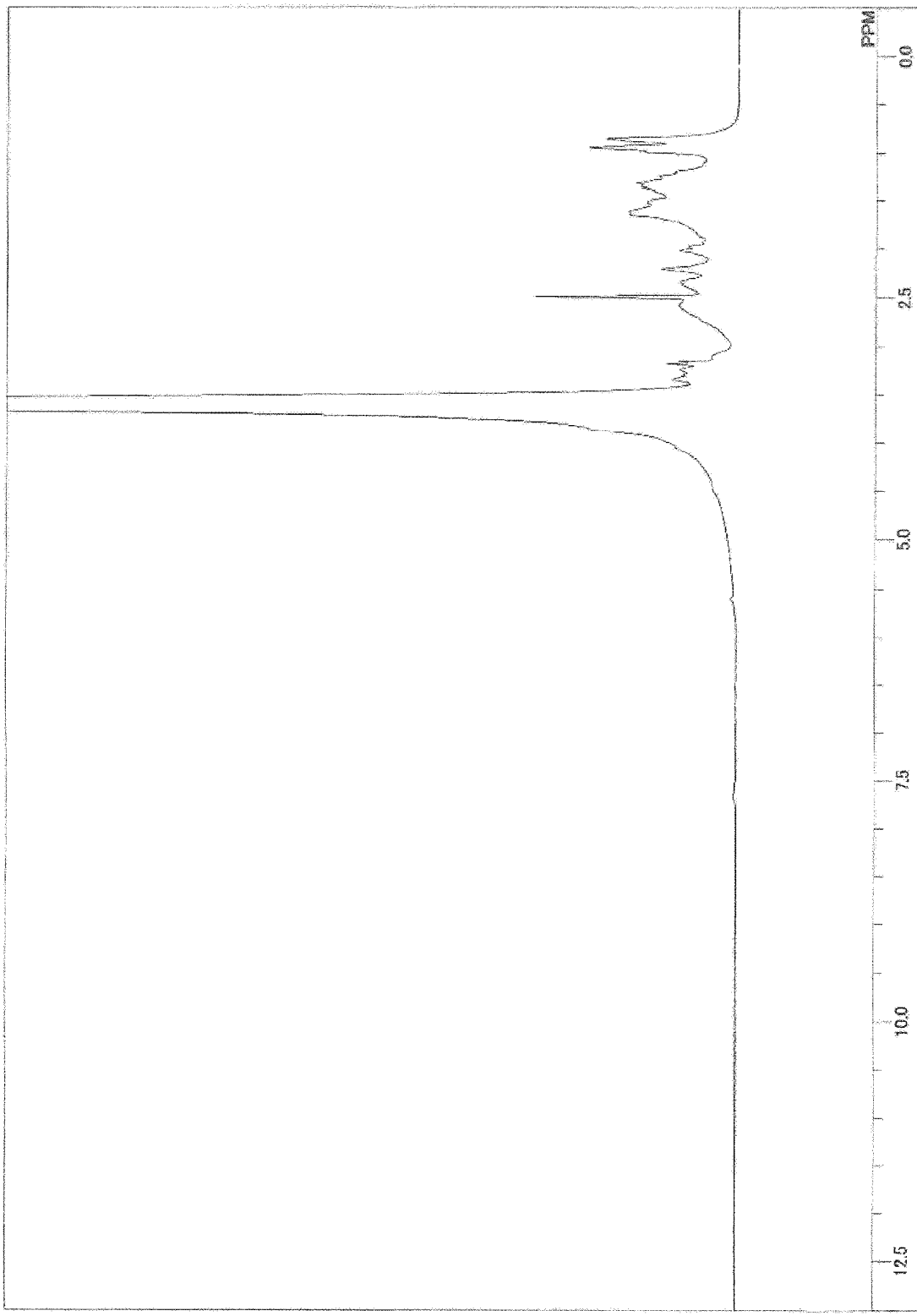
FIG. 17 depicts a ¹H-NMR spectrum chart (solvent: DMSO-d6) for an epoxy-amine adduct salt (carbonate) produced in Example 4-1.
Figure 18:
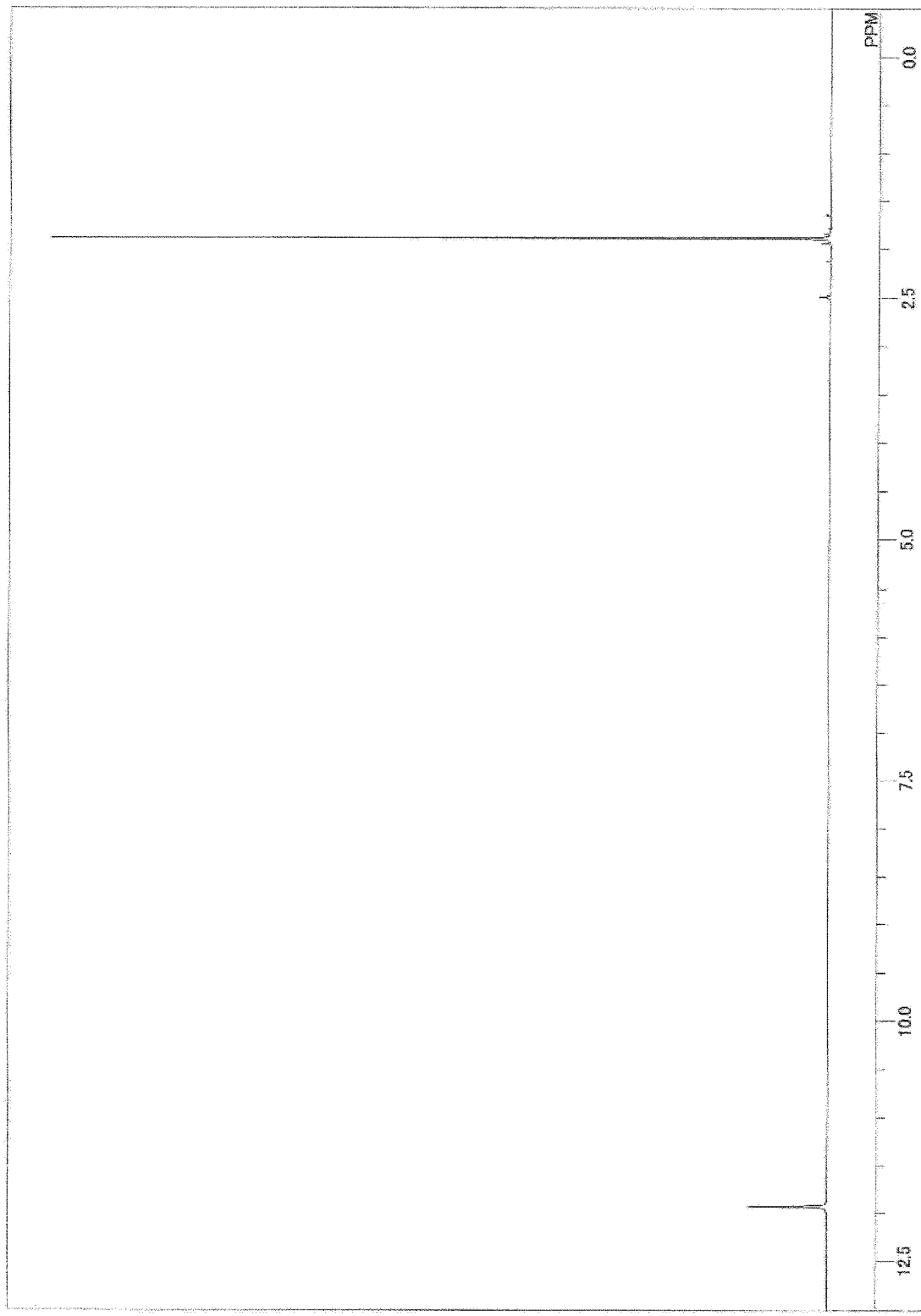
FIG. 18 depicts a ¹H-NMR spectrum chart (solvent: DMSO-d6) for acetic acid used in Example 4-2.
Figure 19:
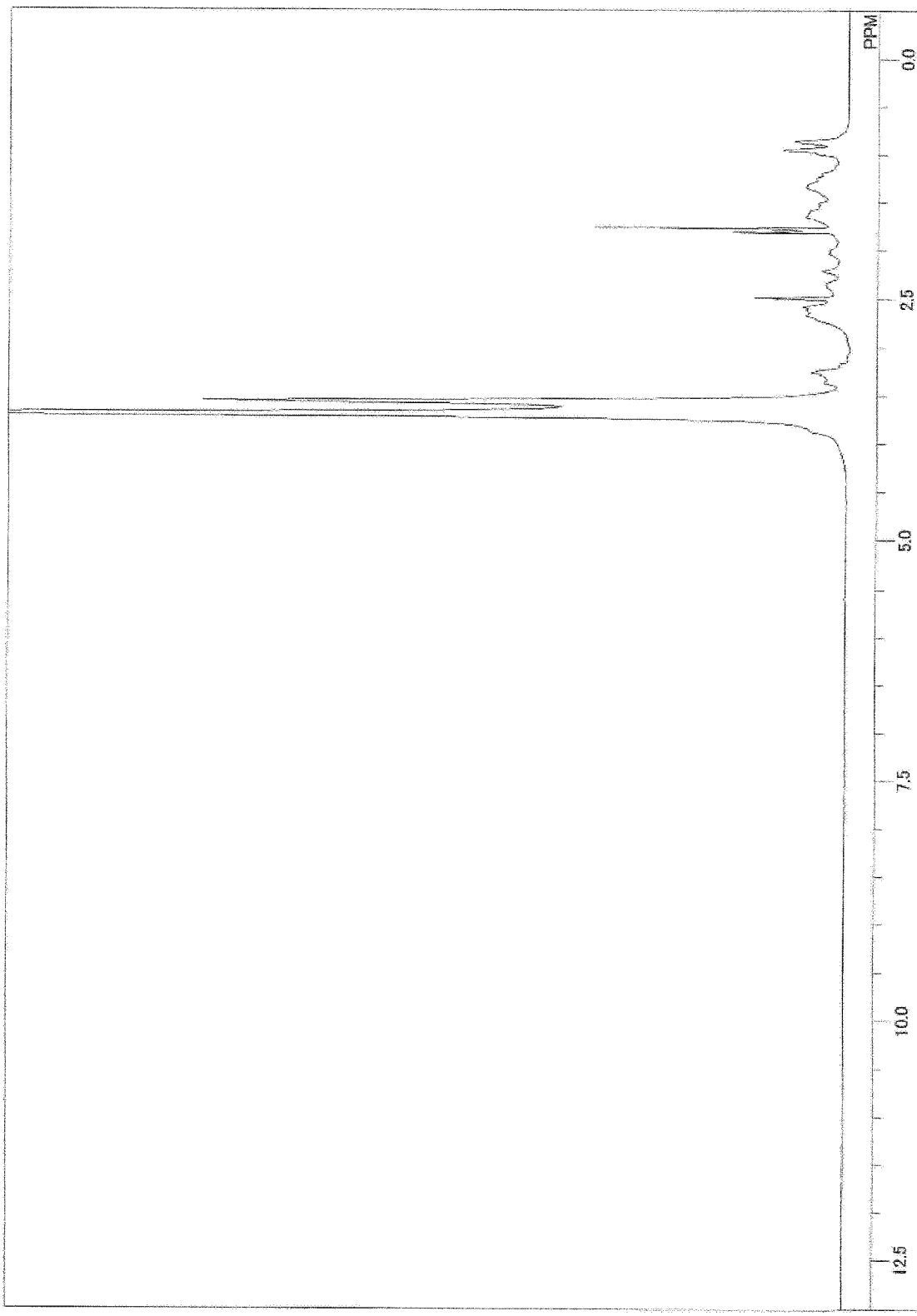
FIG. 19 depicts a ¹H-NMR spectrum chart (solvent: DMSO-d6) for an epoxy-amine adduct salt (acetate) produced in Example 4-2.

The epoxy-amine adducts according to the present invention are each a compound selected from the group consisting of a compound I containing two or more amino groups per molecule, a compound corresponding to the compound I, except being modified with a compound II-1 containing two or more (meth)acryloyl groups per molecule, a compound corresponding to the compound I, except being modified with a lactone II-2, and a salt of the compound I. The compound I containing two or more amino groups per molecule is also simply referred to as a "compound I". The compound II-1 containing two or more (meth)acryloyl groups per molecule is also simply referred to as a "compound II-1". The compound I is an adduct between an epoxide (A) and an amine (B), where the epoxide (A) contains two or more cycloaliphatic epoxy groups per molecule, and the amine (B) contains two or more amino groups per molecule.

In this description, the compound I is also referred to as an "epoxy-amine adduct according to the first embodiment of the present invention"; the compound corresponding to the compound I, except being modified with the compound II-1 is also referred to as an "epoxy-amine adduct according to the second embodiment of the present invention"; the compound corresponding to the compound I, except being modified with the lactone II-2 is also referred to as an "epoxy-amine adduct according to the third embodiment of the present invention"; and the salt of the compound I is also referred to as an "epoxy-amine adduct according to the fourth embodiment of the present invention". The epoxy-amine adducts according to the first, second, third, and fourth embodiments of the present invention are also generically referred to as "epoxy-amine adduct(s) according to the present invention".

Specifically, all the epoxy-amine adducts according to the first, second, third, and fourth embodiments of the present invention are compounds each having a structure derived from the compound I. The compound I is an adduct obtained by a reaction between an epoxide (A) containing two or more cycloaliphatic epoxy groups per molecule and an amine (B) containing two or more amino groups per molecule. The compound I contains two or more amino groups per molecule. Advantageously, the epoxy-amine adducts according to the first, second, third, and fourth embodiments of the present invention, as having the common structure as mentioned above, offer better adhesion between a thermoplastic resin and an additive material (such as reinforcement fibers) and are easily blendable with another component such as a resin in polymer composites (such as fiber-reinforced composites).

Initially, the compound I, which gives the common structure in the epoxy-amine adducts according to the present invention, will be illustrated.

Compound I

The compound I is a compound containing two or more amino groups (—NH$_2$) per molecule and is an epoxy-amine adduct obtained by a reaction between an epoxide (A) and an amine (B), as described above. More specifically, the compound I is an adduct between one or more molecules of the epoxide (A) and one or more molecules (preferably two or more molecules) of the amine (B), where the adduct is formed by a reaction between the cycloaliphatic epoxy groups of the epoxide (A) and the amino groups of the amine (B). In the description, a group simply referred to as an "amino group" refers to —NH$_2$ (unsubstituted amino group), and the term "—NH— group" does not include the unsubstituted amino group (—NH$_2$).

1. Epoxide (A)

The epoxide (epoxy compound) (A), which is a starting material to form the compound I, is a polyepoxide containing two or more cycloaliphatic epoxy groups per molecule (cycloaliphatic epoxide). As used herein, the term "cycloaliphatic epoxy group" refers to an epoxy group including an oxygen atom bonded in a triangular arrangement to adjacent two carbon atoms constituting an alicycle (aliphatic ring).

The cycloaliphatic epoxy groups of the epoxide (A) are not limited, but may be selected typically from epoxy groups each including an oxygen atom bonded in a triangular manner to adjacent two carbon atoms constituting a C$_4$-C$_{16}$ aliphatic ring (aliphatic hydrocarbon ring), where non-limiting examples of the C$_4$-C$_{16}$ aliphatic ring include cyclobutane, cyclopentane, cyclohexane, and cycloheptane rings. Among them, the cycloaliphatic epoxy groups are each preferably an epoxy group including an oxygen atom bonded in a triangular manner to two carbon atoms constituting a cyclohexane ring (cyclohexene oxide group).

The number of the cycloaliphatic epoxy groups per molecule of the epoxide (A) is not limited, as long as being 2 or more, but is preferably 2 to 6, more preferably 2 to 5, and furthermore preferably 2 or 3. The epoxide (A), when containing 6 or more cycloaliphatic epoxy groups, tends to allow the epoxy-amine adducts according to the present invention to be blended easily with another component and to have solvent solubility, water solubility, toughness, and flexibility (pliability) at higher levels.

In particular, the epoxide (A) is preferably selected from compounds (epoxides) represented by Formula (a):

[Chem. 5]

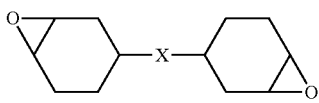
(a)

In Formula (a), X is selected from a single bond and a linkage group (divalent group containing one or more atoms). Non-limiting examples of the linkage group include divalent hydrocarbon groups, alkenylene, except with part or all of carbon-carbon double bond(s) being epoxidized, carbonyl, ether bond, ester bond, carbonato, and amido; and groups each including two or more of these groups bonded to each other. A substituent such as alkyl may be bonded to one or more of carbon atoms constituting the alicycles (cycloaliphatic epoxy groups) in Formula (a).

A non-limiting example of the epoxide (A) of Formula (a) in which X is a single bond is 3,4,3',4'-diepoxybicyclohexane.

Non-limiting examples of the divalent hydrocarbon groups include $C_1$-$C_{18}$ linear or branched alkylene and divalent alicyclic hydrocarbon groups. Non-limiting examples of the $C_1$-$C_{18}$ linear or branched alkylene include methylene, methylmethylene, dimethylmethylene, ethylene, propylene, and trimethylene. Non-limiting examples of the divalent alicyclic hydrocarbon groups include divalent cycloalkylene (including cycloalkylidene) such as 1,2-cyclopentylene, 1,3-cyclopentylene, cyclopentylidene, 1,2-cyclohexylene, 1,3-cyclohexylene, 1,4-cyclohexylene, and cyclohexylidene.

The alkylene, except with part or all of carbon-carbon double bond(s) being epoxidized is also referred to as "epoxidized alkylene". Examples of the alkenylene moiety in the epoxidized alkenylene include, but are not limited to, $C_2$-$C_8$ linear or branched alkenylene such as vinylene, propenylene, 1-butenylene, 2-butenylene, butadienylene, pentenylene, hexenylene, heptenylene, and octenylene. In particular, of the epoxidized alkenylene, preferred is alkenylene, except with all the carbon-carbon double bond(s) being epoxidized, and more preferred is $C_2$-$C_4$ alkenylene, except with all the carbon-carbon double bond(s) being epoxidized.

In particular, the linkage group X is preferably selected from oxygen-containing linkage groups such as —CO—, —O—CO—O—, —CO—O—, —O—, —CO—NH—, and epoxidized alkenylene; groups each including two or more of these groups linked to each other; and groups each including one or more of these groups and one or more of divalent hydrocarbon groups linked to each other. The divalent hydrocarbon groups are as exemplified above.

Representative examples of the cycloaliphatic epoxide represented by Formula (a) include, but are not limited to, compounds represented by Formulae (a-1) to (a-10) below, 2,2-bis(3,4-epoxycyclohexyl)propane (i.e., 2,2-bis(3,4-epoxycyclohex-1-yl)propane), 1,2-bis(3,4-epoxycyclohexyl)ethane (i.e., 1,2-bis(3,4-epoxycyclohex-1-yl)ethane), 2,3-bis(3,4-epoxycyclohexyl)oxirane (i.e., 1,2-epoxy-1,2-bis(3,4-epoxycyclohex-1-yl)ethane), and bis(3,4-epoxycyclohexylmethyl) ether. In Formulae (a-5) and (a-7), l and m each represent an integer of 1 to 30. In Formula (a-5), R' represents, independently in each occurrence, $C_1$-$C_8$ alkylene and is exemplified by, but not limited to, linear or branched alkylene such as methylene, ethylene, propylene, isopropylene, butylene, isobutylene, s-butylene, pentylene, hexylene, heptylene, and octylene. Among them, $C_1$-$C_3$ linear or branched alkylene, such as methylene, ethylene, propylene, or isopropylene, is preferred. In Formulae (a-9) and (a-10), n1 to n6 each independently represent an integer of 1 to 30.

[Chem. 6]

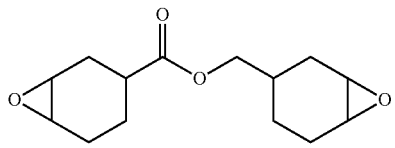
(a-1)

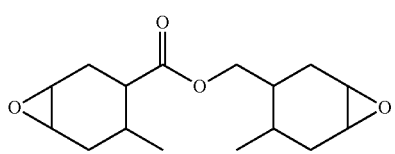
(a-2)

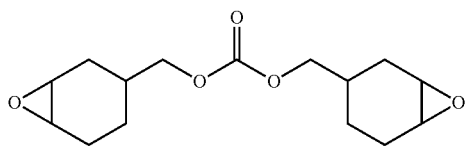
(a-3)

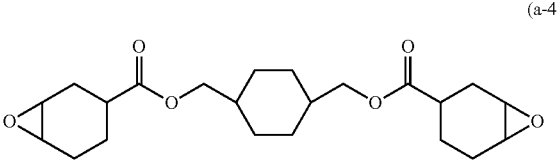
(a-4)

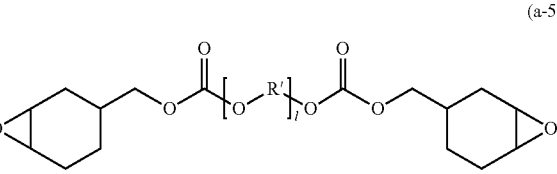
(a-5)

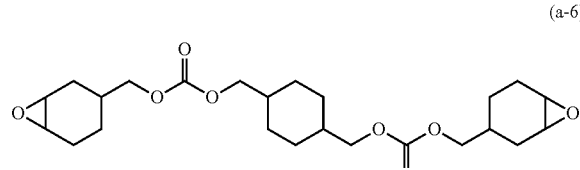
(a-6)

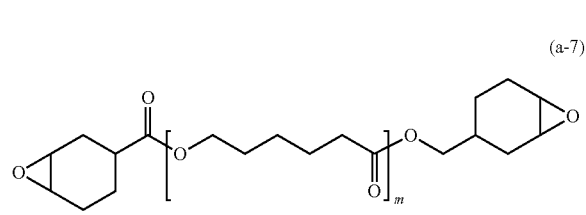
(a-7)

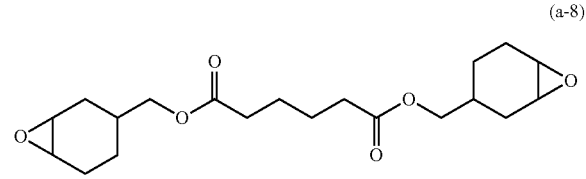
(a-8)

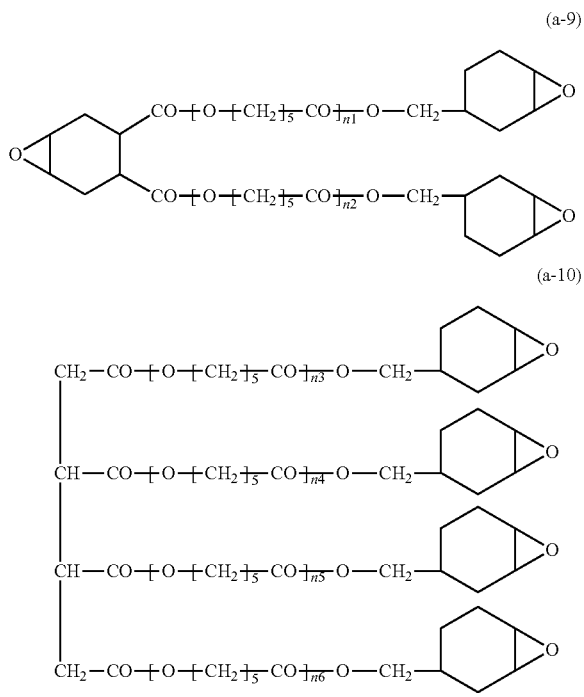

The epoxide (A) is preferably selected from the compounds represented by Formula (a) and is, in particular, preferably the compound represented by Formula (a-1) (3,4-epoxycyclohexylmethyl (3,4-epoxy)cyclohexanecarboxylate; such as a product under the trade name CELLOXIDE 2021P (supplied by Daicel Corporation)). This is preferred from the viewpoints of heat resistance and handleability.

2. Amine (B)

The amine (amine compound) (B), which is a starting material to form the compound I, is a polyamine containing two or more amino groups (—$NH_2$; unsubstituted amino groups) per molecule. The number of amino groups per molecule of the amine (B) is not limited, as long as being 2 or more, but is preferably 2 to 6, more preferably 2 to 5, and furthermore preferably 2 or 3. The amine (B), when containing 6 or more amino groups, tends to allow the epoxy-amine adducts according to the present invention to be more readily blendable with another component and to have solvent solubility, water solubility, toughness, and flexibility (flexibility) at still higher levels.

The amine (B) may have a molecular weight not limited, but preferably 80 to 10000, more preferably 100 to 5000, and furthermore preferably 200 to 1000. The amine (B), if having a molecular weight less than 80, may cause the epoxy-amine adducts according to the present invention to include an excessively large amount of after-mentioned —NH— groups (substituted amino groups), and this may cause, for example, a cured product (cured resin) of a composition of the epoxy-amine adduct with a curable resin (curable compound) to be excessively brittle. In contrast, the amine (B), if having a molecular weight greater than 10000, may less effectively react with the epoxide (A) and/or may cause the epoxy-amine adducts according to the present invention to offer insufficient effects upon their blending (compounding), where the effects are exemplified by better heat resistance of the cured product (cured resin), and better heat resistance and better toughness of fiber-reinforced composites.

Non-limiting examples of the amine (B) include compounds (p-valent amines) represented by Formula (b):
[Chem. 8]

$$R^1(NH_2)_p \qquad (b)$$

In Formula (b), p represents an integer of 2 or more. The number p is not limited, as long as being an integer of 2 or more, but is preferably 2 to 6, more preferably 2 to 5, and furthermore preferably 2 or 3.

$R^1$ in Formula (b) represents a p-valent organic group (organic residue) containing a carbon atom at a binding site with the specified nitrogen atom. Non-limiting examples of $R^1$ include linear or branched p-valent aliphatic hydrocarbon groups; alicyclic p-valent hydrocarbon groups; aromatic p-valent hydrocarbon groups; and p-valent groups each including two or more of these groups bonded to each other directly or through a heteroatom-containing linkage group (divalent group).

Non-limiting examples of the linear or branched p-valent aliphatic hydrocarbon groups include linear or branched divalent aliphatic hydrocarbon groups, linear or branched trivalent aliphatic hydrocarbon groups, and linear or branched tetravalent aliphatic hydrocarbon groups. Non-limiting examples of the linear or branched divalent aliphatic hydrocarbon groups include alkylene including $C_1$-$C_{30}$ linear or branched alkylene such as methylene, ethylene, propylene, butylene, pentylene, hexylene, heptylene, octylene, nonylene, decylene, undecylene, dodecylene, tridecylene, tetradecylene, pentadecylene, hexadecylene, heptadecylene, and octadecylene, of which $C_1$-$C_{18}$ alkylene is preferred; and alkenylene including alkenylene corresponding to the alkylene, such as vinylene, allylene, and other $C_2$-$C_{30}$ linear or branched alkenylene, of which $C_2$-$C_{18}$ alkenylene is preferred. Non-limiting examples of the linear or branched trivalent aliphatic hydrocarbon groups include alkane-triyl groups including $C_3$-$C_{30}$ linear or branched alkane-triyl groups such as propane-triyl and 1,1,1-trimethylpropane-triyl, of which $C_3$-$C_{18}$ alkane-triyl groups are preferred. Non-limiting examples of the linear or branched tetravalent aliphatic hydrocarbon groups include alkane-tetrayl groups including $C_4$-$C_{30}$ linear or branched alkane-tetrayl groups such as butane-tetrayl and 2,2-dimethylpropane-tetrayl, of which $C_4$-$C_{18}$ alkane-tetrayl groups are preferred.

The linear or branched p-valent aliphatic hydrocarbon groups may be those containing one or more of various substituents. Namely, the linear or branched p-valent aliphatic hydrocarbon groups may contain various substituents as replacing at least one of their hydrogen atoms. Non-limiting examples of the substituents include halogen, oxo, hydroxy, substituted oxy (e.g., alkoxy, aryloxy, aralkyloxy, and acyloxy), carboxy, substituted oxycarbonyl (e.g., alkoxycarbonyl, aryloxycarbonyl, and aralkyloxycarbonyl), substituted or unsubstituted carbamoyl, cyano, nitro, substituted or unsubstituted amino sulfo, and heterocyclic groups. The hydroxy and carboxy may each be protected with a protecting group commonly used in the organic synthesis area. Non-limiting examples of the protecting group include acyl, alkoxycarbonyl, organosilyl, alkoxyalkyl, and oxacycloalkyl.

Non-limiting examples of the substituted or unsubstituted carbamoyl include carbamoyl having a substituent or substituents such as alkyl and acyl; and unsubstituted carbamoyl, where the alkyl is exemplified by methyl, ethyl, propyl, isopropyl, n-butyl, s-butyl, and t-butyl), and the acyl is exemplified by acetyl and benzoyl. Non-limiting examples of the substituted or unsubstituted amino include amino having a substituent or substituents such as alkyl and acyl; and unsubstituted amino, where the alkyl is exemplified by methyl, ethyl, propyl, isopropyl, n-butyl, s-butyl, and t-butyl), and the acyl is exemplified by acetyl and benzoyl.

Heterocycles constituting the heterocyclic groups include aromatic heterocycles and non-aromatic heterocycles. Non-limiting examples of such heterocycles include oxygen-containing heterocycles, sulfur-containing heterocycles, and nitrogen-containing heterocycles, where oxygen, sulfur, and nitrogen are heteroatoms. Non-limiting examples of the oxygen-containing heterocycles include 3-membered rings such as oxirane ring; 4-membered rings such as oxetane ring; 5-membered rings such as furan, tetrahydrofuran, oxazole, and γ-butyrolactone rings; 6-membered rings such as 4-oxo-4H-pyran, tetrahydropyran, and morpholine rings; fused rings such as benzofuran, 4-oxo-4H-chromene, and chroman rings; and bridged rings such as 3-oxatricyclo[4.3.1.1$^{4,8}$]undecan-2-one and 3-oxatricyclo[4,8]nonan-2-one rings. Non-limiting examples of the sulfur-containing heterocycles include 5-membered rings such as thiophene, thiazole, and thiadiazole rings; 6-membered rings such as 4-oxo-4H-thiopyran ring; and fused rings such as benzothiophene ring. Non-limiting examples of the nitrogen-containing heterocycles include 5-membered rings such as pyrrole, pyrrolidine, pyrazole, imidazole, and triazole rings; 6-membered rings such as pyridine, pyridazine, pyrimidine, pyrazine, piperidine, and piperazine rings; and fused rings such as indole, indoline, quinoline, acridine, naphthyridine, quinazoline, and purine rings. The heterocyclic groups may be those having a substituent or substituents. Non-limiting examples of the substituents include the substituents which the linear or branched p-valent aliphatic hydrocarbon groups may have; as well as monovalent hydrocarbon groups including alkyl (e.g., $C_1$-$C_4$ alkyl such as methyl and ethyl), alkenyl, cycloalkyl, cycloalkenyl, and aryl (e.g., phenyl and naphthyl). The nitrogen atom(s) constituting the heterocycles in the heterocyclic groups may be protected with a common protecting group. The protecting group is exemplified by alkoxy, alkoxycarbonyl, alkenyloxycarbonyl, aralkyloxycarbonyl, aralkyl, acyl, arylsulfonyl, and alkylsulfonyl.

Examples of the p-valent alicyclic hydrocarbon groups include divalent alicyclic hydrocarbon groups, trivalent alicyclic hydrocarbon groups, and tetravalent alicyclic hydrocarbon groups. Non-limiting examples of the divalent alicyclic hydrocarbon groups include cycloalkylene, cycloalkenylene, cycloalkylidene, cycloalkadienylene, and divalent polycyclic hydrocarbon groups. Non-limiting examples of the cycloalkylene include $C_3$-$C_{20}$ cycloalkylene such as cyclopropylene, cyclobutylene, cyclopentylene, and cyclohexylene, of which $C_3$-$C_{15}$ cycloalkylene is preferred. Non-limiting examples of the cycloalkenylene include cycloalkenylene corresponding to the cycloalkylene, including $C_3$-$C_{20}$ cycloalkenylene such as cyclohexenylene, of which $C_3$-$C_{15}$ cycloalkenylene is preferred. Non-limiting examples of the cycloalkylidene include cycloalkylidene corresponding to the cycloalkylene, including $C_3$-$C_{20}$ cycloalkylidene such as cyclopentylidene and cyclohexylidene, of which $C_3$-$C_{15}$ cycloalkylidene is preferred. Non-limiting examples of the cycloalkadienylene include cycloalkadienylene corresponding to the cycloalkylene, including $C_4$-$C_{20}$ cycloalkadienylene such as cyclopentadienylene, of which $C_4$-$C_{15}$ cycloalkadienylene is preferred. Non-limiting examples of the divalent polycyclic hydrocarbon groups include divalent spiro hydrocarbon groups including diyl groups derived from spiro hydrocarbons such as spiro[4.4]nonane and spiro[4.5]decane; divalent groups derived from hydrocarbon ring assemblies, including diyl groups derived from hydrocarbon ring assemblies such as bicyclopropyl; and divalent bridged hydrocarbon groups including diyl groups derived from bridged hydrocarbons such as bicyclo[2.1.0]pentane, bicyclo[3.2.1]octane, norbornane, norbornene, and adamantane. Non-limiting examples of the trivalent alicyclic hydrocarbon groups include cycloalkane-triyl and polycyclic hydrocarbon-triyl. Non-limiting examples of the tetravalent alicyclic hydrocarbon groups include cycloalkane-tetrayl and polycyclic hydrocarbon-tetrayl. The p-valent alicyclic hydrocarbon groups may be those having a substituent or substituents. Non-limiting examples of the substituents include the substituents which the linear or branched p-valent aliphatic hydrocarbon groups may have; as well as monovalent hydrocarbon groups such as alkyl (e.g., $C_1$-$C_4$ alkyl such as methyl and ethyl), alkenyl, and aryl (e.g., phenyl and naphthyl).

The p-valent aromatic hydrocarbon groups may be selected from groups each structurally corresponding to aromatic hydrocarbons, except removing hydrogen atoms in the number of "p". Non-limiting examples of the aromatic hydrocarbons include benzene, naphthalene, anthracene, 9-phenylanthracene, 9,10-diphenylanthracene, naphthacene, pyrene, perylene, biphenyl, binaphthyl, and bianthryl. The p-valent aromatic hydrocarbon groups may be those each having a substituent or substituents. Non-limiting examples of the substituent include the substituents which the linear or branched p-valent aliphatic hydrocarbon groups may have; as well as monovalent hydrocarbon groups such as alkyl (e.g., $C_1$-$C_4$ alkyl such as methyl and ethyl), alkenyl, cycloalkyl, and cycloalkenyl.

Non-limiting examples of the heteroatom-containing linkage group (divalent group) include heteroatom-containing divalent groups such as —CO—, —O—, —CO—O—, —O—CO—O—, —CO—NH—, —CO—NR$^a$— (substituted amido; where R$^a$ represents alkyl), —NH—, —NR$^b$— (R$^b$ represents alkyl), —SO—, and —SO$_2$—, where the heteroatom is exemplified by oxygen, nitrogen, and sulfur atoms; and divalent groups each including two or more of them linked to each other.

More specifically, examples of the amine (B) include, but are not limited to, amines (B1), (B2), (B3), and (B4). The amines (B1), (B2), (B3), and (B4) are compounds represented respectively by Formulae (b-1), (b-2), (b-3), and (b-4):

[Chem. 9]

(b-1)

[Chem. 10]

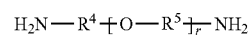
(b-2)

[Chem. 11]

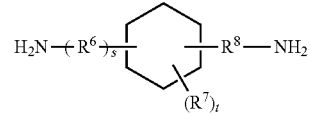
(b-3)

-continued

[Chem. 12]

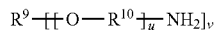
(b-4)

In Formula (b-1), $R^2$ and $R^3$ are, identically or differently in each occurrence, selected from a linear, branched, or cyclic divalent aliphatic hydrocarbon group and a divalent group including a linear or branched aliphatic hydrocarbon group or groups and an alicyclic hydrocarbon group or groups bonded to each other directly or through a heteroatom-containing linkage group (divalent group). Non-limiting examples of the linear, branched, or cyclic divalent aliphatic hydrocarbon group include the substituted or unsubstituted linear, branched, or cyclic divalent aliphatic hydrocarbon groups exemplified as $R^1$. Non-limiting examples of the divalent group including a linear or branched aliphatic hydrocarbon group or groups and an alicyclic hydrocarbon group or groups directly bonded to each other include groups exemplified as groups corresponding to an after-mentioned structural formula represented by Formula (b-3), except removing two amino groups at both ends. Non-limiting examples of the heteroatom-containing linkage group include the groups exemplified as the heteroatom-containing linkage group in $R^2$.

Among them, $R^2$ is preferably selected from linear or branched divalent aliphatic hydrocarbon groups, more preferably selected from $C_2$-$C_6$ linear or branched alkylene, and furthermore preferably selected from $C_2$-$C_4$ linear or branched alkylene (in particular, selected from ethylene, trimethylene, and propylene).

$R^3$ is, independently in each occurrence, preferably selected from linear or branched divalent aliphatic hydrocarbon groups, more preferably selected from $C_2$-$C_6$ linear or branched alkylene, and furthermore preferably selected from $C_2$-$C_4$ linear or branched alkylene (in particular, selected from ethylene, trimethylene, and propylene). When q is an integer of 2 or more, $R^3$s (two or more occurrences of $R^3$) in the brackets may be identical or different. When two or more occurrences of $R^3$ are different from each other, the structures in the brackets with q may be added (polymerized) to each other in a random form or a block form.

In Formula (b-1), q represents an integer of 0 or more. The number q is typically preferably 0 to 100, more preferably 0 to 70, furthermore preferably 1 to 30, and particularly preferably 1 to 8. The amine (B1), when having a number q of 100 or less, tends to allow the epoxy-amine adducts according to the present invention to have heat resistance and water solubility at still better levels, and tends to allow polymer composites (in particular, fiber-reinforced composites) to have heat resistance and mechanical properties (such as toughness) at still higher levels. In contrast, the amine (B1), when having a number q of 1 or more, tends to allow polymer composites using the epoxy-amine adducts according to the present invention to have better adhesion between the thermoplastic resin and the additive material.

$R^2$ and $R^3$ in Formula (b-1) may be identical or different.

The compound represented by Formula (b-1) (amine (B1)) is preferably selected from ethylenediamine (EDA), diethylenetriamine (DETA), triethylenetetramine (TETA), and tetraethylenepentamine (TEPA), and is more preferably triethylenetetramine. This is preferred from the viewpoints of adhesiveness to additive materials (in particular, reinforcement fibers), wettability, heat resistance, and water solubility of the epoxy-amine adducts according to the present invention. The compound represented by Formula (b-1) may also be selected from commercial products.

The compound represented by Formula (b-1) acts as an essential starting material to form an after-mentioned epoxy-amine adduct (1) according to the first embodiment of the present invention.

In Formula (b-2), $R^4$ is selected from a linear, branched, or cyclic divalent aliphatic hydrocarbon group and a divalent group including a linear or branched aliphatic hydrocarbon group or groups and a alicyclic hydrocarbon group or groups linked to each other. Non-limiting examples of $R^4$ include the divalent groups exemplified as $R^2$ and $R^3$.

Among them, $R^4$ is preferably selected from linear or branched divalent aliphatic hydrocarbon groups, more preferably selected from $C_2$-$C_6$ linear or branched alkylene, and furthermore preferably selected from $C_2$-$C_4$ linear or branched alkylene (in particular, selected from ethylene, trimethylene, and propylene).

In Formula (b-2), $R^5$ is, independently in each occurrence, selected from a linear, branched, or cyclic divalent aliphatic hydrocarbon group and a divalent group including a linear or branched aliphatic hydrocarbon group or groups and an alicyclic hydrocarbon or group or groups linked to each other. Non-limiting examples of $R^5$ include the divalent groups exemplified as $R^2$ and $R^3$.

Among them, $R^5$ is, independently in each occurrence, preferably selected from linear or branched divalent aliphatic hydrocarbon groups, more preferably selected from $C_2$-$C_6$ linear or branched alkylene, and furthermore preferably selected from $C_2$-$C_4$ linear or branched alkylene (in particular, selected from ethylene, trimethylene, and propylene). When r is an integer of 2 or more, $R^5$s (two or more occurrences of $R^5$) in the brackets may be identical or different. When two or more occurrences of $R^5$ are different, the structures in the brackets with r may be added (polymerized) with each other in a random form or a block form.

In Formula (b-2), r indicates the repetition number of the structural unit in the brackets with r and represents an integer of 1 or more. The number r is typically preferably 1 to 100, more preferably 1 to 70, and furthermore preferably 1 to 30. The amine (B2), when having a number r of 100 or less, tends to allow the epoxy-amine adducts according to the present invention to have heat resistance and water solubility at still better levels and to allow polymer composites (in particular, fiber-reinforced composites) to have heat resistance and mechanical properties (such as toughness) at still higher levels. In contrast, the amine (B2), when having a number r of 1 or more, tends to allow polymer composites using the epoxy-amine adducts according to the present invention to have better adhesion between thermoplastic resins and additive materials.

$R^4$ and $R^5$ in Formula (b-2) may be identical or different.

Among them, the compound represented by Formula (b-2) (amine (B2)) is preferably selected from amino-terminated (both-ends-amino-terminated) polyethylene glycols, amino-terminated polypropylene glycols, amino-terminated polybutylene glycols, and more preferably selected from amino-terminated polypropylene glycols. This is preferred for the epoxy-amine adducts according to the present invention to have satisfactory adhesiveness to additive materials (in particular, reinforcement fibers) and satisfactory wettability with thermoplastic resins. The compound represented by Formula (b-2) may also be selected from commercial products such as products available under the trade names JEFFAMINE series from Huntsman Corporation.

The compound represented by Formula (b-2) acts as an essential starting material to form an after-mentioned epoxy-amine adduct (2) according to the first embodiment of the present invention.

In Formula (b-3), $R^6$ and $R^8$ are, identically or differently in each occurrence, selected from $C_1$-$C_4$ alkylene and $C_6$-$C_{12}$ arylene. Specifically, non-limiting examples of $R^6$ and $R^8$ include the $C_1$-$C_4$ alkylene groups exemplified as $R^1$ in Formula (b); and $C_6$-$C_{12}$ arylene groups, where the arylene groups are groups corresponding to aromatic hydrocarbons, except removing two hydrogen atoms therefrom.

In Formula (b-3), s is selected from 0 and 1.

$R^7$ in Formula (b-3) represents a substituent on the specified cyclohexane ring and represents, identically or differently in each occurrence, selected from a monovalent organic group, a monovalent oxygen-containing group, a monovalent sulfur-containing group, a monovalent nitrogen-containing group, and halogen. Specific, but non-limiting examples of $R^7$ include alkyl, halogen (e.g., fluorine and chlorine), hydroxy, carboxy, alkoxy, alkenyloxy, aryloxy, aralkyloxy, acyloxy, mercapto, alkylthio, alkenylthio, arylthio, aralkylthio, alkoxycarbonyl, aryloxycarbonyl, aralkyloxycarbonyl, amino, nitro, mono- or di-alkyl-amino, acylamino, epoxy, glycidyl, acyl, cyano, isocyanato, isothiocyanato, carbamoyl, and sulfo. In Formula (b-3), t is the number of substituents ($R^7$) on the specified cyclohexane ring and represents an integer of 0 to 10. When the number t in Formula (b-3) is an integer of 2 or more, two or more occurrences of $R^7$ may be identical or different.

More specifically, non-limiting examples of the groups corresponding to the structural formula represented by Formula (b-3), except removing two amino groups at both ends include cyclohexylene-alkylene groups such as 1,2-cyclohexylene-methylene, 1,3-cyclohexylene-methylene, 1,4-cyclohexylene-methylene, cyclohexylidene-methylene, 1,2-cyclohexylene-ethylene, 1,3-cyclohexylene-ethylene, 1,4-cyclohexylene-ethylene, cyclohexylidene-ethylene, and methylene-1,5,5-trimethyl-1,3-cyclohexylene (a divalent group corresponding to isophoronediamine, except removing two amino groups); cyclohexylene-arylene groups such as 1,2-cyclohexylene-phenylene, 1,3-cyclohexylene-phenylene, and 1,4-cyclohexylene-phenylene; alkylene-cyclohexylene-alkylene groups such as methylene-1,2-cyclohexylene-methylene, methylene-1,3-cyclohexylene-methylene, and methylene-1,4-cyclohexylene-methylene; alkylene-cyclohexylene-arylene groups such as methylene-1,2-cyclohexylene-phenylene, methylene-1,3-cyclohexylene-phenylene, and methylene-1,4-cyclohexylene-phenylene; and arylene-cyclohexylene-arylene groups such as phenylene-1,2-cyclohexylene-phenylene, phenylene-1,3-cyclohexylene-phenylene, and phenylene-1,4-cyclohexylene-phenylene.

Among them, the compound represented by Formula (b-3) (amine (B3)) is preferably isophoronediamine. This is preferred from the viewpoint of heat resistance of the epoxy-amine adducts according to the present invention. The compound represented by Formula (b-3) may also be selected from commercial products such as a product available under the trade name VESTAMIN IPD from Evonik Degussa Japan Co., Ltd.

The compound represented by Formula (b-3) acts as an essential starting material to form the epoxy-amine adduct (2) according to the first embodiment of the present invention.

In Formula (b-4), u indicates the repetition number of the structural unit in the brackets with u and represents an integer of 1 or more. The number u is preferably 1 to 100, more preferably 1 to 70, and furthermore preferably 1 to 30.

In Formula (b-4), v indicates the number of the structure in the brackets with v, which is bonded to $R^9$, and represents an integer of 3 or more. The number v is preferably 3 to 6, more preferably 3 to 5, and furthermore preferably 3 or 4.

In Formula (b-4), $R^{10}$ is, independently in each occurrence, selected from a linear, branched, or cyclic divalent aliphatic hydrocarbon group and a divalent group including a linear or branched aliphatic hydrocarbon group or groups and an alicyclic hydrocarbon group or groups linked to each other. $R^{10}$ is exemplified by the divalent groups exemplified as $R^2$ and $R^3$. $R^9$ represents a v-valent organic group containing a carbon atom at the bonding site with the specified oxygen atom and is exemplified by those as with $R^1$, such as linear or branched p-valent aliphatic hydrocarbon groups and cyclic p-valent aliphatic hydrocarbon groups.

The compound represented by Formula (b-4) (amine (B4)) may also be selected from commercial products such as products available under the trade names JEFFAMINE series from Huntsman Corporation.

In particular, the amine (B) is preferably selected from the compound represented by Formula (b-1), the compound represented by Formula (b-2), and the compound represented by Formula (b-3) and is more preferably selected from the compound represented by Formula (b-1) and the compound represented by Formula (b-3). This is preferred for the epoxy-amine adducts according to the present invention to effectively offer better adhesion between thermoplastic resins and additive materials and to offer heat resistance.

The amine (B) may also be selected from other amines than the above-mentioned compounds. Examples of such other amines include aromatic amines, which are compounds containing an aromatic ring and an amino group substituted on the aromatic ring.

3. Compound I Production Method; Reaction Between Epoxide (A) and Amine (B)

The compound I can be produced by reacting the epoxide (A) and the amine (B) with each other. More specifically, the compound I is formed by the reaction between the cycloaliphatic epoxy groups of the epoxide (A) and the amino groups of the amine (B).

The epoxide (A) and the amine (B), which are starting materials to form the compound I, can be selected as appropriate in accordance with a property or properties to be imparted to the epoxy-amine adducts according to the present invention. For example, assume that importance is attached particularly on adhesiveness to additive materials (such as reinforcement fibers), wettability with resins, heat resistance, handleability, and water solubility when converted into a salt. In this case, the epoxy-amine adduct is preferably an epoxy-amine adduct (i) which is an epoxy-amine adduct obtained by the reaction between the compound represented by Formula (a) and the amine (B1) (and furthermore preferably both the amine (B1) and the amine (B3)). Also assume that importance is attached particularly on heat resistance. In this case, the epoxy-amine adduct is preferably an epoxy-amine adduct (ii) which is an epoxy-amine adduct obtained by the reaction among the compound represented by Formula (a), the amine (B2), and the amine (B3). Starting materials to form the epoxy-amine adducts (i) and (ii) may further include one or more other epoxides and/or amines in combination with the essential epoxide (A) and amine (B). For example, the starting materials to form the epoxy-amine adduct (i) may further include one or more amines (e.g., those selected from the amine (B2), the amine (B3), and the amine (B4)) in addition to the amine (B1); and the starting materials to form the epoxy-amine adduct (ii) may further include one or more other amines (e.g., those elected from the amine (B1) and the amine (B4)) in addition to the amine (B2) and the amine (B3).

Preferred compositions (formulations) of the epoxide (A) and the amine (B) to form the compound I will be described later in individual descriptions for the epoxy-amine adducts according to the first, second, third, and fourth embodiments of the present invention.

The reaction (reaction between the epoxide (A) and the amine (B)) may proceed in the presence of a solvent, or in the absence of a solvent (namely, in a solvent-free manner). The solvent is not limited, but is preferably one in which the epoxide (A) the amine (B) can be homogeneously dissolved or dispersed. More specifically, non-limiting examples of the solvent include aliphatic hydrocarbons such as hexane, heptane, and octane; alicyclic hydrocarbons such as cyclohexane; aromatic hydrocarbons such as benzene, toluene, xylenes, and ethylbenzene; halogenated hydrocarbons such as chloroform, dichloromethane, and 1,2-dichloroethane; ethers such as diethyl ether, dimethoxyethane, tetrahydrofuran, and dioxane; ketones such as acetone, methyl ethyl ketone, and methyl isobutyl ketone; esters such as methyl acetate, ethyl acetate, isopropyl acetate, and butyl acetate; amides such as N,N-dimethylformamide and N,N-dimethylacetamide; nitriles such as acetonitrile, propionitrile, and benzonitrile; alcohols such as methanol, ethanol, isopropyl alcohol, and butanol; and dimethyl sulfoxide. Each of different solvents may be used alone or in combination.

The amount of the solvent is not limited and can be set as appropriate.

The ratio of the epoxide (A) to the amine (B) to be subjected to the reaction is not limited, but is preferably controlled so that the ratio (cycloaliphatic epoxy to amino ratio; equivalence ratio) of the cycloaliphatic epoxy groups of the epoxide (A) to the amino groups of the amine (B) in the reaction is preferably 0.05 to 1.00, more preferably 0.10 to 0.95, and furthermore preferably 0.15 to 0.90. The reaction, when performed at a ratio (cycloaliphatic epoxy to amino ratio) of 0.05 or more (in particular 0.5 or more), tends to less leave unreacted amine (B) in a product. In contrast, the reaction, when performed at a ratio (cycloaliphatic epoxy to amino ratio) of 1.00 or less, tends to less leave unreacted epoxide (A) in the product.

The reaction between the epoxide (A) and the amine (B) may proceed typically by any of methods (1), (2), and (3) as follows. However, the way to allow the reaction to proceed is not limited to the methods (1) to (3).

In method (1), the epoxide (A) and the amine (B) are charged into a reactor in one batch, heated up to the reaction temperature as needed, and reacted with each other.

In the method (2), the epoxide (A) is charged into a reactor, heated up to the reaction temperature as needed, and the amine (B) is sequentially added to the epoxide (A) in the reactor to react them with each other.

In the method (3), the amine (B) is charged into a reactor, heated up to the reaction temperature as needed, and the epoxide (A) is sequentially added to the amine (B) in the reactor to react them with each other.

As used herein, the term "sequential addition" refers to continuous addition or intermittent addition. The continuous addition is an embodiment in which the addition is performed over a certain time. The intermittent addition is an embodiment in which the addition is performed in two or more installments (in two or more stages).

Among the methods (1) to (3), preferred are methods (2) and (3) because these methods enable easy control of the reaction heat and can readily form a compound I that has a high molecular weight and a high glass transition temperature. In contrast, a compound I having a low-molecular-weight is advantageous in some uses. In these cases, the reaction is preferably performed by the method (1).

The addition rate of the amine (B) in the method (2) is not limited, but may be set as appropriate within the range of 0.1 to 20 parts by weight per minute, provided that the total amount of the amine (B) to be added is 100 parts by weight. The addition rate of the epoxide (A) in the method (3) is not limited, but may be set as appropriate within the range of 0.1 to 20 parts by weight per minute, provided that the total amount of the epoxide (A) to be added is 100 parts by weight. The amine (B) or the epoxide (A) to be added may be added as intact, or in the form of a solution or dispersion prepared by dissolving or dispersing the compound in a solvent (vehicle).

Assume that two or more different amines (B) are to be used as the amine (B). In the method (2) in this case, the two or more amines (B) may be added dropwise as a mixture, or may be added dropwise independently without mixing. In the latter case, the individual amines (B) may be added dropsies simultaneously or sequentially. Assume that two or more different epoxides (A) are used in the method (3). In this case, the dropwise addition of the epoxides (A) may be performed as above.

The reaction may be performed at a temperature (reaction temperature) not limited, but preferably 30° C. to 280° C., more preferably 80° C. to 260° C., and furthermore preferably 120° C. to 250° C. The reaction, when performed at a reaction temperature of 30° C. or higher, tends to proceed at a high reaction rate and to give the compound I with better productivity. In contrast, the reaction, when performed at a reaction temperature of 280° C. or lower, tends to less cause thermal decomposition of the epoxide (A) and the amine (B) and to give the compound I in a higher yield. The reaction temperature may be controlled to be always constant (approximately constant) or to be varied stepwise or continuously.

The reaction may be performed for a time (reaction time) not limited, but preferably 0.2 to 20 hours, more preferably 0.5 to 10 hours, and furthermore preferably 2 to 8 hours. The reaction, when performed for a reaction time of 0.2 hour or longer, tends to give the compound I in a higher yield. In contrast, the reaction, when performed for a reaction time of 20 hours or shorter, tends to give the compound I with better productivity.

The reaction may be performed at any pressure, such as at normal atmospheric pressure, under pressure (under a load), or under reduced pressure. The reaction may be performed in any atmosphere not limited, where the atmosphere is exemplified by inert gas atmospheres (such as nitrogen and argon atmospheres) and an air atmosphere.

The reaction may be performed by any system not limited, where the system is exemplified by a batch system, a semi-batch system, and a continuous flow system.

The reaction (reaction between the epoxide (A) and the amine (B)) gives the compound I. After the reaction, the prepared compound I can be separated/purified by a known or common separation method such as filtration, concentration, distillation, extraction, crystallization, recrystallization, or column chromatography, or a separation method as any combination of them.

The number of the amino groups (—$NH_2$; unsubstituted amino groups) of the compound I is 2 or more, preferably 2 to 10, more preferably 2 to 4, and furthermore preferably 2 or 3. The compound I is approximately devoid of epoxy groups (in particular, cycloaliphatic epoxy groups derived from the epoxide (A)).

The amino groups (—$NH_2$; unsubstituted amino groups) in the compound I are generally, but not limitatively, located in at least one molecular chain end of the compound I (in particular, at both molecular chain ends of the compound I when the compound I is a linear compound). However, the positions of the amino groups are not limited to the above.

The compound I is formed via the reaction between the cycloaliphatic epoxy groups of the epoxide (A) and the amino groups (—$NH_2$; unsubstituted amino groups) of the amine (B), as described above. The compound I generally includes an unreacted —NH— group or groups remained in the molecule. This is probably because of poor reactivity between the cycloaliphatic epoxy groups of the epoxide (A) and —NH— groups (substituted amino groups) formed by the reaction between the amino groups and the cycloaliphatic epoxy groups. When the amine (B1) is used and when m is 1 or more, the —NH— groups in the compound I further include a —NH— group or groups derived from the amine (B1). The number of —NH— groups per molecule of the compound I is not limited, but preferably 1 to 200, more preferably 1 to 150, and furthermore preferably 2 to 100. The compound I, if being devoid of —NH— groups, may cause the epoxy-amine adducts according to the present invention to have lower reactivity, and/or may fail to sufficiently effectively contribute to better adhesion between thermoplastic resins and reinforcement fibers in fiber-reinforced composites in some uses. The compound I in this case may also cause the epoxy-amine adducts according to the present invention to have lower water solubility. The number of —NH— groups in the compound I can be calculated typically by determining the numbers of the epoxide (A) and the amine (B) constituting the compound I using a molecular weight as measured by gel permeation chromatography (GPC) and calibrated with a polystyrene standard.

In contrast, a compound (epoxy-amine adduct) obtained by the reaction typically between a glycidyl-containing epoxide and an amine (B) is generally approximately devoid of —NH— groups. This is because the glycidyl groups are extremely highly reactive with —NH— groups formed by the reaction between the glycidyl groups and the amino groups (unsubstituted amino groups).

The compound I may have a number-average molecular weight not limited, but preferably 200 to 40000, more preferably 300 to 30000, and furthermore preferably 400 to 20000. The compound I, when having a number-average molecular weight of 200 or more, tends to allow the epoxy-amine adducts according to the present invention to have somewhat high glass transition temperatures and to less cause contamination of processing devices (such as rollers). The compound I in this case also tends to allow the epoxy-amine adducts according to the present invention to have flexibility and toughness at still better levels. In addition, the compound I tends to impart excellent feel and texture and excellent handleability to reinforcement fibers (e.g., sizing-agent-coated carbon fibers) coated with the epoxy-amine adducts according to the present invention. In contrast, the compound I, when having a number-average molecular weight of 40000 or less, tends to allow the epoxy-amine adducts according to the present invention to be more readily blendable with another component and to have solvent solubility and/or water solubility at better levels. The number-average molecular weight of the compound I may be calculated using a molecular weight as measured by gel permeation chromatography (GPC) and calibrated with a polystyrene standard.

The compound I may have a glass transition temperature (Tg) not limited, but preferably −50° C. to 200° C., more preferably −40° C. to 190° C., furthermore preferably −30° C. to 180° C., and particularly preferably 20° C. to 180° C. The compound I, when having a glass transition temperature Tg of −50° C. or higher (in particular, 20° C. or higher), tends to allow polymer composites (in particular, fiber-reinforced composites) using the epoxy-amine adducts according to the present invention to have heat resistance and mechanical properties (such as toughness) at still better levels. In addition, the compound I in this case tends to impart excellent feel and texture and excellent handleability to reinforcement fibers (e.g., sizing-agent-coated carbon fibers) coated with the epoxy-amine adducts according to the present invention, while less causing contamination of processing devices (such as rollers). In contrast, the compound I, when having a glass transition temperature Tg of 200° C. or lower, tends to allow the epoxy-amine adducts according to the present invention to be more readily blendable with another component. The glass transition temperature Tg of the compound I can be measured typically by differential scanning calorimetry (DSC) and/or dynamic viscoelastic measurement. More specifically, the glass transition temperature Tg can be measured by a method disclosed in the working examples.

The compound I may have a 5% weight loss temperature ($Td_5$) not limited, but preferably 280° C. or higher, and more preferably 300° C. or higher. The compound I, when having a 5% weight loss temperature of 280° C. or higher (in particular, 300° C. or higher), tends to allow the epoxy-amine adducts according to the present invention to be applicable to processing (e.g., production of sizing-agent-coated carbon fibers) performed at higher temperatures. The 5% weight loss temperature of the compound I can be measured by TG/DTA. More specifically, the 5% weight loss temperature can be measured by a method disclosed in the working examples.

The epoxy-amine adduct (i) is an epoxy-amine adduct that includes a constitutional unit represented by Formula (I) (structural unit; constitutional unit derived from the compound represented by Formula (a)) and a constitutional unit represented by Formula (II) (constitutional unit derived from the amine (B1)) and contains amino groups at both ends. The epoxy-amine adduct (i) preferably further includes a constitutional unit represented by Formula (III). The epoxy-amine adduct (i) may further include a constitutional unit represented by Formula (IV) mentioned later. Formulae (I), (II), and (III) are expressed as follows:

[Chem. 13]

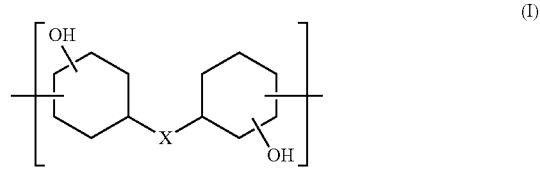

(I)

where X is as defined in Formula (a),

[Chem. 14]

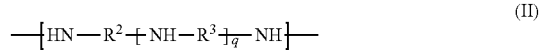

(II)

where $R^2$, $R^3$, and q are as defined in Formula (b-1),

[Chem. 15]

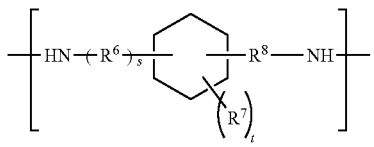

(III)

where $R^6$, $R^7$, $R^8$, s, and t are as defined in Formula (b-3).

The epoxy-amine adduct (i) is an epoxy-amine adduct that has a molecular chain including a constitutional unit or units derived from the epoxide (A) (e.g., the constitutional unit represented by Formula (I)) and a constitutional unit or units derived from the amine (B) (e.g., the constitutional unit represented by Formula (II) and/or the constitutional units represented by Formula (III)) disposed alternately. This epoxy-amine adduct contains amino groups (—$NH_2$) at both ends of the molecular chain. Namely, the epoxy-amine adduct includes the constitutional units derived from the amine (B) at both ends. The epoxide (A) and the amine (B) may be added (polymerized) in a random form or block form.

Assume that, of carbon atoms constituting each cyclohexane ring specified in Formula (I), a carbon atom to which X is bonded is designated as the "1-position" carbon atom. In this case, the nitrogen atom (—NH—) of the constitutional unit derived from the amine (B) is bonded at the 3-position carbon atom or at the 4-position carbon atom of each cyclohexane ring in the constitutional unit represented by Formula (I). When the nitrogen atom is bonded at the 3-position carbon atom, the hydroxy group (—OH) is bonded at the 4-position carbon atom of the cyclohexane ring in Formula (I). When the nitrogen atom is bonded at the 4-position carbon atom, the hydroxy group (—OH) is bonded at the 3-position carbon atom of the cyclohexane ring in Formula (I). The nitrogen atoms (or the hydroxy groups) may be bonded to the multiple (two or more) cyclohexane rings in Formula (I) at identical positions or different positions. When carbon atoms constituting the cyclohexane rings in Formula (I) are designated with the locants, Formula (I) is expressed as follows. This is the same as in the epoxy-amine adduct (ii).

[Chem. 16]

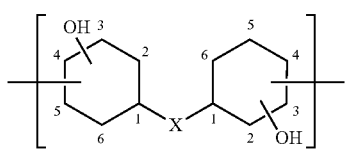

The epoxy-amine adduct (ii) is an epoxy-amine adduct that includes the constitutional unit represented by Formula (I) (constitutional unit derived from the compound represented by Formula (a)), a constitutional unit represented by Formula (IV) (constitutional unit derived from the amine (B2)), and the constitutional unit represented by Formula (III) (constitutional unit derived from the amine (B3)) and contains amino groups at both ends. Formula (IV) is expressed as follows:

[Chem. 17]

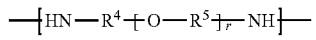

(IV)

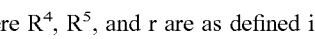

where $R^4$, $R^5$, and r are as defined in Formula (b-2).

The epoxy-amine adduct (ii) is an epoxy-amine adduct that has a molecular chain including a constitutional unit or units derived from the epoxide (A) (e.g., the constitutional unit represented by Formula (I)) and a constitutional unit or units derived from the amine (B) (e.g., the constitutional unit represented by Formula (III) and/or the constitutional unit represented by Formula (IV)) disposed alternately. The epoxy-amine adduct has amino groups (—$NH_2$) at both ends of the molecular chain, namely, includes the constitutional units derived from the amine (B) at both ends. The epoxide (A) and the amine (B) may be added (polymerized) in a random form or block form.

Next, the epoxy-amine adducts according to the first, second, third, and fourth embodiments of the present invention will be illustrated individually.

Epoxy-Amine Adduct According to First Embodiment of Present Invention

The epoxy-amine adduct according to the first embodiment of the present invention is the compound I, as described above. The compound I is as illustrated above. Of such epoxy-amine adducts according to the first embodiment of the present invention, preferred are an epoxy-amine adducts (1) and (2) both according to the first embodiment of the present invention. The epoxy-amine adduct (1) according to the first embodiment of the present invention is an epoxy-amine adduct obtained by the reaction between the epoxide (A) and the amine (B1). The epoxy-amine adduct (2) according to the first embodiment of the present invention is an epoxy-amine adduct obtained by the reaction among the epoxide (A), the amine (B2), and the amine (B3). These are preferred from the viewpoints of adhesiveness to additive materials (e.g., reinforcement fibers and fillers), wettability with thermoplastic resins, heat resistance, handleability, and water solubility. Hereinafter the epoxy-amine adducts (1) and (2) according to the first embodiment of the present invention are also generically referred to as "epoxy-amine adduct(s) according to the first embodiment of the present invention". In particular, the epoxy-amine adduct (1) according to the first embodiment of the present invention is preferred from the viewpoints of heat resistance, adhesiveness to additive materials (e.g., reinforcement fibers and fillers), and wettability with thermoplastic resins; and the epoxy-amine adduct (2) according to the first embodiment of the present invention is preferred from the viewpoint of heat resistance.

Specifically, the epoxy-amine adduct (1) according to the first embodiment of the present invention is obtained by the reaction of starting materials essentially including the epoxide (A) (preferably, the compound represented by Formula (a)) and, as the amine (B), the amine (B1) (preferably, both the amine (B1) and the amine (B3)). The epoxy-amine adduct (2) according to the first embodiment of the present invention is obtained by the reaction of starting materials essentially including the epoxide (A) (preferably, the compound represented by Formula (a)) and, as the amine (B), both the amine (B2) and the amine (B3).

The epoxy-amine adduct (1) according to the first embodiment of the present invention includes the constitutional unit derived from the amine (B1) in the molecule and thereby tends to contribute to, in particular, still higher levels of heat resistance, water solubility, adhesiveness to additive materials such as reinforcement fibers (e.g., carbon fibers) and fillers, and adhesion between thermoplastic resins and additive materials (such as reinforcement fibers) in polymer composites (such as fiber-reinforced composites). In an embodiment, the epoxy-amine adduct (1) according to the first embodiment of the present invention includes both the constitutional unit derived from the amine (B1) and the constitutional unit derived from the amine (B3) in the molecule. In particular in this embodiment, the epoxy-amine adduct tends to offer efficiently higher levels of adhesiveness to additive materials such as reinforcement fibers (e.g., carbon fibers) and fillers and to offer efficiently higher adhesion between thermoplastic resins and additive materials (such as reinforcement fibers) in polymer composites (such as fiber-reinforced composites).

The epoxy-amine adduct (2) according to the first embodiment of the present invention includes both the constitutional unit derived from the amine (B2) and the constitutional unit derived from the amine (B3) and thereby tends to offer, in particular, still more excellent heat resistance.

The epoxide (A), when serving as a starting material to form the epoxy-amine adducts according to the first embodiment of the present invention, may include the compound represented by Formula (a) in a proportion not limited, but preferably 80 weight percent or more, more preferably 90 weight percent or more, and furthermore preferably 98 to 100 weight percent, based on the total weight (100 weight percent) of the epoxide (A). The epoxide (A), when including the compound represented by Formula (a) in a proportion of 80 weight percent or more, tends to efficiently contribute to higher levels of adhesiveness to additive materials (in particular, reinforcement fibers such as carbon fibers), and adhesion between thermoplastic resins and additive materials (in particular, reinforcement fibers) in polymer composites (in particular, fiber-reinforced composites).

The amine (B), when serving as a starting material to form the epoxy-amine adduct (1) according to the first embodiment of the present invention, may include the amine (B1) in a proportion not limited, but preferably 10 weight percent or more (e.g., 10 to 100 weight percent), more preferably 20 to 90 weight percent, and furthermore preferably 50 to 80 weight percent, based on the total weight (100 weight percent) of the amine (B). The amine (B), when controlled to include the amine (B1) in a proportion within the range, tends to contribute to still higher levels of adhesiveness to additive materials (in particular, reinforcement fibers such as carbon fibers), wettability, adhesion between additive materials (in particular, reinforcement fibers) and thermoplastic resins in polymer composites (in particular, fiber-reinforced composites), and water solubility.

The amine (B), when serving as a starting material to form the epoxy-amine adduct (1) according to the first embodiment of the present invention, may include the amine (B3) in a proportion not limited, but preferably 10 to 70 weight percent, more preferably 20 to 60 weight percent, and furthermore preferably 30 to 50 weight percent, based on the total weight (100 weight percent) of the amine (B). The amine (B), when controlled to include the amine (B3) in a proportion within the range, tends to contribute to still higher heat resistance while maintaining adhesiveness to additive materials (in particular, reinforcement fibers), wettability, and adhesion between additive materials (in particular, reinforcement fibers) and thermoplastic resins in polymer composites (in particular, fiber-reinforced composites).

The amine (B), when serving as a starting material to form the epoxy-amine adduct (2) according to the first embodiment of the present invention, may include the amine (B2) in a proportion not limited, but preferably 10 to 90 weight percent, more preferably 20 to 80 weight percent, and furthermore preferably 30 to 70 weight percent, based on the total weight (100 weight percent) of the amine (B). The amine (B), when controlled to include the amine (B2) in a proportion within the range, tends to contribute to still higher levels of adhesiveness to additive materials (in particular, reinforcement fibers), wettability, and adhesion between additive materials (in particular, reinforcement fibers) and resins in polymer composites (in particular, fiber-reinforced composites).

The amine (B), when serving as a starting material to form the epoxy-amine adduct (2) according to the first embodiment of the present invention, may include the amine (B3) in a proportion not limited, but preferably 10 to 90 weight percent, more preferably 20 to 80 weight percent, and furthermore preferably 30 to 70 weight percent, based on the total weight (100 weight percent) of the amine (B). The amine (B), when controlled to include the amine (B3) in a proportion within the range, tends to contribute to still better heat resistance while maintaining adhesiveness to additive materials (in particular, reinforcement fibers), wettability, and adhesion between additive materials (in particular, reinforcement fibers) and resins in polymer composites (in particular, fiber-reinforced composites).

In an embodiment, the epoxy-amine adduct (1) according to the first embodiment of the present invention is formed from starting materials including the compound represented by Formula (a) as the epoxide (A). In particular in this embodiment, the epoxy-amine adduct (1) is an epoxy-amine adduct that includes both the constitutional unit represented by Formula (I) (structural unit; the constitutional unit derived from the compound represented by Formula (a)) and the constitutional unit represented by Formula (II) (the constitutional unit derived from the amine (B1)). This epoxy-amine adduct contains amino groups at both ends. The epoxy-amine adduct (1) according to the first embodiment of the present invention preferably further includes the constitutional unit represented by Formula (III). Specifically, the epoxy-amine adduct (1) according to the first embodiment of the present invention herein is as with the epoxy-amine adduct (i).

In an embodiment, the epoxy-amine adduct (2) according to the first embodiment of the present invention is formed from starting materials including the compound represented by Formula (a) as the epoxide (A). In particular in this embodiment, the epoxy-amine adduct (2) is an epoxy-amine adduct that includes the constitutional unit represented by Formula (I) (constitutional unit derived from the compound represented by Formula (a)), the constitutional unit represented by Formula (IV) (constitutional unit derived from the amine (B2)), and the constitutional unit represented by Formula (III) (constitutional unit derived from the amine (B3)) and contains amino groups at both ends. Specifically, the epoxy-amine adduct (2) according to the first embodiment of the present invention herein is as with the epoxy-amine adduct (ii).

The epoxy-amine adducts according to the first embodiment of the present invention can be used as intact or in the form typically of a solution or a dispersion. For example, the epoxy-amine adducts according to the first embodiment of the present invention may be used as water dispersions by dispersing the same in water using a surfactant as needed. The epoxy-amine adducts according to the first embodiment of the present invention may also be used as aqueous solutions by dissolving the same in water. The epoxy-amine adducts according to the first embodiment of the present invention can also be used as salts (e.g., carbonates, carboxylates, and hydrogencarbonates) with anions by protonating part or all of amino groups and —NH— groups in the molecule. Namely, the epoxy-amine adducts according to the first embodiment of the present invention are usable as epoxy-amine adducts according to the fourth embodiment of the present invention. The epoxy-amine adducts, when converted into salts, can, for example, effectively have higher solubility in water. The epoxy-amine adducts according to the first embodiment of the present invention, when having better water solubility, are advantageously usable particularly in or for products (e.g., water-based paints) including water or a solvent mainly containing water, where the water or the solvent acts as a medium.

Epoxy-Amine Adduct According to Second Embodiment of Present Invention

The epoxy-amine adduct according to the second embodiment of the present invention is a compound (modified compound) corresponding to the compound I, except being modified with the compound II-1 containing two or more (meth)acryloyl groups per molecule, as described above. Specifically, the epoxy-amine adduct according to the second embodiment of the present invention is a compound (adduct) obtained by the addition reaction (Michael addition reaction) between the compound I containing two or more amino groups per molecule and the compound II-1 containing two or more (meth)acryloyl groups per molecule. More specifically, the urethane-modified epoxy-amine adduct according to the present invention is an adduct between one or more molecules of the compound I and one or more molecules of the compound II-1, where the adduct is formed by Michael addition of the amino groups in the molecule of the compound I and the (meth)acryloyl groups in the molecule of the compound II-1. As used herein, the term "(meth)acryloyl" refers to acryloyl and/or methacryloyl, and the same is also true typically for "(meth)acryl(ic)" and "(meth)acrylate".

The epoxy-amine adduct according to the second embodiment of the present invention is not limited, but is preferably one derived from, as the compound II-1, a multifunctional urethane (meth)acrylate containing two or more (meth) acryloyl groups per molecule. In this preferred embodiment, the epoxy-amine adduct according to the second embodiment of the present invention is highly reactive, contributes to better adhesion between thermoplastic resins and additive materials in polymer composites, is more readily blendable with another component such as a resin, and offers particularly excellent toughness. This epoxy-amine adduct according to the second embodiment of the present invention (one in which the compound II-1 is a multifunctional urethane (meth)acrylate containing two or more (meth)acryloyl groups per molecule) is hereinafter referred to as a "urethane-modified epoxy-amine adduct according to the present invention" or simply referred to as a "urethane-modified epoxy-amine adduct" and will be illustrated below.

The compound I, when serving as a starting material to form the urethane-modified epoxy-amine adduct according to the present invention, is as described above. In particular, assume that the compound I to be used as a starting material to form the urethane-modified epoxy-amine adduct according to the present invention includes the epoxy-amine adduct (i) or the epoxy-amine adduct (ii). In this case, the urethane-modified epoxy-amine adduct according to the present invention has a high decomposition temperature, has excellent heat resistance, is thereby applicable to high-temperature processing, and can contribute to better productivity of polymer composites. In addition, this urethane-modified epoxy-amine adduct has a somewhat high glass transition temperature, less causes contamination of processing devices (such as rollers), and can be handled satisfactorily.

The epoxide (A) herein is a starting material to form the compound I (e.g., the epoxy-amine adduct (i) or (ii)) constituting the urethane-modified epoxy-amine adduct according to the present invention. The epoxide (A) may contain the compound represented by Formula (a) in a proportion not limited, but preferably 80 weight percent or more, more preferably 90 weight percent or more, and furthermore preferably 98 to 100 weight percent, based on the total weight (100 weight percent) of the epoxide (A). The epoxide (A), when containing the compound represented by Formula (a) in a proportion of 80 weight percent or more, tends to efficiently allow the urethane-modified epoxy-amine adduct to have better adhesiveness to additive materials (in particular, reinforcement fibers such as carbon fibers) and to offer better adhesion between thermoplastic resins and additive materials (in particular, reinforcement fibers) in polymer composites (in particular, fiber-reinforced composites).

The amine (B), when serving as a starting material to form the epoxy-amine adduct (i), may include the amine (B1) in a proportion not limited, but preferably 10 weight percent or more (e.g., 10 to 100 weight percent), more preferably 20 to 90 weight percent, and furthermore preferably 50 to 80 weight percent, based on the total weight (100 weight percent) of the amine (B). The amine (B), when controlled to contain the amine (B1) in a proportion within the range, tends to allow the urethane-modified epoxy-amine adduct to offer still better levels of adhesiveness to additive materials (in particular, reinforcement fibers such as carbon fibers), wettability, adhesion between additive materials (in particular, reinforcement fibers) and thermoplastic resins in polymer composites (in particular, fiber-reinforced composites), and solvent solubility.

The amine (B), when serving as a starting material to form the epoxy-amine adduct (i), may include the amine (B3) in a proportion not limited, but preferably 10 to 70 weight percent, more preferably 20 to 60 weight percent, and furthermore preferably 30 to 50 weight percent, based on the total weight (100 weight percent) of the amine (B). The amine (B), when controlled to include the amine (B3) in a proportion within the range, tends to allow the urethane-modified epoxy-amine adduct to offer still better heat resistance, while maintaining adhesiveness to additive materials (in particular, reinforcement fibers), wettability, and adhesion between additive materials (in particular, reinforcement fibers) and thermoplastic resins in polymer composites (in particular, fiber-reinforced composites).

The amine (B), when serving as a starting material to form the epoxy-amine adduct (ii), may include the amine (B2) in a proportion not limited, but preferably 10 to 90 weight percent, more preferably 20 to 80 weight percent, and furthermore preferably 30 to 70 weight percent, based on the total weight (100 weight percent) of the amine (B). The amine (B), when controlled to include the amine (B2) in a proportion within the range, tends to allow the urethane-modified epoxy-amine adduct to offer still higher levels of adhesiveness to additive materials (in particular, reinforcement fibers), wettability, and adhesion between additive materials (in particular, reinforcement fibers) and thermoplastic resins in polymer composites (in particular, fiber-reinforced composites).

The amine (B), when serving as a starting material to form the epoxy-amine adduct (ii), may include the amine (B3) in a proportion not limited, but preferably 10 to 90 weight percent, more preferably 20 to 80 weight percent, and furthermore preferably 30 to 70 weight percent, based on the total weight (100 weight percent) of the amine (B). The amine (B), when controlled to include the amine (B3) in a proportion within the range, tends to allow the urethane-modified epoxy-amine adduct to offer still better heat resistance, while maintaining adhesiveness to additive materials (in particular, reinforcement fibers), wettability, and adhesion between additive materials (in particular, reinforcement fibers) and thermoplastic resins in polymer composites (in particular, fiber-reinforced composites).

Multifunctional Urethane (Meth)Acrylate

The multifunctional urethane (meth)acrylate, which is a starting material to form the urethane-modified epoxy-amine adduct according to the present invention, is a multifunctional urethane (meth)acrylate containing two or more (meth)acryloyl groups per molecule, as described above. The multifunctional urethane (meth)acrylate is not limited, may be selected from known or common multifunctional urethane (meth)acrylates, and is exemplified by aliphatic urethane (meth)acrylates and aromatic urethane (meth)acrylates. The multifunctional urethane (meth)acrylate may have either one or both of acryloyl group(s) and methacryloyl group(s).

The number of (meth)acryloyl groups per molecule of the multifunctional urethane (meth)acrylate is not limited, as long as being 2 or more, but is preferably 2 to 6, more preferably 2 to 4, and furthermore preferably 2 or 3. The multifunctional urethane (meth)acrylate, as containing two or more (meth)acryloyl groups, tends to allow the urethane-modified epoxy-amine adduct to have a higher molecular weight and to offer excellent toughness. The multifunctional urethane (meth)acrylate, when controlled to contain 6 or less (meth)acryloyl groups, tends to allow the urethane-modified epoxy-amine adduct to have better solvent solubility and/or to be more soluble by heating, and to be more readily blendable with another component.

The multifunctional urethane (meth)acrylate may have a weight-average molecular weight (Mw) not limited, but preferably 500 to 10000, more preferably 500 to 7000, and furthermore preferably 500 to 5000. The multifunctional urethane (meth)acrylate, when having a weight-average molecular weight of 500 or more, tends to allow the urethane-modified epoxy-amine adduct to have still better levels of flexibility and toughness. In contrast, the multifunctional urethane (meth)acrylate, when having a weight-average molecular weight of 10000 or less, tends to allow the urethane-modified epoxy-amine adduct to have still better compatibility with another component and/or to have still better heat resistance. The weight-average molecular weight may be calculated from a molecular weight as measured by gel permeation chromatography (GPC) and calibrated with a polystyrene standard.

The multifunctional urethane (meth)acrylate may have a glass transition temperature (Tg) not limited, but preferably −70° C. to 30° C., more preferably −60° C. to 20° C., and furthermore preferably −55° C. to 0° C. The multifunctional urethane (meth)acrylate, when having a glass transition temperature Tg of −70° C. or higher, tends to allow the urethane-modified epoxy-amine adduct to have still better heat resistance. In contrast, the multifunctional urethane (meth)acrylate, when having a glass transition temperature Tg of 30° C. or lower, tends to allow the urethane-modified epoxy-amine adduct to have still better toughness. The glass transition temperature of the multifunctional urethane (meth)acrylate can be measured by a similar procedure to that in the glass transition temperature of the compound I.

The multifunctional urethane (meth)acrylate may be prepared by any of known or common methods without limitation, but is generally prepared by reacting a polyol (X), a polyisocyanate (Y), and a hydroxy-containing (meth)acrylate (Z) with one another, or by reacting a polyisocyanate (Y) and a hydroxy-containing (meth)acrylate (Z) with each other.

The polyol (X) is a compound containing two or more hydroxy groups per molecule. Each of different polyols may be used alone or in combination as the polyol (X). The polyol (X) may be selected from known or common polyols and are exemplified by, but not limited to, diols such as ethylene glycol, propylene glycol, trimethylene glycol, tetramethylene glycol, 1,3-butanediol, 1,4-butanediol, 1,6-hexanediol, neopentyl glycol, diethylene glycol, triethylene glycol, dipropylene glycol, polyoxy-$C_2$-$C_4$-alkylene glycols (e.g., polyethylene glycols, polypropylene glycols, and polyoxytetramethylene glycols), bisphenol-A and alkylene oxide adducts thereof, bisphenol-F and alkylene oxide adducts thereof, hydrogenated bisphenol-A and alkylene oxide adducts thereof, hydrogenated bisphenol-F and alkylene oxide adducts thereof, cyclohexanediol, cyclohexanedimethanol, tricyclodecanedimethanol, isosorbide, xylene glycols, polyester diols, polyether diols, and polycarbonate diols; and polyols containing three or more hydroxy groups per molecule, such as glycerol, 1,1,1-tris(hydroxymethyl)propane, D-sorbitol, xylitol, D-mannitol, D-mannite, diglycerol, polyglycerols, trimethylolethane, trimethylolpropane, pentaerythritol, polyether polyols, polyester polyols, polycarbonate polyols, acrylic polyols, epoxy-polyols, natural oil polyols, silicone polyols, fluorine-containing polyols, and polyolefin polyols.

The polyisocyanate (Y) is a compound containing two or more isocyanate groups per molecule. Each of different polyisocyanates may be used alone or in combination as the polyisocyanate (Y). The polyisocyanate (Y) are not limited and may be selected from known or common polyisocyanates. Non-limiting examples of such polyisocyanates include diisocyanates such as 1,6-hexane diisocyanate, 2,2,4-trimethylhexamethylene diisocyanate, 2,4,4-trimethylhexamethylene diisocyanate, xylylene diisocyanates, diphenylmethane diisocyanate, and isophorone diisocyanate; and diisocyanate trimers such as biuret trimers, adduct trimers, and isocyanurate compounds (e.g., an isocyanurate compound derived from 1,6-hexamethylene diisocyanate and an isocyanurate compound derived from 2,6-hexamethylene diisocyanate).

The hydroxy-containing (meth)acrylate (Z) is a compound containing one or more (in particular, one) hydroxy groups per molecule and containing one or more (in particular, one) (meth)acryloyl groups per molecule. Each of different hydroxy-containing (meth)acrylates may be used alone or in combination as the hydroxy-containing (meth)acrylate (Z). The hydroxy-containing (meth)acrylate (Z) are not limited and may be selected from known or common hydroxy-containing (meth)acrylates. Non-limiting examples of such hydroxy-containing (meth)acrylates include 2-hydroxyethyl (meth)acrylate, 2-hydroxypropyl (meth)acrylate, 4-hydroxybutyl (meth)acrylate, pentaerythritol tri(meth)acrylate, dipentaerythritol penta(meth)acrylates, cyclohexanedimethanol (meth)acrylate, and epoxy acrylates (e.g., bisphenol-A diglycidyl diacrylate); and hydrogenated derivatives derived from them.

The reaction among the polyol (X), the polyisocyanate (Y), and the hydroxy-containing (meth)acrylate (Z) may be performed by known or common methods, such as the methods described typically in JP-A No. H07-157531, JP-A No. 2000-95837, JP-A No. 2002-145936, and JP-A No. 2011-52227.

Of such multifunctional urethane (meth)acrylates, preferred are those including a constitutional unit derived from a polyoxy-$C_2$-$C_4$ alkylene glycol as the constitutional unit derived from the polyol (X). The polyoxy-$C_2$-$C_4$ alkylene glycol is exemplified by polyethylene glycols, polypropylene glycols, and polyoxytetramethylene glycols. These are preferred from the viewpoint of toughness of the urethane-modified epoxy-amine adduct. The multifunctional urethane (meth)acrylate of this category may be selected typically from products available under the trade names EBECRYL 230 and EBECRYL 270.

The multifunctional urethane (meth)acrylate may also be selected from commercial products, which are exemplified by, but not limited to, bifunctional urethane (meth)acrylates (urethane di(meth)acrylates) such as products available under the trade names EBECRYL 210, EBECRYL 215, EBECRYL 6202, EBECRYL 230, EBECRYL 244, EBECRYL 245, EBECRYL 270, EBECRYL 280/15IB, EBECRYL 2002, EBECRYL 8307, EBECRYL 8411, EBECRYL 8804, EBECRYL 8807, EBECRYL 9227EA, KRM 7735, EBECRYL 284, EBECRYL 285, EBECRYL 4835, EBECRYL 4858, EBECRYL 4883, EBECRYL 6700, EBECRYL 8402, and EBECRYL 9270 (each from DAICEL-ALLNEX LTD.) the trade names UX-2201 and UX-8101 (each supplied by Nippon Kayaku Co., Ltd.) and the trade names UF-8001, UF-8003, UX-6101, and UX-8101 (each supplied by Kyoeisha Chemical Co., Ltd.); trifunctional urethane (meth)acrylates such as products available under the trade names EBECRYL 204, EBECRYL 205, EBECRYL 254, EBECRYL 264, EBECRYL 265, EBECRYL 1259, EBECRYL 9260, KRM 8296, EBECRYL 294/25 HD, EBECRYL 4820, EBECRYL 8311, and EBECRYL 8701 (each from DAICEL-ALLNEX LTD.); and tetrafunctional or higher urethane (meth)acrylates such as products available under the trade names EBECRYL 220, KRM 8200, KRM 8200AE, EBECRYL 5129, EBECRYL 8210, EBECRYL 8301, KRM 8452, EBECRYL 8405, EBECRYL 1290k, and KRM 7804 (each from DAICEL-ALLNEX LTD.).

Urethane-Modified Epoxy-Amine Adduct Production Method: Addition Reaction Between Compound I and Multifunctional Urethane (meth)acrylate The urethane-modified epoxy-amine adduct according to the present invention is obtained by subjecting the compound I and the multifunctional urethane (meth)acrylate to an addition reaction, as described above. In the addition reaction, the —NH— group(s) in the compound I does not react with the (meth)acryloyl groups in the multifunctional urethane (meth)acrylate.

The reaction may proceed in the presence of a solvent, or in the absence of a solvent (namely, in a solvent-free manner). The solvent is not limited, and may be selected typically from those exemplified in the reaction between the epoxide (A) and the amine (B). Among them, alcohols are preferred. Each of different solvents may be used alone or in combination. The amount of the solvent in the reaction is not limited and can be set as appropriate.

The ratio of the multifunctional urethane (meth)acrylate to the compound I to be subjected to the reaction (Michael addition reaction) is not limited, but is preferably controlled so that the ratio (acryloyl and methacryloyl to amino ratio; equivalence ratio) of the (meth)acryloyl groups (acryloyl groups and methacryloyl groups) of the multifunctional urethane (meth)acrylate to the amino groups (—$NH_2$) of the compound I in the reaction is 0.05 to 1.00, more preferably 0.10 to 0.95, and furthermore preferably 0.15 to 0.90. The reaction, when performed at a ratio (acryloyl and methacryloyl to amino ratio) of 0.05 or more (in particular, 0.5 or more), tends to less leave unreacted compound I in the product. In contrast, the reaction, when performed at a ratio acryloyl and methacryloyl to amino ratio) of 1.00 or less, tends to less leave unreacted multifunctional urethane (meth)acrylate in the product.

The reaction may proceed by known or common methods without limitation. For example, the reaction may be performed by charging both the compound I and the multifunctional urethane (meth)acrylate into a reactor in one batch, or may be performed by charging one of the compound I and the multifunctional urethane (meth)acrylate into a reactor, and adding the other to the one in the reactor (typically via the sequential addition). In particular, the reaction is preferably performed by previously charging the compound I (preferably a solution of the compound I) into the reactor, and sequentially adding the multifunctional urethane (meth)acrylate thereto. This is preferred for obtaining a urethane-modified epoxy-amine adduct having a more uniform composition (formulation).

The temperature (reaction temperature) in the reaction is not limited and is selectable as appropriate within the range typically of 0° C. to 200° C. (e.g., 15° C. to 100° C.). The time (reaction time) to perform the reaction is also not limited and is selectable as appropriate within the range typically of 0.2 to 20 hours (e.g., 1 to 8 hours).

The reaction may be performed at any pressure, such as at normal atmospheric pressure, under pressure (under a load), or under reduced pressure. The reaction may be performed in any atmosphere not limited, where the atmosphere is exemplified by inert gas atmospheres (such as nitrogen and argon atmospheres) and an air atmosphere.

The reaction may be performed by any system not limited, where the system is exemplified by a batch system, a semi-batch system, and a continuous flow system.

The reaction gives the urethane-modified epoxy-amine adduct according to the present invention. After the reaction, the urethane-modified epoxy-amine adduct according to the present invention can be separated/purified by a known or common separation method such as filtration, concentration, distillation, extraction, crystallization, recrystallization, or column chromatography, or a separation method as any combination of them.

The urethane-modified epoxy-amine adduct according to the present invention has a structure formed by the addition reaction between the compound I and the multifunctional urethane (meth)acrylate. The urethane-modified epoxy-amine adduct generally has a molecular chain including constitutional units derived from the compound I and constitutional units derived from the multifunctional urethane (meth)acrylate disposed alternately. The urethane-modified epoxy-amine adduct according to the present invention may contain an amino group (—$NH_2$; unsubstituted amino group) or not, but preferably contains typically 2 to 10, more preferably 2 to 4, and furthermore preferably 2 or 3 amino groups.

The urethane-modified epoxy-amine adduct according to the present invention contains a —NH— group or groups (substituted amino groups) in the molecule, where the —NH— groups are derived from the compound I. The number of —NH— groups per molecule of the urethane-modified epoxy-amine adduct according to the present invention is not limited, but is preferably 1 to 200, more preferably 1 to 150, and furthermore preferably 2 to 100. The urethane-modified epoxy-amine adduct according to the present invention, as containing —NH— group(s) in the molecule, is highly reactive and can contribute to better adhesion between thermoplastic resins and additive materials in polymer composites. The number of —NH— groups in the urethane-modified epoxy-amine adduct according to the present invention can be calculated by a similar method to the method for calculating the number of —NH— groups in the compound I. The presence of unreacted, residual —NH— group(s) in the urethane-modified epoxy-amine adduct according to the present invention effectively allows the urethane-modified epoxy-amine adduct to have thermoplasticity, to have excellent solvent solubility, and to be more readily blendable with another component.

The urethane-modified epoxy-amine adduct according to the present invention may have a number-average molecular weight not limited, but preferably 600 to 80000, more preferably 800 to 60000, and furthermore preferably 1000 to 40000. The urethane-modified epoxy-amine adduct, when having a number-average molecular weight of 600 or more, tends to have still better levels of toughness and flexibility, to have a somewhat high glass transition temperature, and to less cause contamination of processing devices (such as rollers). In addition, this urethane-modified epoxy-amine adduct tends to impart excellent feel and texture and excellent handleability to reinforcement fibers (e.g., sizing-agent-coated carbon fibers) coated with the urethane-modified epoxy-amine adduct. In contrast, the urethane-modified epoxy-amine adduct, when having a number-average molecular weight of 80000 or less, may be more readily blendable with another component and may have still better solvent solubility. The number-average molecular weight of the urethane-modified epoxy-amine adduct according to the present invention may be calculated using a molecular weight as measured by gel permeation chromatography (GPC) and calibrated with a polystyrene standard.

The urethane-modified epoxy-amine adduct according to the present invention may have a glass transition temperature (Tg) not limited, but preferably −50° C. to 150° C., more preferably −40° C. to 120° C., furthermore preferably −30° C. to 100° C., and particularly preferably 20° C. to 80° C. The urethane-modified epoxy-amine adduct, when having a glass transition temperature Tg of −50° C. or higher (in particular, 20° C. or higher), tends to allow polymer composites (in particular, fiber-reinforced composites) to have still better levels of heat resistance and mechanical properties (such as toughness). In addition, this urethane-modified epoxy-amine adduct tends to less cause contamination of processing devices (such as rollers) and to impart excellent feel and texture and excellent handleability to reinforcement fibers (e.g., sizing-agent-coated carbon fibers) coated with the urethane-modified epoxy-amine adduct. In contrast, the urethane-modified epoxy-amine adduct, when having a glass transition temperature Tg of 200° C. or lower, may be more readily blendable with another component. The glass transition temperature of the urethane-modified epoxy-amine adduct according to the present invention can be measured by a method similar to that in the compound I and, specifically, can be measured by a method disclosed in the working examples. When the urethane-modified epoxy-amine adduct according to the present invention has two or more glass transition temperatures, at least one (more preferably all) of the glass transition temperatures) is preferably controlled within the range.

The urethane-modified epoxy-amine adduct according to the present invention may have a 5% weight loss temperature ($Td_5$) not limited, but preferably 280° C. or higher, and more preferably 300° C. or higher. The urethane-modified epoxy-amine adduct, when having a 5% weight loss temperature of 280° C. or higher (in particular, 300° C. or higher), tends to be applicable to processing (e.g., sizing-agent-coated carbon fiber production) performed at still higher temperatures. The 5% weight loss temperature of the urethane-modified epoxy-amine adduct according to the present invention can be measured by TG/DTA and, specifically, can be measured by a method disclosed in the working examples.

The urethane-modified epoxy-amine adduct according to the present invention can be used as intact or in the form typically of a solution or a dispersion. For example, the urethane-modified epoxy-amine adduct according to the present invention may be used as a water dispersion by dispersing the same in water using a surfactant as needed. The urethane-modified epoxy-amine adduct according to the present invention may also be used as an aqueous solution by dissolving the same in water. The urethane-modified epoxy-amine adduct according to the present invention is usable as a salt (e.g., carbonate or carboxylate) with an anion by protonating part or all of amino groups and —NH— groups in the molecule. The urethane-modified epoxy-amine adduct, when converted into a salt, can effectively have, for example, higher solubility in water. The urethane-modified epoxy-amine adduct according to the present invention, when having better water solubility, is advantageously usable particularly in or for products (e.g., water-based paints) including water or a solvent mainly containing water, where water or the solvent serves as a medium.

Epoxy-Amine Adduct According to Third Embodiment of Present Invention

The epoxy-amine adduct according to the third embodiment of the present invention is a compound (modified compound) corresponding to the compound I, except being modified with the lactone II-2, as described above. The epoxy-amine adduct according to the third embodiment of the present invention is also referred to as a "lactone-modified epoxy-amine adduct according to the present invention" or also simply referred to as a "lactone-modified epoxy-amine adduct" and will be illustrated below.

Specifically, the lactone-modified epoxy-amine adduct according to the present invention is a compound (lactone adduct) obtained by a ring-opening addition reaction of the lactone II-2 to the compound I containing one or more active hydrogen atoms per molecule. More specifically, the lactone-modified epoxy-amine adduct according to the present invention is an adduct between one molecule of the compound I and one or more molecules of the lactone II-2, where the adduct is formed by a ring-opening addition reaction of the lactone II-2, and where the reaction is initiated at the active hydrogen atom(s) in the molecule of the compound I. As used herein, the term "ring-opening addition reaction" refers to and includes both a ring-opening addition reaction of one molecule of the lactone II-2 and a ring-opening addition polymerization of two or more molecules of the lactone II-2.

In particular, the compound I to constitute the lactone-modified epoxy-amine adduct according to the present invention is an epoxy-amine adduct obtained by the reaction between the epoxide (A) and the amine (B). The compound I contains hydroxy groups (hydroxy groups formed by the reaction between cycloaliphatic epoxy groups and amino groups) and two or more amino groups per molecule.

Hydrogen atoms in the amino groups and/or hydroxy groups (either one or both of amino group(s) and hydroxy group(s)) may act as active hydrogen atoms for the ring-opening addition reaction of the lactone. Specifically, the lactone-modified epoxy-amine adduct according to the present invention is an adduct between one molecule of the compound I and one or more molecules of the lactone II-2, where the adduct is formed by the ring-opening addition reaction of the lactone II-2, and where the reaction is initiated at the amino group(s) and/or hydroxy group(s) in the molecule of the compound I.

The compound I, which serves as a starting material to form the lactone-modified epoxy-amine adduct according to the present invention, is as described above. In particular, assume that the epoxy-amine adduct (i) or the epoxy-amine adduct (ii) is used as the compound I, which serves as a starting material to form the lactone-modified epoxy-amine adduct according to the present invention. In this case, the resulting lactone-modified epoxy-amine adduct according to the present invention has a high decomposition temperature, has excellent heat resistance, is thereby applicable to high-temperature processing, and can contribute to better productivity of polymer composites. In addition, this lactone-modified epoxy-amine adduct has a somewhat high glass transition temperature, less causes contamination of processing devices (such as rollers), and can be handled satisfactorily.

The number of hydroxy groups of the compound I, when serving as a starting material to form the lactone-modified epoxy-amine adduct according to the present invention, is determined mainly depending on the numbers of the epoxide (A) and the amine (B) to constitute the compound I and is generally 2 or more. This is because one hydroxy group is formed by the reaction between one cycloaliphatic epoxy group and one amino group. The number of hydroxy groups per molecule is preferably 2 to 200, more preferably 3 to 150, and furthermore preferably 5 to 100.

Herein, the epoxide (A) serves a starting material to form the compound I (e.g., the epoxy-amine adduct (i) or (ii)) to constitute the lactone-modified epoxy-amine adduct according to the present invention. This epoxide (A) may include the compound represented by Formula (a) in a proportion not limited, but preferably 80 weight percent or more, more preferably 90 weight percent or more, and furthermore preferably 98 to 100 weight percent, based on the total weight (100 weight percent) of the epoxide (A). The epoxide (A), when including the compound represented by Formula (a) in a proportion of 80 weight percent or more, tends to allow the lactone-modified epoxy-amine adduct to efficiently have higher levels of adhesiveness to additive materials (in particular, reinforcement fibers such as carbon fibers) and adhesion between thermoplastic resins and additive materials (in particular, reinforcement fibers) in polymer composites (in particular, fiber-reinforced composites).

The amine (B), when serving as a starting material to form the epoxy-amine adduct (i), may include the amine (B1) in a proportion not limited, but preferably 10 weight percent or more (e.g., 10 to 100 weight percent), more preferably 20 to 90 weight percent, and furthermore preferably 50 to 80 weight percent, based on the total weight (100 weight percent) of the amine (B). The amine (B), when controlled to include the amine (B1) in a proportion within the range, tends to allow the lactone-modified epoxy-amine adduct to have still higher levels of adhesiveness to additive materials (in particular, reinforcement fibers such as carbon fibers), wettability, adhesion between additive materials (in particular, reinforcement fibers) and thermoplastic resins in polymer composites (in particular, fiber-reinforced composites), and solvent solubility.

The amine (B), when serving as a starting material to form the epoxy-amine adduct (i), may include the amine (B3) in a proportion not limited, but preferably 10 to 70 weight percent, more preferably 20 to 60 weight percent, and furthermore preferably 30 to 50 weight percent, based on the total weight (100 weight percent) of the amine (B). The amine (B), when controlled to include the amine (B3) in a proportion within the range, tends to allow the lactone-modified epoxy-amine adduct to have still better heat resistance while maintaining adhesiveness to additive materials (in particular, reinforcement fibers), wettability, and adhesion between additive materials (in particular, reinforcement fibers) and thermoplastic resins in polymer composites (in particular, fiber-reinforced composites).

The amine (B), when serving as a starting material to form the epoxy-amine adduct (ii), may include the amine (B2) in a proportion not limited, but preferably 10 to 90 weight percent, more preferably 20 to 80 weight percent, and furthermore preferably 30 to 70 weight percent, based on the total weight (100 weight percent) of the amine (B). The amine (B), when controlled to include the amine (B2) in a proportion within the range, tends to allow the lactone-modified epoxy-amine adduct to offer still higher levels of adhesiveness to additive materials (in particular, reinforcement fibers), wettability, and adhesion between additive materials (in particular, reinforcement fibers) and thermoplastic resins in polymer composites (in particular, fiber-reinforced composites).

The amine (B), when serving as a starting material to form the epoxy-amine adduct (ii), may include the amine (B3) in a proportion not limited, but preferably 10 to 90 weight percent, more preferably 20 to 80 weight percent, and furthermore preferably 30 to 70 weight percent, based on the total weight (100 weight percent) of the amine (B). The amine (B), when controlled to include the amine (B3) in a proportion within the range, tends to allow the lactone-modified epoxy-amine adduct to offer still better heat resistance while maintaining adhesiveness to additive materials (in particular, reinforcement fibers), wettability, and adhesion between additive materials (in particular, reinforcement fibers) and thermoplastic resins in polymer composites (in particular, fiber-reinforced composites).

Lactone II-2

The lactone II-2, which serves as a starting material to form the lactone-modified epoxy-amine adduct according to the present invention, may be selected from known or common lactones and is not limited. Non-limiting examples of the such lactones include β-propiolactone, β-butyrolactone, γ-butyrolactone, δ-valerolactone, γ-valerolactone, ε-caprolactone, γ-caprolactone, δ-caprolactone, ζ-enantholactone, and η-caprylolactone; and 4-methylcaprolactone and other derivatives of these lactones, except being substituted with one or more alkyl groups (such as methyl groups). Each of different lactones may be used alone or in combination as the lactone II-2, which serves as a starting material to form the lactone-modified epoxy-amine adduct according to the present invention. Among them, the lactone II-2 is preferably ε-caprolactone. The lactone-modified epoxy-amine adduct according to the present invention has a structure formed by the ring-opening addition reaction of the lactone II-2 and thereby offers excellent toughness.

Lactone-Modified Epoxy-Amine Adduct Production Method: Ring-Opening Addition Reaction of Lactone II-2 to Compound I The lactone-modified epoxy-amine adduct according to the present invention is obtained by the ring-opening addition reaction of the lactone II-2 to the compound I, as described above. The —NH— group(s) in the compound I can also act as a starting point of the ring-opening addition reaction of the lactone II-2, but the lactone-modified epoxy-amine adduct according to the present invention generally includes —NH— group(s) as remained. This is because the —NH— groups have poor reactivity typically with amino groups and hydroxy groups.

The reaction can proceed by known or common methods (known or common methods for ring-opening addition reaction of a lactone to a compound containing amino group(s) and/or hydroxy group(s) in the molecule). In general, the reaction may proceed by heating the compound I and the lactone II-2. The reaction may be performed using any other components such as promoters as needed.

The reaction may proceed in the presence of a solvent, or in the absence of a solvent (namely, in a solvent-free manner). The solvent is not limited and may be selected typically from those exemplified for the reaction between the epoxide (A) and the amine (B). Each of different solvents may be used alone or in combination. The amount of the solvent in the reaction is not limited and can be set as appropriate. The reaction, when performed in the absence of a solvent, can be efficiently performed by heating to dissolve the compound I in the lactone II-2 even when the compound I is solid.

The proportions of the compound I and the lactone II-2 to be subjected to the reaction (reaction between the compound I and the lactone II-2) are not limited, but may be such that the lactone II-2 is used in a proportion of preferably 1 to 300 moles, more preferably 2 to 200 moles, and furthermore preferably 5 to 100 moles, per mole of amino groups of the compound I. In terms of weight ratio, the amount (total amount) of the lactone II-2 is preferably 3 to 200 parts by weight, more preferably 10 to 150 parts by weight, and furthermore preferably 20 to 100 parts by weight, per 100 parts by weight of the compound I. The reaction, when controlled to use the compound I and the lactone II-2 in proportions within the range, tends to allow the lactone-modified epoxy-amine adduct to have still higher levels of toughness and flexibility, while maintaining its glass transition temperature at a somewhat high level and maintaining adhesion between thermoplastic resins and additive materials.

The reaction may be performed by any operation not limited. For example, the reaction may be performed by charging the compound I and the lactone II-2 to a reactor in one batch; or by previously charging one of the compound I and the lactone II-2 into a reactor, and adding the other to the one in the reactor (typically via the sequential addition).

The temperature (reaction temperature) in the reaction is not limited and is selectable as appropriate within the range of typically 80° C. to 250° C. (e.g., 100° C. to 200° C.). The time (reaction time) to perform the reaction is also not limited and is selectable as appropriate within the range of typically 0.2 to 20 hours (e.g., 1 to 8 hours).

The reaction may be performed at any pressure, such as at normal atmospheric pressure, under pressure (under a load), or under reduced pressure. The reaction may also be performed in any atmosphere not limited, where the atmosphere is exemplified by inert gas atmospheres (such as nitrogen and argon atmospheres) and an air atmosphere.

The reaction may be performed by any system not limited, where the system is exemplified by a batch system, a semi-batch system, and a continuous flow system.

The reaction gives the lactone-modified epoxy-amine adduct according to the present invention. After the reaction, the lactone-modified epoxy-amine adduct according to the present invention can be separated/purified by a known or common separation method such as filtration, concentration, distillation, extraction, crystallization, recrystallization, or column chromatography, or a separation method as any combination of them.

The lactone-modified epoxy-amine adduct according to the present invention has a structure formed by ring-opening addition of the lactone II-2, where the ring-opening addition is initiated from amino group(s) (—NH$_2$; unsubstituted amino group(s)) and/or hydroxy group(s) of the compound I. The lactone-modified epoxy-amine adduct generally has a structure in which a molecular chain formed by the ring-opening addition of the lactone II-2 is bonded to the amino and/or hydroxy moiety of the compound I. In the lactone-modified epoxy-amine adduct according to the present invention, the lactone II-2 may be added, via ring-opening addition, to all or only part of amino groups and hydroxy groups of the compound I. The molecular chain(s) of the lactone-modified epoxy-amine adduct according to the present invention may contain any terminal group not limited, but generally contains hydroxy terminal group(s), where the molecular chain(s) is formed by ring-opening addition of the lactone II-2. The hydroxy group may be converted into another functional group by techniques commonly used in organic syntheses. The lactone-modified epoxy-amine adduct according to the present invention may contain amino group(s) or not, and may contain hydroxy group(s) or not.

The lactone-modified epoxy-amine adduct according to the present invention contains a —NH— group or groups (substituted amino groups) derived from the compound I, and a —NH— group or groups formed by the ring-opening addition reaction of the lactone II-2 to the compound I. The number of —NH— groups per molecule of the lactone-modified epoxy-amine adduct according to the present invention is not limited, but preferably 1 to 200, more preferably 1 to 150, and furthermore preferably 2 to 100. The lactone-modified epoxy-amine adduct according to the present invention, as containing —NH— groups in the molecule, is highly reactive and contributes to better adhesion between thermoplastic resins and additive materials in polymer composites. The number of —NH— groups in the lactone-modified epoxy-amine adduct according to the present invention can be calculated by a method similar to that in the calculation of the number of —NH— groups in the compound I. The presence of —NH— groups, which remain as unreacted (unreacted with the epoxide (A)), in the lactone-modified epoxy-amine adduct according to the present invention effectively allows the lactone-modified epoxy-amine adduct to have thermoplasticity and excellent solvent solubility and to be readily blendable with another component such as a resin.

The lactone-modified epoxy-amine adduct according to the present invention may have a number-average molecular weight not limited, but preferably 600 to 80000, more preferably 800 to 60000, and furthermore preferably 1000 to 40000. The lactone-modified epoxy-amine adduct, when having a number-average molecular weight of 600 or more, tends to have still better levels of toughness and flexibility, to have a somewhat high glass transition temperature, and to less cause contamination of processing devices (such as rollers). This lactone-modified epoxy-amine adduct also tends to impart excellent feel and texture and excellent handleability to reinforcement fibers (e.g., sizing-agent-coated carbon fibers) coated with the lactone-modified epoxy-amine adduct. In contrast, the lactone-modified epoxy-amine adduct, when having a number-average molecular weight of 80000 or less, may be more readily blendable with another component and may have still better solvent solubility. The number-average molecular weight of the lactone-modified epoxy-amine adduct according to the present invention may be calculated using a molecular weight as measured by gel permeation chromatography (GPC) and calibrated with a polystyrene standard.

The lactone-modified epoxy-amine adduct according to the present invention may have a glass transition temperature (Tg) not limited, but preferably −50° C. to 150° C., more preferably −40° C. to 120° C., furthermore preferably −30° C. to 100° C., and particularly preferably 20° C. to 80° C. The lactone-modified epoxy-amine adduct, when having a glass transition temperature Tg of −50° C. or higher (in particular, 20° C. or higher), tends to allow polymer composites (in particular, fiber-reinforced composites) to have still better levels of heat resistance and mechanical properties (such as toughness). This lactone-modified epoxy-amine adduct also tends to less cause contamination of processing devices (such as rollers) and to impart excellent feel and texture and excellent handleability to reinforcement fibers (e.g., sizing-agent-coated carbon fibers) coated with the lactone-modified epoxy-amine adduct according to the present invention. In contrast, the lactone-modified epoxy-amine adduct, when having a glass transition temperature Tg of 150° C. or lower, may be more readily blendable with another component. The glass transition temperature of the lactone-modified epoxy-amine adduct according to the present invention can be measured by a procedure similar to that for the glass transition temperature Tg of the compound I and, specifically, can be measured by the method disclosed in the working examples.

The lactone-modified epoxy-amine adduct according to the present invention may have a 5% weight loss temperature ($Td_5$) not limited, but preferably 280° C. or higher, and more preferably 290° C. or higher. The lactone-modified epoxy-amine adduct, when having a 5% weight loss temperature of 280° C. or higher (in particular, 290° C. or higher), tends to be applicable to processing (e.g., sizing-agent-coated carbon fiber production) performed at still higher temperatures. The 5% weight loss temperature of the lactone-modified epoxy-amine adduct according to the present invention can be measured by TG/DTA and, specifically, can be measured by the method disclosed in the working examples.

The lactone-modified epoxy-amine adduct according to the present invention is usable as intact or in the form typically of a solution or a dispersion. For example, the lactone-modified epoxy-amine adduct according to the present invention may be used as a water dispersion by dispersing the same in water using a surfactant as needed. The lactone-modified epoxy-amine adduct according to the present invention may also be used as an aqueous solution by dissolving the same in water. The lactone-modified epoxy-amine adduct according to the present invention is also usable as a salt (e.g., carbonate or carboxylate) with an anion by protonating part or all of amino groups and —NH— groups in the molecule with an acid. The lactone-modified epoxy-amine adduct, when converted into a salt, can effectively have, for example, better solubility in water. The lactone-modified epoxy-amine adduct according to the present invention, when having better water solubility, is advantageously usable particularly in or for products (e.g., water-based paints) including water or a solvent mainly containing water, where water or the solvent serves as a medium.

Epoxy-Amine Adduct According to Fourth Embodiment of Present Invention

The epoxy-amine adduct according to the fourth embodiment of the present invention is a salt of the compound I, as described above. Hereinafter the epoxy-amine adduct according to the fourth embodiment of the present invention is also referred to as an "epoxy-amine adduct salt according to the present invention" and will be illustrated below.

The epoxy-amine adduct salt according to the present invention is a salt between the compound I and an acid II-3 (an acid salt of an amine).

The compound I, which serves as a starting material to form the epoxy-amine adduct salt according to the present invention, is as described above. Assume that the epoxy-amine adduct (i) or the epoxy-amine adduct (ii) is used as the compound I, which serves as a starting material to form the epoxy-amine adduct salt according to the present invention. In particular in this case, the epoxy-amine adduct (salt) has a high decomposition temperature, offers excellent heat resistance, is applicable to high-temperature processing, and can contribute to better productivity of polymer composites. In addition, the epoxy-amine adduct has a somewhat high glass transition temperature, less causes contamination of processing devices (such as rollers), and can be handled satisfactorily.

In this embodiment, the epoxide (A) serves as a starting material to form the compound I (e.g., the epoxy-amine adduct (i) or (ii)), which in turn constitutes the epoxy-amine adduct salt according to the present invention. The epoxide (A) may include the compound represented by Formula (a) in a proportion not limited, but preferably 80 weight percent or more, more preferably 90 weight percent or more, and furthermore preferably 98 to 100 weight percent, based on the total weight (100 weight percent) of the epoxide (A). The epoxide (A), when including the compound represented by Formula (a) in a proportion of 80 weight percent or more, tends to allow the epoxy-amine adduct to efficiently offer higher levels of adhesiveness to additive materials (in particular, reinforcement fibers such as carbon fibers) and adhesion between thermoplastic resins and additive materials (in particular, reinforcement fibers) in polymer composites (in particular, fiber-reinforced composites).

The amine (B), when serving as a starting material to form the epoxy-amine adduct (i), may include the amine (B1) in a proportion not limited, but preferably 10 weight percent or more (e.g., 10 to 100 weight percent), more preferably 20 to 90 weight percent, and furthermore preferably 50 to 80 weight percent, based on the total weight (100 weight percent) of the amine (B). The amine (B), when controlled to include the amine (B1) in a proportion within the range, tends to allow the epoxy-amine adduct to offer still better levels of water solubility, adhesiveness to additive materials (in particular, reinforcement fibers such as carbon fibers), and wettability; as well as adhesion between additive materials (in particular, reinforcement fibers) and thermoplastic resins) in polymer composites (in particular, fiber-reinforced composites), and solvent solubility including water solubility.

The amine (B), when serving as a starting material to form the epoxy-amine adduct (i), may include the amine (B3) in a proportion not limited, but preferably 10 to 70 weight percent, more preferably 20 to 60 weight percent, and furthermore preferably 30 to 50 weight percent, based on the total weight (100 weight percent) of the amine (B). The amine (B), when controlled to include the amine (B3) in a proportion within the range, tends to allow the epoxy-amine adduct to have still better heat resistance, while maintaining adhesiveness to additive materials (in particular, reinforcement fibers), wettability, and adhesion between additive materials (in particular, reinforcement fibers) and thermoplastic resins in polymer composites (in particular, fiber-reinforced composites).

The amine (B), when serving as a starting material to form the epoxy-amine adduct (ii), may include the amine (B2) in a proportion not limited, but preferably 10 to 90 weight percent, more preferably 20 to 80 weight percent, and furthermore preferably 30 to 70 weight percent, based on the total weight (100 weight percent) of the amine (B). The amine (B), when controlled to include the amine (B2) in a proportion within the range, tends to allow the epoxy-amine adduct to offer still better levels of adhesiveness to additive materials (in particular, reinforcement fibers), wettability, and adhesion between additive materials (in particular, reinforcement fibers) and thermoplastic resins in polymer composites (in particular, fiber-reinforced composites).

The amine (B), when serving as a starting material to form the epoxy-amine adduct (ii), may include the amine (B3) in a proportion not limited, but preferably 10 to 90 weight percent, more preferably 20 to 80 weight percent, and furthermore preferably 30 to 70 weight percent, based on the total weight (100 weight percent) of the amine (B). The amine (B), when controlled to include the amine (B3) in a proportion within the range, tends to allow the epoxy-amine adduct to have still better heat resistance, while maintaining adhesiveness to additive materials (in particular, reinforcement fibers), wettability, and adhesion between additive materials (in particular, reinforcement fibers) and thermoplastic resins in polymer composites (in particular, fiber-reinforced composites).

Acid II-3

The acid II-3 to constitute the epoxy-amine adduct salt according to the present invention is not limited, as long as being an acid capable of causing an acid-base reaction with a basic group (e.g., an amino group) of the compound I to form a salt. Non-limiting examples of the acid II-3 include inorganic acids such as hydrochloric acid, phosphoric acid, carbonic acid, sulfuric acid, nitric acid, and hydrobromic acid; and organic acids such as formic acid, acetic acid, propionic acid, oxalic acid, malonic acid, succinic acid, citric acid, tartaric acid, malic acid, lactic acid, maleic acid, and fumaric acid. Each of different acids may be used alone or in combination as the acid II-3. Among them, the acid II-3 is preferably selected from carbonic acid and organic acids, is more preferably selected from carbonic acid and acetic acid, and is particularly preferably carbonic acid. These are preferred because these acids can be handled satisfactorily, and the resulting salts can be readily converted into the compounds I typically by thermal decomposition. Specifically, the epoxy-amine adduct salt according to the present invention is preferably selected from carbonates, hydrogencarbonates, and organic acid salts, more preferably selected from carbonates and acetates, and particularly preferably selected from carbonates.

Epoxy-Amine Adduct Salt Production Method

The epoxy-amine adduct salt according to the present invention can be produced by known or common methods for producing salts. Specifically, the epoxy-amine adduct salt according to the present invention can be produced typically by a method in which the compound I and the acid II-3 are subjected to a reaction (acid-base reaction). More specifically, the basic group, such as amino group, of the compound I and the acid II-3 are reacted in the method.

The reaction may proceed in the presence of a solvent, or in the absence of a solvent (namely, in a solvent-free manner). The solvent is not limited, may be selected typically from those exemplified in the reaction between the epoxide (A) and the amine (B), but is preferably selected from solvents containing water (at least water is preferably used as the solvent). Each of different solvents may be used alone or in combination. The amount of the solvent in the reaction is not limited and can be set as appropriate.

The ratio between the compound I and the acid II-3 to be subjected to the reaction (reaction between the compound I and the acid II-3) is not limited and can be selected as appropriate according to the proportion of basic groups (e.g., amino groups and —NH— groups) of the compound I to be converted into salts. This proportion can be determined according typically to desired water solubility.

The reaction may be performed by any operation not limited. For example, the reaction may be performed by charging the compound I and the acid II-3 into a reactor in one batch, or may be performed by charging one of the compound I and the acid II-3 into a reactor, and adding the other to the one in the reactor (typically via the sequential addition).

The temperature (reaction temperature) and the time (reaction time) in the reaction are not limited and can be set as appropriate. For example, the reaction can proceed at room temperature.

The reaction may be performed at any pressure, such as at normal atmospheric pressure, under pressure (under a load), or under reduced pressure. The reaction may be performed in any atmosphere not limited, where the atmosphere is exemplified by inert gas atmospheres (such as nitrogen and argon atmospheres) and an air atmosphere.

The reaction may be performed by any system not limited, where the system is exemplified by a batch system, a semi-batch system, and a continuous flow system.

The reaction gives the epoxy-amine adduct salt according to the present invention. After the reaction, the epoxy-amine adduct salt according to the present invention can be separated/purified by a known or common separation method such as filtration, concentration, distillation, extraction, crystallization, recrystallization, or column chromatography, or a separation method as any combination of them. In particular, the epoxy-amine salt according to the present invention has excellent water solubility and is preferably usable as an aqueous solution.

The epoxy-amine adduct salt according to the present invention has a structure in which at least part or all of basic groups (in particular, amino groups and —NH— groups) of the compound I undergo the acid-base reaction with the acid II-3 to form a salt. The epoxy-amine adduct salt thereby has excellent water solubility and is preferably usable particularly as an aqueous solution. In addition, the salt moiety can be easily converted into a basic group (in particular, amino group or —NH— group) by thermal decomposition or another treatment (e.g., treatment with a strong base). Thus, he epoxy-amine adduct salt can be converted into the compound I having amino groups and —NH— groups. The epoxy-amine adduct salt allows the resulting compound I to effectively offer better adhesion between resins and additive materials in polymer composites. In this connection, assume that the epoxy-amine adduct salt according to the present invention has a structure in which only part of basic groups of the compound I forms a salt (namely, the epoxy-amine adduct salt contains one or more amino groups and/or a —NH— group or groups). In this case, needless to say, the epoxy-amine adduct salt itself effectively offers better adhesion between thermoplastic resins and additive materials in polymer composites such as fiber-reinforced composite and nanocomposites, even when the epoxy-amine adduct salt is not converted into the compound I.

The epoxy-amine adduct salt according to the present invention may be used as intact, or in the form typically of a solution or a dispersion. In particular, the epoxy-amine adduct salt according to the present invention is highly soluble in water and is preferably usable in the form of an aqueous solution. Such an aqueous solution essentially containing any of the epoxy-amine adducts according to the present invention (the epoxy-amine adducts according to the first, second, third, and fourth embodiments of the present invention) is hereinafter also referred to as an "aqueous solution according to the present invention". In particular, the epoxy-amine adduct salt according to the present invention less precipitates from the aqueous solution (aqueous solution according to the present invention) even when the epoxy-amine adduct salt is dissolved in a low concentration in the aqueous solution. The epoxy-amine adduct salt is therefore usable in various embodiments or forms. The aqueous solution according to the present invention is usable in various uses such as water-based paints and sizing agents, as mentioned later. The concentration of the epoxy-amine adduct according to the present invention in the aqueous solution according to the present invention is not limited and can be selected as appropriate.

The epoxy-amine adducts according to the present invention (the epoxy-amine adducts according to the first, second, third, and fourth embodiments of the present invention) can be used in any uses (applications) not limited. For example, the epoxy-amine adducts according to the present invention are usable typically for or in additives; adhesives; paints; encapsulants or sealants; sizing agents; and any other various uses. Non-limiting examples of the additives include adhesion promoters (adhesion improvers) for improving adhesion between thermoplastic resins and additive materials in polymer composites; adhesiveness improvers for improving adhesiveness to adherends; compatibility improvers (compatibilizers) for improving solubility between two or more different components (in particular, between two or more different polymers); dispersibility improvers for improving dispersibility of additive materials in polymer composites; flow improvers; flow suppressants; plasticizers; and crosslinking agents typically for epoxy resins. The epoxy-amine adducts are preferably usable also in or for products (e.g., water-based paints) using water or a solvent mainly containing water as a medium. The term "water-based paint" refers to a paint including water or a solvent mainly containing water as a medium. In general, such water-based paint may further include one or more other components such as binder components and pigments. The epoxy-amine adducts according to the present invention, when used, give water-based paints essentially including the epoxy-amine adducts.

Thermoplastic Resin Composition

The thermoplastic resin composition according to the present invention is a thermoplastic resin composition obtained by blending (mixing) any of the epoxy-amine adducts according to the present invention (the epoxy-amine adducts according to the first, second, third, and fourth embodiments of the present invention) with a known or common thermoplastic resin. Non-limiting examples of the thermoplastic resin include polyolefins such as polyethylenes, polypropylenes, and polybutadienes; vinyl polymers such as acrylic resins and polystyrenes; polyamides such as nylon 6, nylon 66, nylon 11, nylon 12, nylon 610, nylon 612, nylon 6I, nylon 6T, and nylon 9T; polyesters such as poly(ethylene terephthalate)s and poly(butylene terephthalate)s; poly(vinyl chloride)s; poly(vinylidene chloride)s; polycarbonates; polyacetals; poly(phenylene oxide)s; poly(phenylene sulfide)s; poly(ether sulfone)s; poly(ether ether ketone)s; and any other thermoplastic resins. However, the "thermoplastic resin" does not include the epoxy-amine adducts according to the present invention. The thermoplastic resin composition according to the present invention may include each of different thermoplastic resins alone or in combination.

The thermoplastic resin composition according to the present invention is a thermoplastic resin composition including any of the epoxy-amine adducts according to the present invention and a thermoplastic resin. In particular, the thermoplastic resin composition is advantageous in that it can be formed (shaped) in a shorter time as compared with curable resin compositions (e.g., thermosetting resin compositions and photocurable resin compositions). The thermoplastic resin composition according to the present invention is therefore preferably usable particularly in uses requiring reduction in forming time (e.g., automobile part uses).

The thermoplastic resin composition according to the present invention may contain the thermoplastic resin in a content (blending amount) not limited, but preferably 0.1 to 99.9 weight percent, more preferably 1 to 99 weight percent, and furthermore preferably 2 to 98 weight percent, based on the total weight (100 weight percent) of the thermoplastic resin composition. The thermoplastic resin composition, when containing the thermoplastic resin in a content of 0.1 weight percent or more, tends to offer still higher levels of heat resistance and mechanical properties (such as toughness) at still higher levels in polymer composites (in particular, fiber-reinforced composites). In contrast, the thermoplastic resin composition, when containing the thermoplastic resin in a content of 99.9 weight percent or less, tends to offer still better adhesion between the thermoplastic resin and additive materials (in particular, reinforcement fibers) in polymer composites (in particular, fiber-reinforced composites).

The thermoplastic resin composition according to the present invention may include each of different epoxy-amine adducts according to the present invention alone or in combination.

The thermoplastic resin composition according to the present invention may contain the epoxy-amine adduct according to the present invention in a proportion (blending amount) not limited, but preferably 0.1 to 200 parts by weight, more preferably 1 to 100 parts by weight, and furthermore preferably 2 to 50 parts by weight, per 100 parts by weight of the thermoplastic resin. The thermoplastic resin composition, when containing the epoxy-amine adduct according to the present invention in a proportion of 0.1 part by weight or more, tends to offer still better adhesion between thermoplastic resins and additive materials (in particular, reinforcement fibers) in polymer composites (in particular, fiber-reinforced composites). In contrast, the thermoplastic resin composition, when containing the epoxy-amine adduct according to the present invention in a content of 200 parts by weight or less, tends to offer still higher levels of heat resistance and mechanical properties (such as toughness) in polymer composites (in particular, fiber-reinforced composites).

The thermoplastic resin composition according to the present invention may further include one or more common additives, in addition to the thermoplastic resins and the epoxy-amine adducts according to the present invention. Non-limiting examples of the additives include polymerization initiators (such as thermal initiators and photoinitiators), curing agents, curing accelerators, antifoaming agents, leveling agents, coupling agents (such as silane coupling agents), surfactants, inorganic fillers (such as silica and alumina), flame retardants, colorants, antioxidants, ultraviolet absorbers, ion adsorbents, pigments, phosphors, and mold release agents.

The thermoplastic resin composition according to the present invention has only to include the epoxy-amine adduct or adducts according to the present invention and the thermoplastic resin and is not limited in its production method (preparation method). Specifically, the thermoplastic resin composition can be prepared typically by stirring and mixing components to constitute the thermoplastic resin composition in predetermined proportions. The stirring and mixing of the components can be performed typically with known devices such as planetary centrifugal mixers, planetary mixers, kneaders, and dissolvers.

The thermoplastic resin composition according to the present invention includes the epoxy-amine adduct according to the present invention, where the epoxy-amine adduct is highly reactive and contributes to better adhesion between the thermoplastic resin and reinforcement fibers (such as carbon fibers) in composites (fiber-reinforced composites) including the reinforcement fibers and the thermoplastic resin. The thermoplastic resin composition is therefore preferably usable particularly as a resin composition to form fiber-reinforced composites (resin composition for fiber-reinforced composites). Specifically, the fiber-reinforced composite may be formed from a prepreg which is obtained by impregnating or coating reinforcement fibers with the thermoplastic resin composition according to the present invention. More specifically, the fiber-reinforced composite may be prepared typically in the following manner. The reinforcement fibers are impregnated or coated with the thermoplastic resin composition according to the present invention as a melt or as a solution in an appropriate solvent to give a prepreg (in particular, a thermoplastic prepreg). The thermoplastic prepreg is a prepreg including the epoxy-amine adduct according to the present invention, the thermoplastic resin, and the reinforcement fibers (in particular, carbon fibers). The prepreg is shaped or molded to give the fiber-reinforced composite. The resulting fiber-reinforced composite is a fiber-reinforced composite including the thermoplastic resin composition according to the present invention and the reinforcement fibers (in particular, carbon fibers). In particular, the thermoplastic resin composition according to the present invention (thermoplastic prepreg) is preferably usable in uses requiring reduction in shaping or molding time (e.g., automobile part uses).

The reinforcement fibers are not limited and may be selected from known or common reinforcement fibers. Non-limiting examples of the reinforcement fibers include carbon fibers, glass fibers, aramid fibers, boron fibers, graphite fibers, silicon carbide fibers, high-strength polyethylene fibers, tungsten carbide fibers, and poly-p-phenylenebenzoxazole fibers (PBO fibers). Non-limiting examples of the carbon fibers include polyacrylonitrile (PAN) carbon fibers, pitch-based carbon fibers, and vapor-grown carbon fibers. Among such reinforcement fibers, preferred are carbon fibers, glass fibers, and aramid fibers. These are preferred from the viewpoint of mechanical properties (such as toughness). The fiber-reinforced composite may include each of different types of reinforcement fibers alone or in combination.

The reinforcement fibers may have undergone any of known or common surface treatments such as coupling, oxidation, and coating treatments.

The form or shape of the reinforcement fibers is not limited, but is exemplified by a filament (continuous fiber) form, a tow form, a unidirectional material form including tows arrayed in one direction, a woven fabric form, and a nonwoven fabric form. Non-limiting examples of the woven fabrics of reinforcement fibers include plain fabrics, twill fabrics, satin fabrics, and stitching sheets. The stitching sheets are typified by non-crimp fabrics and produced by preparing a sheet including unidirectionally aligned fiber bundles or a sheet including such fiber bundles stacked with varying lamination angles, and stitching the sheet in order to create integrality of the fabric.

The content of the reinforcement fibers in the prepreg according to the present invention (thermoplastic or thermosetting prepreg) is not limited and is adjustable as appropriate.

The technique to impregnate or coat the reinforcement fibers with the thermoplastic resin composition according to the present invention may be performed by any technique not limited and can be selected from known or common impregnation or coating techniques in prepreg production methods.

The fiber-reinforced composite according to the present invention is formed from the prepreg according to the present invention as described above and can be produced typically, but not limitatively, by known or common techniques such as hand lay-up technique, prepreg technique, RTM technique, pultrusion technique, filament winding technique, spray-up technique, pultrusion molding technique, melt impregnation technique, and powder technique.

The fiber-reinforced composite according to the present invention is usable as materials for various structures without limitation. For example, the fiber-reinforced composite is preferably usable as materials for structures including aircraft structures such as fuselages, main planes, tail assemblies, rotor blades, fairings, cowlings, and doors; spacecraft structures such as motor cases and main planes; artificial satellite body structures; automobile parts such as automobile chassis; railroad vehicle body structures; bicycle body structures; ship body structures; wind turbine blades; pressure vessels; fishing rods; tennis rackets; golf club shafts; robot arms; and cables (e.g., cable cores).

Sizing Agent

The epoxy-amine adducts according to the present invention (the epoxy-amine adducts according to the first, second, third, and fourth embodiments of the present invention) are also preferably usable as sizing agents (in particular, carbon-fiber sizing agents (sizing agents for carbon fibers)). This is because the epoxy-amine adducts are highly reactive with functional groups (e.g., hydroxy groups, carboxy groups, and epoxy groups) present at surface of the reinforcement fibers and effectively contribute to better adhesion between thermoplastic resins and reinforcement fibers in fiber-reinforced composites, as described above. The "sizing agent" refers to a treatment agent that is applied to reinforcement fibers so as to improve handleability in production process and/or in high-order processing steps of the reinforcement fibers. The high-order processing steps are exemplified by weaving step, pre-impregnation step, and any other shaping or forming steps. The "sizing agent" is also called "sizing material" or "textile size". As used herein, a sizing agent including the epoxy-amine adduct according to the present invention is also referred to as a "sizing agent(s) according to the present invention".

The sizing agents according to the present invention have only to include the epoxy-amine adduct according to the present invention as an essential component. The sizing agents may further include a solvent and other additives in addition to the epoxy-amine adduct according to the present invention, or may include the epoxy-amine adduct according to the present invention alone. In the latter case, the sizing agent is the epoxy-amine adduct according to the present invention itself. The sizing agents according to the present invention may include any of the epoxy-amine adducts according to the present invention (in particular, the epoxy-amine adducts according to the second embodiment and the third embodiment of the present invention) in the form of a salt. For example, the sizing agents may include the epoxy-amine adduct salt according to the present invention as intact, or in the form typically of an aqueous solution or dispersion containing the salt. The sizing agents (in particular, carbon-fiber sizing agents) according to the present invention may employ (may include) a water-soluble epoxy-amine adduct as the epoxy-amine adduct according to the present invention.

Examples of the solvent which the sizing agents according to the present invention may contain include, but are not limited to, water; aliphatic hydrocarbons such as hexane, heptane, and octane; alicyclic hydrocarbons such as cyclohexane; aromatic hydrocarbons such as benzene, toluene, xylenes, and ethylbenzene; halogenated hydrocarbons such as chloroform, dichloromethane, and 1,2-dichloroethane; ethers such as diethyl ether, dimethoxyethane, tetrahydrofuran, and dioxane; ketones such as acetone, methyl ethyl ketone, and methyl isobutyl ketone; esters such as methyl acetate, ethyl acetate, isopropyl acetate, and butyl acetate; amides such as N,N-dimethylformamide and N,N-dimethylacetamide; nitriles such as acetonitrile, propionitrile, and benzonitrile; alcohols such as methanol, ethanol, isopropyl alcohol, and butanol; and dimethyl sulfoxide. Among them, water and alcohols are preferred, of which water is particularly preferred, for small load on the environment and the working environment. Specifically, the sizing agents according to the present invention may be solutions (in particular, aqueous solutions) or dispersions (in particular, water dispersions) of the epoxy-amine adducts according to the present invention, where the solutions or dispersions each contain water and/or an alcohol (either one or both of water and an alcohol). The solutions or dispersions may contain each of different solvents alone or in combination. In particular, the sizing agents according to the present invention advantageously include any of the epoxy-amine adducts according to the present invention in the form of a salt (e.g., the epoxy-amine adduct according to the fourth embodiment of the present invention), because the resulting sizing agents can be readily prepared as aqueous solutions having low concentrations.

The sizing agents according to the present invention may further include one or more additives. Non-limiting examples of the additives include lubricants such as fatty acids, amides, and esters; and coupling agents such as silane coupling agents and titanium coupling agents.

The contents of the epoxy-amine adduct according to the present invention, the solvent, and the additives in the sizing agents according to the present invention are not limited and can be independently adjustable as appropriate.

The sizing agents according to the present invention (e.g., carbon-fiber sizing agents) are preferably usable typically in or for products including water or a solvent mainly containing water as a medium (e.g., water-based paints). For example, the sizing agents according to the present invention may be used to give aqueous solutions, water-based paints, and any other products including the sizing agent(s) as an essential component.

Sizing-Agent-Coated Carbon Fiber

The sizing agent (carbon-fiber sizing agent) according to the present invention, when applied to carbon fibers, gives sizing-agent-coated carbon fibers (sizing agent-loaded carbon fibers). The resulting sizing-agent-coated carbon fibers are also referred to as "sizing-agent-coated carbon fiber(s) according to the present invention". Specifically, the sizing-agent-coated carbon fibers according to the present invention are carbon fibers coated with the carbon-fiber sizing agent.

A method to apply the sizing agent according to the present invention to the carbon fibers is not limited and may be selected from known or common methods. Non-limiting examples of such methods include a method in which the carbon fibers are immersed in the sizing agent according to the present invention; a method in which the carbon fibers are brought into contact with a roller to which the sizing agent according to the present invention is attached; and a method in which the sizing agent according to the present invention is sprayed to the carbon fibers. The sizing agent according to the present invention may be applied to the whole or part of the carbon fibers surface. The coating thickness and the mass of coating are adjustable as appropriate and are not limited.

The carbon fibers after coated with the sizing agent according to the present invention may be subjected to a heat treatment as needed. The heat treatment may be performed under any conditions not limited. However, the heating temperature is preferably 40° C. to 300° C., and more preferably 60° C. to 250° C. The heating time is adjustable as appropriate according to the heating temperature, is not limited, but is preferably 1 second to 60 minutes, and more preferably 5 seconds to 10 minutes. The heating temperature in the heat treatment may be set constant or may be varied continuously or stepwise. The heat treatment may be performed continuously in one step or intermittently in two or more steps. The heat treatment is performed, in general, so as to promote impregnation with the sizing agent and to evaporate the solvent. The heat treatment can be performed according to a known or common procedure (e.g., heating in a hot-air oven).

The sizing-agent-coated carbon fibers according to the present invention may further include a thermoplastic resin on their surface, namely, may be one prepared by applying the sizing agent according to the present invention to the carbon fibers, subjecting the sizing-agent-coated carbon fibers to the heat treatment, and then further coating the sizing-agent-coated carbon fibers with the thermoplastic resin. This may allow the sizing-agent-coated carbon fibers to have lower tack and to offer better handleability in some types of the thermoplastic resin. The coating may be performed by any procedure not limited, such as a similar procedure to that in application of the sizing agent according to the present invention to the carbon fibers. The thermoplastic resin may be applied to the whole or part of the sizing-agent-coated carbon fibers surface. The coating thickness and the mass of coating are adjustable as appropriate and are not limited.

The sizing-agent-coated carbon fibers according to the present invention have excellent adhesion to resins because the carbon fibers are coated with the epoxy-amine adduct according to the present invention in the sizing agent according to the present invention. Assume that the epoxy-amine adduct according to the present invention in the sizing agent according to the present invention is, in particular, one having excellent heat resistance. In this case, the sizing-agent-coated carbon fibers are applicable to processing (e.g., sizing-agent-coated carbon fiber production) performed at high temperatures and can contribute to better productivity of fiber-reinforced composites. Also assume that the epoxy-amine adduct according to the present invention in the sizing agent according to the present invention is one having a somewhat high glass transition temperature. In this case, the sizing agent less causes contamination of processing devices (such as rollers) and can impart excellent feel and texture and excellent handleability to reinforcement fibers coated with the sizing agent (e.g., the sizing-agent-coated carbon fibers). In addition, the sizing agent according to the present invention has excellent functions as general sizing agents, such as the function of bundling carbon fibers and the function of imparting flexibility to the carbon fibers. Accordingly, the sizing-agent-coated carbon fibers according to the present invention can be handled satisfactorily and offer excellent processability in higher order processing.

Since the sizing-agent-coated carbon fibers according to the present invention have the characteristic properties, fiber-reinforced composites including the sizing-agent-coated carbon fibers and any of various matrix resins (thermoplastic resins) have excellent heat resistance and mechanical strength and offer high productivity. The fiber-reinforced composites herein are fiber-reinforced composites including the sizing-agent-coated carbon fibers according to the present invention. The fiber-reinforced composites can be produced by any known or common methods such as the fiber-reinforced composite production method. The fiber-reinforced composites are preferably usable as materials for the various structures.

The sizing-agent-coated carbon fibers according to the present invention may also be obtained in a similar manner typically by using, instead of the sizing agent (carbon-fiber sizing agent) according to the present invention, a sizing agent (carbon-fiber sizing agent) including the after-mentioned water-dispersed resin composition according to the present invention.

Water-Dispersed Resin Composition

The epoxy-amine adducts according to the present invention (the epoxy-amine adducts according to the first, second, third, and fourth embodiments of the present invention) can be used to give water-dispersed resin compositions. Of the water-dispersed resin compositions, preferred are water-dispersed resin compositions including any of the epoxy-amine adducts according to the present invention (in particular, the epoxy-amine adduct according to the first embodiment of the present invention) and a urethane resin. These are water dispersions including the epoxy-amine adduct according to the present invention and a urethane resin and are also referred to as a "water-dispersed resin composition(s) according to the present invention".

As used herein, the term "water-dispersed" state in the water-dispersed resin compositions according to the present invention refers to a state in which at least part of the epoxy-amine adduct according to the present invention and the urethane resin is not dissolved in a water-based medium (aqueous medium) and includes a suspended dispersion state, an emulsified dispersion state, and any other dispersion states. The water-dispersed resin compositions according to the present invention are each preferably in a state in which at least the epoxy-amine adduct according to the present invention is emulsified and dispersed in the water-based medium.

The epoxy-amine adducts according to the present invention, which constitute the water-dispersed resin compositions according to the present invention, are as described above. Among them, the epoxy-amine adducts according to the first embodiment of the present invention are preferably used. The water-dispersed resin compositions according to the present invention may include each of different epoxy-amine adducts according to the present invention alone or in combination.

The water-dispersed resin composition according to the present invention may contain the epoxy-amine adduct according to the present invention in a content (blending amount) not limited, but preferably 0.1 to 98 weight percent, more preferably 1 to 90 weight percent, furthermore preferably 10 to 85 weight percent, and particularly preferably 20 to 80 weight percent, based on the total weight (100 weight percent) of non-volatile contents in the water-dispersed resin composition.

Urethane Resin

The urethane resin in the water-dispersed resin compositions according to the present invention is not limited and may be selected from resins that have a polyurethane structure formed by the reaction between a multifunctional isocyanate and a polyol. The water-dispersed resin compositions may include each of different urethane resins alone or in combination.

The multifunctional isocyanate is not limited, as long as being a compound containing at least two isocyanate groups per molecule. Such multifunctional isocyanates include, for example, aliphatic multifunctional isocyanates, alicyclic multifunctional isocyanates, aromatic multifunctional isocyanates, and araliphatic multifunctional isocyanates. Each of different multifunctional isocyanates may be used alone or in combination.

Non-limiting examples of the aliphatic multifunctional isocyanates include aliphatic diisocyanates containing 2 to 12 carbon atoms (excluding carbon in NCO), such as 1,3-trimethylene diisocyanate, 1,4-tetramethylene diisocyanate, 1,5-pentamethylene diisocyanate, 1,6-hexamethylene diisocyanate, 1,2-propylene diisocyanate, 1,2-butylene diisocyanate, 2,3-butylene diisocyanate, 1,3-butylene diisocyanate, 2-methyl-1,5-pentamethylene diisocyanate, dodecamethylene diisocyanate, and lysine diisocyanate.

Non-limiting examples of the alicyclic multifunctional isocyanates include alicyclic diisocyanates containing 4 to 18 carbon atoms (excluding carbon in NCO), such as 1,3-cyclopentane diisocyanate, 1,4-cyclohexane diisocyanate, 1,3-cyclohexane diisocyanate, 3-isocyanatomethyl-3,5,5-trimethylcyclohexyl isocyanate (isophorone diisocyanate), 4,4'-methylenebis(cyclohexyl isocyanate), methyl-2,4-cyclohexane diisocyanate, methyl-2,6-cyclohexane diisocyanate, 1,3-bis(isocyanatomethyl)cyclohexane, 1,4-bis(isocyanatomethyl)cyclohexane, and norbornane diisocyanate.

Non-limiting examples of the aromatic multifunctional isocyanates include aromatic diisocyanates containing 6 to 15 carbon atoms (excluding carbon in NCO), such as m-phenylene diisocyanate, p-phenylene diisocyanate, 2,4-tolylene diisocyanate, 2,6-tolylene diisocyanate, naphthylene-1,4-diisocyanate, naphthylene-1,5-diisocyanate, 4,4'-diphenyl diisocyanate, 4,4'-diphenylmethane diisocyanate, 2,4'-diphenylmethane diisocyanate, 2,2'-diphenylmethane diisocyanate, 4,4'-diphenyl ether diisocyanate, 2,2'-diphenylpropane-4,4'-diisocyanate, 3,3'-dimethyldiphenylmethane-4,4'-diisocyanate, and 4,4'-diphenylpropane diisocyanate.

Non-limiting examples of the araliphatic multifunctional isocyanates include araliphatic diisocyanates containing 8 to 15 carbon atoms (excluding carbon in NCO), such as 1,3-xylylene diisocyanate, 1,4-xylylene diisocyanate, ω,ω'-diisocyanato-1,4-diethylbenzene, 1,3-bis(1-isocyanato-1-methylethyl)benzene, 1,4-bis(1-isocyanato-1-methylethyl)benzene, and 1,3-bis(α,α-dimethyl-isocyanatomethyl)benzene.

The multifunctional isocyanate to be used herein is preferably selected from 1,6-hexamethylene diisocyanate, 4,4'-methylenebis(cyclohexyl isocyanate), 1,3-bis(isocyanatomethyl)cyclohexane, 1,4-bis(isocyanatomethyl)cyclohexane, isophorone diisocyanate, 2,4-tolylene diisocyanate, 2,6-tolylene diisocyanate, 4,4'-diphenylmethane diisocyanate, 1,3-xylylene diisocyanate, 1,4-xylylene diisocyanate, norbornane diisocyanate, and 1,3-bis(α,α-dimethyl isocyanatomethyl)benzene.

The multifunctional isocyanate for use herein is also selectable from dimers, trimers, reaction products, modified derivatives, and polymers (polymerized products) of (derived from) the above-exemplified aliphatic multifunctional isocyanates, alicyclic multifunctional isocyanates, aromatic multifunctional isocyanates, and araliphatic multifunctional isocyanates. Non-limiting examples of such multifunctional isocyanates include dimer and trimer of diphenylmethane diisocyanate; reaction products between trimethylolpropane and tolylene diisocyanate; reaction products between trimethylolpropane and hexamethylene diisocyanate; polymethylene polyphenyl isocyanates; polyether multifunctional isocyanates; and polyester multifunctional isocyanates.

Non-limiting examples of the polyol include low-molecular-weight polyols; and long-chain polyols such as polyether polyols, polyester polyols, polycarbonate polyols, polyolefin polyols, and polyacrylic polyols. The low-molecular-weight polyols have molecular weights less than 500, and preferably 300 or less. The long-chain polyols have number-average molecular weights of generally 500 or more, preferably 500 to 10000, more preferably 600 to 6000, and furthermore preferably 800 to 4000. Each of different low-molecular-weight polyols and each of different long-chain polyols may be used alone or in combination as the polyol.

Non-limiting examples of the low-molecular-weight polyols include polyols such as ethylene glycol, propylene glycol, 1,3-propanediol, 1,3-butanediol, 1,4-butanediol, 1,5-pentanediol, 1,2-pentanediol, 2,3-pentanediol, neopentyl glycol, 1,6-hexanediol, 3-methyl-1,5-pentanediol, 1,4-cyclohexanediol, 1,4-cyclohexanedimethanol, glycerol, trimethylolpropane, and bisphenol-A; of which diols are preferred.

Non-limiting examples of the polyether polyols include polyalkylene glycols such as polyethylene glycols, polypropylene glycols, and poly(oxytetramethylene) glycols (PTMGs); as well as ethylene oxide-propylene oxide copolymers and other copolymers derived from monomer components including two or more different alkylene oxides (copolymers between an alkylene oxide and another alkylene oxide).

Non-limiting examples of the polyester polyols usable herein include condensation polymers between a polyhydric alcohol and a polycarboxylic acid; ring-opened polymers of cyclic esters (lactones); and ternary reaction products among three components, i.e., a polyhydric alcohol, a polycarboxylic acid, and a cyclic ester. Non-limiting examples of the polyhydric alcohol to form the condensation polymers between the polyhydric alcohol and the polycarboxylic acid include ethylene glycol, diethylene glycol, propylene glycol, dipropylene glycol, 1,3-propanediol, 1,3-butanediol, 1,4-butanediol, 2-methyl-1,3-propanediol, 1,5-pentanediol, neopentyl glycol, 1,6-hexanediol, 3-methyl-1,5-pentanediol, 2,4-diethyl-1,5-pentanediol, 1,9-nonanediol, 1,10-decanediol, glycerol, trimethylolpropane, trimethylolethane, cyclohexanediols (e.g., 1,4-cyclohexanediol), cyclohexanedimethanols (e.g., 1,4-cyclohexanedimethanol), bisphenols (e.g., bisphenol-A), and sugar alcohols (e.g., xylitol and sorbitol). In contrast, non-limiting examples of the polycarboxylic acid include aliphatic dicarboxylic acids such as malonic acid, maleic acid, succinic acid, glutaric acid, adipic acid, suberic acid, azelaic acid, sebacic acid, and dodecanedioic acid; alicyclic dicarboxylic acids such as 1,4-cyclohexanedicarboxylic acid; and aromatic dicarboxylic acids such as terephthalic acid, isophthalic acid, o-phthalic acid, 2,6-naphthalenedicarboxylic acid, p-phenylenedicarboxylic acid, and trimellitic acid. Non-limiting examples of the cyclic esters to form the ring-opened polymers of cyclic esters include propiolactone, δ-valerolactone, γ-methyl-δ-valerolactone, and ε-caprolactone. The polyhydric alcohol, the polycarboxylic acid, and the cyclic ester to form the ternary reaction products may be selected typically from those exemplified above.

Non-limiting examples of the polycarbonate polyols include reaction products between a polyhydric alcohol and any of phosgene, chloroformic acid esters, dialkyl carbonates and diaryl carbonates; and ring-opened polymers of cyclic carbonic acid esters (e.g., alkylene carbonates). Specifically, in the reaction products between a polyhydric alcohol and phosgene, the polyhydric alcohol may be selected from the above-exemplified polyhydric alcohols such as ethylene glycol, propylene glycol, 1,3-butanediol, 1,4-butanediol, neopentyl glycol, 1,5-pentanediol, 1,6-hexanediol, and 1,9-nonanediol. In the ring-opened polymers of cyclic carbonic acid esters, non-limiting examples of the alkylene carbonates include ethylene carbonate, trimethylene carbonate, tetramethylene carbonate, and hexamethylene carbonate. The polycarbonate polyols have only to be compounds containing a carbonate bond in the molecule and containing a terminal hydroxy group, and may contain an ester bond in addition to the carbonate bond. Representative examples of the polycarbonate polyols include, but are not limited to, poly(hexamethylene carbonate) diols, diols obtained by ring-opening addition polymerization of a lactone to a poly(hexamethylene carbonate) diol, and co-condensates of a poly(hexamethylene carbonate) diol with a polyester diol or a polyether diol.

The polyolefin polyols are polyols that have a polymer or copolymer skeleton (or principal chain) derived from components including an olefin and have at least two hydroxy groups in the molecule (in particular, terminally). The olefin may be selected from olefins containing a terminal carbon-carbon double bond (e.g., α-olefins such as ethylene and propylene); olefins having a carbon-carbon double bond at a site other than ends (terminals) (e.g., isobutene); and dienes (e.g., butadiene and isoprene). Representative examples of the polyolefin polyols include, but are not limited to, polymers corresponding to butadiene or isoprene polymers, except with one or both ends being modified into hydroxy groups. Non-limiting examples of the butadiene or isoprene polymers include butadiene homopolymers, isoprene homopolymers, butadiene-styrene copolymers, butadiene-isoprene copolymers, butadiene-acrylonitrile copolymers, butadiene-2-ethylhexyl acrylate copolymers, and butadiene-n-octadecyl acrylate copolymers.

The polyacrylic polyols are polyols that have a polymer or copolymer skeleton (or principal chain) derived from components including a (meth)acrylate and have at least two hydroxy groups in the molecule (in particular, terminally). The (meth)acrylate is preferably selected from (meth)acrylic alkyl esters such as $C_1$-$C_{20}$ alkyl esters of (meth)acrylic acid. The polyol can also be selected from any other materials (polyols), as well as those exemplified herein.

The urethane resin may be derived from components including a polyamine, which acts as a chain extender. The polyamine has a molecular weight of generally less than 500, and preferably 300 or less. Representative, but non-limiting examples of the polyamine include hexamethylenediamine, 3,3'-dimethyl-4,4'-diaminodicyclohexylmethane, 4,4'-methylenebis-2-chloroaniline, and other polyamines, of which diamines are preferred.

The water-dispersed resin compositions according to the present invention preferably include, as the urethane resin, a urethane resin emulsion. The urethane resin emulsion may be either a forced-emulsifying urethane resin emulsion using a surfactant as an emulsifier or a self-emulsifying urethane resin emulsion including a hydrophilic group introduced therein. Among them, the urethane resin emulsion is particularly preferably a self-emulsifying urethane resin emulsion. Non-limiting examples of the hydrophilic group of the self-emulsifying urethane resin emulsion include sulfonic, carboxy, hydroxy, polyethyleneoxy, amino, and mono- or di-substituted amino groups. Among them, the hydrophilic group is preferably selected from sulfonic, carboxy, hydroxy, and polyethyleneoxy groups.

Exemplary commercial products of the urethane resin emulsion (polyurethane emulsion) include products available under the trade names UCOAT UX-150, UCOAT UX-200, UCOAT UX-300, UCOAT UX-310, UCOAT UWS-145, PERMARIN UA-150, PERMARIN UA-300, PERMARIN UA-310, PERMARIN UA-368, and UPRENE UXA-307 from Sanyo Chemical Industries, Ltd.; the trade name KP-2820 from Matsumoto Yushi-Seiyaku Co., Ltd.; the trade name SUPERFLEX 150HS from Dai-ichi Kogyo Seiyaku Co., Ltd.; the trade names HYDRAN AP-20, HYDRAN AP-305, HYDRAN AP-405, and HYDRAN WLS-213 from DIC Corporation; and the trade names ACRIT WBR-2018, ACRIT WBR-016U, and ACRIT WEM-3008 from Taisei Fine Chemical Co., Ltd.

The water-dispersed resin composition according to the present invention may contain the urethane resin in a content (blending amount) not limited, but preferably 0.1 to 98 weight percent, more preferably 1 to 90 weight percent, furthermore preferably 10 to 85 weight percent, and particularly preferably 20 to 80 weight percent, based on the total weight (100 weight percent) of non-volatile contents in the water-dispersed resin composition.

In the water-dispersed resin composition according to the present invention, the ratio (weight ratio; non-volatile contents) of the epoxy-amine adduct according to the present invention to the urethane resin is not limited, but is preferably 1:99 to 99:1, more preferably 10:90 to 95:5, furthermore preferably 30:70 to 90:10, and particularly preferably 50:50 to 85:15.

Surfactant

The water-dispersed resin composition according to the present invention may include a surfactant. The surfactant may be selected from known or common surfactants, is not limited, but is exemplified by well-known anionic surfactants, nonionic surfactants, cationic surfactants, amphoteric surfactants, and polymeric dispersants. The surfactant has the function mainly of stably dispersing the epoxy-amine adduct according to the present invention in the water-dispersed resin composition according to the present invention.

Non-limiting examples of the anionic surfactants include sulfonate surfactants such as dodecylbenzenesulfonates, alkylenedisulfonates, sodium dialkyl sulfosuccinates, sodium monoalkyl sulfosuccinates, sodium naphthalenesulfonate formalin condensates, and α-olefin sulfonates; sulfates surfactants such as polyoxyethylene styrenated phenyl ether sulfates, polyoxyethylene aryl ether sulfates, polyoxyethylene alkyl ether sulfates, and polyoxyethylene castor oil ether sulfates; phosphate surfactants such as polyoxyalkylene alkyl ether phosphates; and sodium polyacrylates. Among these anionic surfactants, preferred are sulfate surfactants, and such sulfate surfactants may also be selected from commercial products such as products available under the trade names NEWCOL 707SF, NEWCOL 707SFC, NEWCOL 707SN, and NEWCOL 780SF (each from NIPPON NYUKAZAI CO., LTD.).

In addition to the above ones, non-limiting examples of the anionic surfactants also include reactive surfactants containing a polymerizable functional group that can undergo radical polymerization, such as surfactants corresponding to polyoxyethylene alkyl phenyl ether sulfates, except with a radically polymerizable unsaturated double bond introduced into the molecule; and surfactants corresponding to alkyl sulfosuccinate salts, except with a radically polymerizable unsaturated double bond introduced into the molecule. Specifically, examples of the former surfactants include, but are not limited to, products available under the trade names AQUALON KH-10 and AQUALON HS-10 (each from Dai-ichi Kogyo Seiyaku Co., Ltd.); and the trade name ADEKA REASOAP SE-10N (from ADEKA CORPORATION). Examples of the latter surfactants include products available under the trade names ELEMINOL JS2 and ELEMINOL RN-30 (each from Sanyo Chemical Industries, Ltd.); and trade names LATEMUL S-180 and LATEMUL S-180A (each from Kao Corporation).

Non-limiting examples of the nonionic surfactants include polyoxyalkylene alkyl ether surfactants such as polyoxyethylene 2-ethylhexyl ethers, polyoxyethylene oleyl ethers, polyoxyethylene tridecyl ethers, polyoxyethylene castor oil ethers, polyoxyethylene cetyl ethers, polyoxyethylene stearyl ethers, polyoxyalkylene 2-ethylhexyl ethers, polyoxyalkylene nonyl ethers, and polyoxyalkylene tridecyl ethers; polyoxyalkylene styrenated phenyl ether surfactants (styrenated (polycyclic) phenyl ether surfactants) such as polyoxyethylene styrenated phenyl ethers; sorbitan derivative surfactants such as sorbitan laurates, sorbitan stearates, sorbitan oleates, sorbitan trioleate, polyoxyethylene sorbitan laurates, polyoxyethylene sorbitan stearates, polyoxyethylene sorbitan oleates, polyoxyethylene sorbitan trioleates, and polyoxyalkylene sorbitan fatty acid esters; and other nonionic surfactants including polyoxyethylene aryl ethers, polyoxyethylene cumyl phenyl ethers, polyoxyethylene polyoxypropylene block polymers, polyoxyalkylene fatty acid esters (such as polyoxyethylene oleates), polyoxyethylene alkylamine ethers, alkylene oxide adducts of 2-butyl-2-ethyl-1,3-β-hydroxypropane, fatty acid amide derivatives, and polyhydric alcohol derivatives. Among them, polyoxyalkylene alkyl ether nonionic surfactants are preferred. Specifically, such polyoxyalkylene alkyl ether nonionic surfactants are available typically under the trade names NOIGEN EA-197D, NOIGEN XL, NOIGEN ET-B, and NOIGEN TDS (each from Dai-ichi Kogyo Seiyaku Co., Ltd.). In addition, polyoxyalkylene fatty acid esters such as polyoxyethylene oleates are also preferred. Specifically, such polyoxyalkylene fatty acid esters are available typically under the trade names NEWCOL 150, NEWCOL 170, NEWCOL 180, and NEWCOL 180T (each from NIPPON NYUKAZAI CO., LTD.

In addition to the above-exemplified ones, non-limiting examples of the nonionic surfactants also include surfactants corresponding to polyoxyethylene alkyl phenyl ethers, except with a radically polymerizable unsaturated double bond introduced into the molecule. Specifically, such surfactants are exemplified by products available typically under the trade names AQUALON RN-20 and AQUALON RN-50 (each from Dai-ichi Kogyo Seiyaku Co., Ltd.); and the trade names ADEKA REASOAP NE-20 and ADEKA REASOAP NE-40 (each from ADEKA CORPORATION).

Non-limiting examples of the cationic surfactants include quaternary ammonium salt surfactants such as tetramethylammonium salts (e.g., tetramethylammonium chloride and tetramethylammonium hydroxide), alkyltrimethylammonium salts, dialkyldimethylammonium salts, alkyldimethylbenzylammonium salts, pyridinium salts, alkylisoquinolinium salts, and benzethonium chloride; amine salt surfactants such as alkylamine salts (e.g., monomethylamine hydrochloride and dimethylamine hydrochloride), amino alcohol fatty acid derivatives, polyamine fatty acid derivatives, and imidazoline; and pyridinium salt surfactants such as butylpyridinium chloride and dodecylpyridinium chloride.

Non-limiting examples of the amphoteric surfactants include alanine, dodecyl-di(aminoethyl)glycine, di(octylaminoethyl)glycine, and N-alkyl-N,N-dimethylammonium betaines.

Non-limiting examples of the polymeric dispersants include poly(vinyl alcohol)s, polyvinylpyrrolidones, maleic acid copolymers (e.g., ethyl vinyl ether-maleic acid copolymers and styrene-maleic acid copolymers) and various metal salts and ammonium salts of them, acrylic acid polymers (e.g., poly(acrylic acid)s and acrylic acid copolymers) and various metal salts and ammonium salts of them, maleic acid monoester copolymers, acryloylmethylpropanesulfonic acid copolymers, polyesters, carboxymethylcellulose (CMC), hydroxyethylcellulose (HEC), hydroxypropylcellulose, hydroxypropylmethylcellulose, carboxy-methyl starch, alginic acid, and pectic acid.

The water-dispersed resin composition according to the present invention may include each of different surfactants alone or in combination. Among them, anionic surfactants and nonionic surfactants are preferred, of which combination uses of one or more anionic surfactants with one or more nonionic surfactants are particularly preferred.

The water-dispersed resin composition according to the present invention may contain the surfactant in a content (blending amount) not limited, but preferably 0.01 to 500 parts by weight, more preferably 0.1 to 200 parts by weight, furthermore preferably 0.5 to 100 parts by weight, and particularly preferably 5 to 80 parts by weight, per 100 parts by weight of the epoxy-amine adduct according to the present invention. The water-dispersed resin composition, when containing the surfactant in a content of 0.01 part by weight or more, tends to allow the epoxy-amine adduct according to the present invention to be dispersed more stably. In contrast, the water-dispersed resin composition, when containing the surfactant in a content of 500 parts by weight or less, tends to be economically advantageous or to allow the fiber-reinforced composites to maintain heat resistance and/or mechanical properties at higher levels.

Assume that one or more anionic surfactants and one or more nonionic surfactants are used in combination as the surfactant. In this case, the ratio (weight ratio) of the anionic surfactants to the nonionic surfactants is not limited, but preferably 95:5 to 10:90, more preferably 90:10 to 30:70, and furthermore preferably 85:15 to 50:50.

The water-dispersed resin composition according to the present invention is a composition including a water-based medium. The water-based medium has only to be a medium (vehicle) essentially including water and is not limited. Specifically, the water-dispersed resin composition according to the present invention may be one including, as the water-based medium, water alone or both water and an organic solvent. Non-limiting examples of the organic solvent include aliphatic hydrocarbons such as hexane, heptane, and octane; alicyclic hydrocarbons such as cyclohexane; aromatic hydrocarbons such as benzene, toluene, xylenes, and ethylbenzene; halogenated hydrocarbons such as chloroform, dichloromethane, and 1,2-dichloroethane; ethers such as diethyl ether, dimethoxyethane, tetrahydrofuran, and dioxane; ketones such as acetone, methyl ethyl ketone, and methyl isobutyl ketone; esters such as methyl acetate, ethyl acetate, isopropyl acetate, and butyl acetate; amides such as N,N-dimethylformamide and N,N-dimethylacetamide; nitriles such as acetonitrile, propionitrile, and benzonitrile; alcohols such as methanol, ethanol, isopropyl alcohol, and butanol; and dimethyl sulfoxide. The water-based solvent may include each of different organic solvents alone or in combination. Among them, preferred are amides, alcohols, dimethyl sulfoxide, and other organic solvents that are miscible with water.

The water-dispersed resin composition according to the present invention preferably has a low content of organic solvents from the viewpoints of working safety securing and environmental protection. The water-dispersed resin composition according to the present invention may have a content (blending amount) of organic solvents not limited, but preferably 10 weight percent or less (e.g., 0 to 10 weight percent), more preferably 5 weight percent or less, furthermore preferably 1 weight percent or less, and particularly preferably 0.1 weight percent or less, based on the total weight (100 weight percent) of the water-dispersed resin composition.

The water-dispersed resin composition according to the present invention may further include one or more other components, where the "other components" refers to components other than the above-mentioned components. Non-limiting examples of the other components include lubricants such as fatty acids, amides, and esters; coupling agents such as silane coupling agents and titanium coupling agents; and any other additives.

The water-dispersed resin composition according to the present invention may be prepared (produced) by any method not limited. Non-limiting examples of the method include methods (i) to (iv) as follows. In the method (i), a waster dispersion including the epoxy-amine adduct according to the present invention is mixed with the urethane resin emulsion. In the method (ii), the epoxy-amine adduct according to the present invention is mixed with the urethane resin, and the mixture is emulsified. In the method (iii), the urethane resin is added to and mixed with a water dispersion including the epoxy-amine adduct according to the present invention. In the method (iv), the epoxy-amine adduct according to the present invention and a surfactant (where needed) are added to the urethane resin emulsion. Among them, the method (i) or (ii) is preferred so as to easily give a stable emulsion.

The "mixing" in the methods may be performed typically using dispersers such as dispers, homomixers, bead mills, jet mills, roll mills, hammer mills, vibrating mills, ball mills, sand mills, pearl mills, spike mills, agitator mills, and CoBall-Mills, of which medium mills (mills using a medium) are typified.

The water dispersion including the epoxy-amine adduct according to the present invention may be produced typically by mixing the epoxy-amine adduct according to the present invention with a surfactant, a water-based medium, and, as needed, other components to disperse the epoxy-amine adduct according to the present invention in the water-based medium (typically via suspension dispersion and/or emulsification dispersion). Upon mixing, the sequence of addition of the components is not limited. Specifically, the water dispersion may be prepared typically by mixing a mixture containing the epoxy-amine adduct according to the present invention, the surfactant, and the water-based medium using any of the dispersers. The water dispersion may further be subjected to a treatment, such as drying under reduced pressure, so as to reduce the content of organic solvents in the water-dispersed resin composition according to the present invention.

The water-dispersed resin composition according to the present invention may also be obtained by using, instead of the epoxy-amine adduct according to the present invention, the sizing agent according to the present invention (e.g., the carbon-fiber sizing agent). This gives a water-dispersed resin composition (water-dispersed resin compositions according to the present invention) including the sizing agent according to the present invention (e.g., carbon-fiber sizing agent), the urethane resin, and, as needed, a surfactant and/or any other components.

Prepreg

The water-dispersed resin composition according to the present invention includes the epoxy-amine adduct according to the present invention and is highly reactive with functional groups (e.g., hydroxy, carboxy, and epoxy groups) present on reinforcement fiber surface. In addition, the water-dispersed resin composition includes the urethane resin and forms a coating that has excellent flexibility. Owing to these configurations, the water-dispersed resin composition effectively contributes to better adhesion between resins (in particular, thermoplastic resins) and reinforcement fibers (in particular, glass fibers and carbon fibers) in fiber-reinforced composites.

More specifically, prepregs may be used to form fiber-reinforced composites typically in the following manners. For example, assume that the resin composition in the present invention is a resin composition including the epoxy-amine adduct according to the present invention and a thermoplastic resin. In this case, the fiber-reinforced composite may be obtained by impregnating or coating the reinforcement fibers with a melt or a solution (in an appropriate solvent) of the resin composition to give a prepreg (thermoplastic prepreg), and shaping or molding the prepreg. In contrast, for example, assume that the resin composition in the present invention is a resin composition including the epoxy-amine adduct according to the present invention and a curable resin. In this case, the fiber-reinforced composite may be obtained by impregnating or coating reinforcement fibers with the resin composition to give a prepreg (curable prepreg), curing the curable resin in the prepreg, and shaping or molding the prepreg.

In particular, the thermoplastic prepreg is preferably usable in uses requiring reduction in shaping time (e.g., automobile part uses). In the thermoplastic prepreg, the water-dispersed resin composition according to the present invention is in the form of a water-dispersed resin composition (water dispersion), and this configuration eases impregnation or coating of the reinforcement fibers with the water-dispersed resin composition. The water-dispersed resin composition according to the present invention is, in particular, useful as or in sizing agents (in particular, glass-fiber sizing agents and carbon-fiber sizing agents). Specifically, a sizing agent including the water-dispersed resin composition according to the present invention is useable as the carbon-fiber sizing agent.

Impregnation or coating of reinforcement fibers with the water-dispersed resin composition according to the present invention used as a sizing agent gives a prepreg which is a precursor material to form the fiber-reinforced composite. This prepreg is also referred to as a "prepreg according to the present invention".

The reinforcement fibers are not limited, may be selected from known or common reinforcement fibers, and may be selected typically from the above-exemplified reinforcement fibers. Among them, carbon fibers, glass fibers, and aramid fibers are preferred from the viewpoint of mechanical properties (such as toughness). Each of different types of reinforcement fibers may be used alone or in combination. The reinforcement fibers may have undergone any of known or common surface treatments such as coupling, oxidation, and coating treatments. The reinforcement fibers are not limited in shape or form and may be selected typically from reinforcement fibers having any of the above-exemplified shapes.

The content of the reinforcement fibers in the prepreg according to the present invention is not limited and adjustable as appropriate.

The impregnation or coating of the reinforcement fibers with the water-dispersed resin composition according to the present invention to produce the prepreg according to the present invention may be performed by any of impregnation or coating techniques in known or common prepreg production methods, as described above. Specifically, non-limiting examples of the impregnation or coating techniques include a technique of immersing the reinforcement fibers in the water-dispersed resin composition according to the present invention; a technique of bringing the reinforcement fibers into contact with a roller to which the water-dispersed resin composition according to the present invention is attached; a technique of spraying the water-dispersed resin composition according to the present invention to the reinforcement fibers; and any other known or common techniques. The water-dispersed resin composition according to the present invention may be applied to the whole or part of the reinforcement fiber surface. The coating thickness, mass of coating, and impregnation amount are adjustable as appropriate and are not limited.

The prepreg according to the present invention may be one obtained by impregnating or coating the reinforcement fibers with the water-dispersed resin composition according to the present invention, and subjecting the resulting article to a heat treatment as needed. The heat treatment may be performed under any conditions not limited. However, the heating temperature is preferably 40° C. to 300° C., and more preferably 60° C. to 250° C. The heating time is adjustable as appropriate according to the heating temperature, is not limited, but is preferably 1 second to 60 minutes, and more preferably 5 seconds to 10 minutes. The heating temperature in the heat treatment may be set constant, or may be varied continuously or stepwise. The heat treatment may be performed continuously in one step or intermittently in two or more steps. The heat treatment is performed, in general, so as to promote impregnation of the reinforcement fibers with the water-dispersed resin composition according to the present invention and to evaporate and remove volatile components such as the water-based medium. The heat treatment can be performed according to a known or common procedure (e.g., heating in a hot-air oven).

In an embodiment, the prepreg according to the present invention may further include a thermoplastic resin on its surface, namely, may be one prepared by impregnating or coating the reinforcement fibers with the water-dispersed resin composition according to the present invention and further coating the resulting fibers with the thermoplastic resin. This may allow the prepreg according to the present invention to have lower tack and to offer still better handleability in some types of the thermoplastic resin. The coating may be performed by any procedure not limited, such as a similar procedure to that in coating of the reinforcement fibers with the water-dispersed resin composition according to the present invention. The coating may be performed on the whole or part of the prepreg (before coating with the thermoplastic resin). The coating thickness and the mass of coating are adjustable as appropriate and are not limited. The coating with the thermoplastic resin gives a prepreg according to the present invention which includes the epoxy-amine adduct according to the present invention, the thermoplastic resin, and the reinforcement fibers (in particular, carbon fibers).

The thermoplastic resin is not limited and may be selected typically from the thermoplastic resins exemplified as the component of the thermoplastic resin composition according to the present invention. The prepreg may include each of different thermoplastic resin alone or in combination.

Of the prepregs according to the present invention, the thermoplastic prepreg is particularly effective and can advantageously be shapable in a shorter time as compared with general curable prepregs (e.g., thermosetting prepregs and photo-curable prepregs). The thermoplastic prepreg according to the present invention is therefore preferably usable particularly in uses requiring reduction in shaping or molding time (e.g., automobile part uses).

The prepreg according to the present invention (in particular, the prepreg derived from the water-dispersed resin composition according to the present invention) may contain the thermoplastic resin (or another resin component) in a content (blending amount) not limited, but preferably 0.1 to 99.9 weight percent, more preferably 1 to 99 weight percent, and furthermore preferably 2 to 98 weight percent, based on the total weight (100 weight percent) of the prepreg excluding the reinforcement fibers. The prepreg, when containing the component in a content of 0.1 weight percent or more, tends to allow the fiber-reinforced composite to have still better levels of heat resistance and mechanical properties (such as toughness). In contrast, the prepreg, when containing the component in a content of 99.9 weight percent or less, tends to allow the fiber-reinforced composite to have still better adhesion between the thermoplastic resin and the reinforcement fibers.

The prepreg according to the present invention (in particular, the prepreg derived from the water-dispersed resin composition according to the present invention) may contain the epoxy-amine adduct according to the present invention in a proportion (blending amount) not limited, but preferably 0.1 to 200 parts by weight, more preferably 1 to 100 parts by weight, and furthermore preferably 2 to 50 parts by weight, per 100 parts by weight of the resin component such as the thermoplastic resin. The prepreg, when containing the epoxy-amine adduct according to the present invention in a proportion of 0.1 part by weight or more, tends to offer still better adhesion between the thermoplastic resin and the reinforcement fibers in the fiber-reinforced composite. In contrast, the prepreg, when containing the epoxy-amine adduct according to the present invention in a proportion of 200 parts by weight or less, tends to allow the fiber-reinforced composite to maintain still higher levels of heat resistance and mechanical properties (such as toughness).

The prepreg according to the present invention may further include a common additive or additives. Non-limiting examples of the additives include polymerization initiators (e.g., thermal initiators and photoinitiators), curing agents, curing accelerators, antifoaming agents, leveling agents, coupling agents (e.g., silane coupling agents), surfactants, inorganic fillers (e.g., silica and alumina), flame retardants, colorants, antioxidants, ultraviolet absorbers, ion adsorbents, pigments, phosphors, and mold release agents. The amounts of these additives are not limited.

The prepreg according to the present invention forms a fiber-reinforced composite. This fiber-reinforced composite is also referred to as a "fiber-reinforced composite according to the present invention". More specifically, the prepreg according to the present invention, when molded or shaped, gives the fiber-reinforced composite.

Fiber-Reinforced Composite

The fiber-reinforced composites according to the present invention are formed from (derived from) the prepregs according to the present invention (in particular, the prepreg derived from the water-dispersed resin composition according to the present invention), as described above. The method for producing the fiber-reinforced composites is not limited and may be selected from known or common methods such as the above-exemplified methods. The fiber-reinforced composites according to the present invention have excellent adhesion between the thermoplastic resin and the reinforcement fibers and offer high mechanical properties (in particular, toughness).

The fiber-reinforced composites according to the present invention are usable as materials for various structures not limited, but are preferably usable as materials typically for the above-exemplified structures.

The epoxy-amine adducts according to the present invention (the epoxy-amine adducts according to the first, second, third, and fourth embodiments of the present invention) are widely usable not only in the above-mentioned uses, but also in uses in various fields, such as in paper making and paper converting fields; in adhesive industry fields; in ink and photographic industry fields; as flocculants, clarification agents, and floatation agents; as chelate resins, ion exchange resins, separation membranes, and adsorbents; in cosmetics and toiletries fields; as lubricants, rust inhibitors, and dispersing agents; as plating chemicals; in biological, medical, and enzymatic fields; and as cement additives and agents for oil drilling.

In the paper making and paper converting fields, the epoxy-amine adducts according to the present invention are usable typically as wet-strength additives; for promoting dewatering and for improving drainage in paper making process; as yield improvers typically for fine fibers, sizing agents, various loading materials, pigments, and dyestuffs; and for white water clarification and paper-making waste water treatment. More specifically, the epoxy-amine adducts according to the present invention are usable in embodiments and uses, via treatments with the epoxy-amine adducts according to the present invention, in ink-jet recording paper via improvement in water resistance of water-based inks using the reactivity between the epoxy-amine adducts according to the present invention and acidic dyes;

in greaseproof paper treated with a reaction product between a phosphoric ester and the epoxy-amine adduct according to the present invention; dyed paper using a quaternized or ethoxylated epoxy-amine adduct according to the present invention; as alkaline or neutral sizing agents (retention aids) using an anionic sizing agent and the epoxy-amine adduct according to the present invention; for softening, sizing, and wet strength improving of paper using a reaction product among the epoxy-amine adduct according to the present invention, a fatty acid, and epichlorohydrin; in heat-resistant paper using a polyphosphoric acid flame retardant ad the epoxy-amine adduct according to the present invention; and as waste-paper deinking agents using an alkoxylated epoxy-amine adduct according to the present invention.

In the adhesive industry fields, the epoxy-amine adducts according to the present invention are usable in uses such as water-soluble adhesion promoters (anchoring agents for lamination). More specifically, the epoxy-amine adducts according to the present invention are usable typically in or for FRP products treated with the epoxy-amine adducts according to the present invention; water-dispersive adhesive compositions including a reaction product between the epoxy-amine adduct according to the present invention and a polyepoxide (polyepoxy compound); pressure-sensitive adhesive compositions for packaging or for masking tapes, where the adhesive compositions include a diene polymer and the epoxy-amine adduct according to the present invention; rubber/metal adhesion promoters containing a metal complex including the epoxy-amine adduct according to the present invention and a nickel or cobalt salt; emulsion adhesives of water-soluble vinyl acetate copolymers modified with the epoxy-amine adduct according to the present invention; two-component fast curing water-based adhesives for wood or tile use, where the adhesives include the epoxy-amine adduct according to the present invention and an acetoacetylated poly(vinyl alcohol); hot-melt moisture-activated adhesives including the epoxy-amine adduct according to the present invention, a hydroxy-substituted organic compound, and a compatible pressure-sensitive adhesive; and any other embodiments and uses.

In the ink and photographic industry fields, the epoxy-amine adducts according to the present invention are usable typically or improving storage stability of color developers, and eliminating or minimizing color contamination; and for imparting antistatic properties to silver halide photosensitive materials; and for improving color fastness to water in ink-jet compositions. More specifically, the epoxy-amine adducts according to the present invention are usable typically in or for color developers containing diethylhydroxyamine and the epoxy-amine adduct according to the present invention; silver halide photosensitive materials using or including an ionic-conductive polymeric complex including the epoxy-amine adduct according to the present invention and a metal salt; ink-jet compositions including a hydroxyethylated epoxy-amine adduct according to the present invention and a water-soluble dyestuff; and any other embodiments and uses.

In the fiber industry fields, the epoxy-amine adducts according to the present invention are usable in uses such as dye-affinity improvement, shrink-resistant finish, fire-proofing treatment, and antistatic treatment of cellulose fibers and other various fibers. More specifically, the epoxy-amine adducts according to the present invention are usable typically in or for antistatic polyamide compositions treated with an acylated product of the epoxy-amine adduct according to the present invention; antistatic agents for synthetic fibers, where the antistatic agents include an amphoteric polymer obtained by adding an alkylene oxide and an ethylenically unsaturated monomer to the epoxy-amine adduct according to the present invention; fiber sheets prepared by internally adding the epoxy-amine adduct according to the present invention and an anionic latex to fiber slurry; functional fibers obtained by mixing the epoxy-amine adduct according to the present invention with a poly (vinyl alcohol), subjecting the mixture to dry spinning to give fibers, and crosslinking the fibers typically using glutaraldehyde; and fireproof fibers treated with the epoxy-amine adduct according to the present invention and a halophosphate; and any other embodiments and uses.

The epoxy-amine adducts according to the present invention are usable as flocculants, clarification agents, and floatation agents, as described above. For example, the epoxy-amine adducts are usable in uses such as exchange agents for waste water purification; flocculants for activated sludge; flocculants for pulp waste water; water treatment agents for removing organic or inorganic substances dispersed, emulsified, and/or dissolved in water; in treatments for water containing a waste paint in wet paint booth circulating water; aggregation and recovery of silica dissolved in geothermal water; aggregation of coal and minerals; collection of harmful heavy metals from waste water; and recovery of oils from waste water upon petroleum recovery. More specifically, the epoxy-amine adducts according to the present invention are usable typically in or for exchange agents for waste water purification, where the exchange agents use (include) modified products of cellulose or a derivative thereof modified with the epoxy-amine adduct according to the present invention; pulp waste water flocculants including the epoxy-amine adduct according to the present invention and an inorganic salt; porous materials for water treatment, where the materials include a polyethylene, silica, and the epoxy-amine adduct according to the present invention; aggregation of coal and minerals, using an adduct between starch xanthate and the epoxy-amine adduct according to the present invention; oil recovery from waste water upon petroleum recovery, using a reaction product between the epoxy-amine adduct according to the present invention and epichlorohydrin; and any other embodiments and uses.

The epoxy-amine adducts according to the present invention are usable as chelate resins, ion exchange resins, separation membranes, and adsorbents, as described above. The epoxy-amine adducts are usable in uses such as anion-exchange resins; heavy metal adsorbents; chelate resins; uranium adsorbents; low-molecular metal chelate adsorbents; high-performance reverse osmosis composite membranes; controlled release using a high electrolyte microcapsule separation membrane; ion selective electrodes; acidic gas adsorbents; and separation membranes for high-concentration sugar solution (syrup) production. More specifically, the epoxy-amine adducts according to the present invention are usable typically in or for anion-exchange resins derived from the epoxy-amine adduct according to the present invention in combination typically with epihalohydrin; heavy metal adsorbents including activated carbon loaded with a reaction product between the epoxy-amine adduct according to the present invention and carbon disulfide; chelate resins including a chloromethylated crosslinked polystyrene grafted with the epoxy-amine adduct according to the present invention and epichlorohydrin; uranium adsorbents including a polyion complex formed from (derived from) a carboxy-containing polymer and the epoxy-amine adduct according to the present invention; low-molecular metal chelate adsorbents using an ion exchanger containing active groups derived from the epoxy-amine adduct according to the present invention; ion selective electrodes using (including) a membrane containing the epoxy-amine adduct according to the present invention or a derivative thereof; acidic gas adsorbents including a porous material and the epoxy-amine adduct according to the present invention attached to or reacted with the surface of the porous material; separation membranes for high-concentration sugar solution (syrup) production, where the separation membranes include a reaction product between the epoxy-amine adduct according to the present invention and a dialdehyde; and any other embodiments and uses.

In the cosmetics and toiletries fields, the epoxy-amine adducts according to the present invention are usable in uses such as skin cleansing bar soaps; hair cosmetics such as shampoos, hair conditioners (hair rinses), and hair treatments; nail enamel compositions; and removal of dirt stains and elimination or minimization of resoiling. More specifically, the epoxy-amine adducts according to the present invention are usable typically in or for skin cleansing bar soaps containing the epoxy-amine adduct according to the present invention or a modified derivative thereof; hair cosmetics including the epoxy-amine adduct according to the present invention or a derivative thereof; nail enamel compositions including a polyion complex synthesized by the reaction between an anionic polymeric salt and the epoxy-amine adduct according to the present invention; removal of dirt stains and elimination or minimization of resoiling, using an ethoxylated epoxy-amine adduct according to the present invention; and any other embodiments and uses.

The epoxy-amine adducts according to the present invention are usable as lubricants, rust inhibitors, and dispersing agents, as described above. For example, the epoxy-amine adducts are usable in uses such as metalworking fluid compositions; metal rolling lubricating oils; dispersing agents for ceramics; dispersing agents in magnetic layers of magnetic recording media; dispersing agents for coal-water slurry; elimination or minimization of ash deposition typically on metals in pulverized coal-oil mixtures (coal-oil pastes); and conversion of fine silica powder into a high-concentration, low-viscosity water slurry. More specifically, the epoxy-amine adducts according to the present invention are usable in or for metalworking fluid compositions including, as an active ingredient, a condensate between a carboxylic acid and the epoxy-amine adduct according to the present invention; metal rolling lubricating oils containing a dispersing agent including an epoxy adduct between an oil/fat component and the epoxy-amine adduct according to the present invention; magnetic recording media including, as a dispersing agent, a reaction product between the epoxy-amine adduct according to the present invention and a carboxy-containing polyester in magnetic layers; dispersing agents for coal-water slurry, where the dispersing agents include a polyoxyalkylene ether of the epoxy-amine adduct according to the present invention and a formalin condensate of an aromatic sulfonate; elimination or minimization of ash deposition typically on metals, by the addition of an alkylene oxide adduct of the epoxy-amine adduct according to the present invention to pulverized coal-oil mixtures (coal-oil pastes); and any other embodiments and uses.

The epoxy-amine adducts according to the present invention are usable as plating chemicals, as described above. For example, the epoxy-amine adducts are usable in uses such as gloss improvements; electrodeposition of bright copper on electronic circuit-printed wiring boards; acid zinc plating; high-speed copper electroplating; and formation of electroless coatings. More specifically, the epoxy-amine adducts according to the present invention are usable for gloss improvement by adding the epoxy-amine adducts to plating baths such as black rhodium plating baths; formation of electroless plating coatings, where the coatings include a transparent conductive film activated with the epoxy-amine adduct according to the present invention; and any other embodiments and uses.

In the biological, medical, and enzymatic fields, the epoxy-amine adducts according to the present invention are usable typically in uses such as enzyme entrapping immobilization such as paratinose production using $\alpha$-glucosyltransferase, immobilization of sucrose mutase, immobilization typically of alcohol oxidases, glucose oxidases, and cholesterol oxidases, immobilization of *Bacillus subtilis* using a derivative corresponding to 7-$\beta$-acylamidocephalosporanic acid, except leaving 3-acetoxy group therefrom, and production of L-phenylalanine from trans-cinnamic acid using immobilized *Sporobolomyces roseus*; purification of DNA polymerase III from a cell-free extract of *Escherichia coli*; detection of analytes by immunofluorescent antibody technique; purification of human interferon-$\beta$; monoclonal purification of monoclonal antibodies; synthesis of anticoagulant agents; and use of enzyme-immobilized membranes. More specifically, the epoxy-amine adducts according to the present invention are usable typically in or for entrapping immobilization of enzymes using the epoxy-amine adduct according to the present invention or a derivative thereof and one or more other components such as glutaraldehyde, alginic acid, and tannin acid; analyte detection by the immunofluorescent antibody technique using a reaction product between the epoxy-amine adduct according to the present invention and a functional fluorescent dye molecule; monoclonal purification of monoclonal antibodies using silica gel carrying the epoxy-amine adduct according to the present invention; synthesis of anticoagulant agents using a sulfonated epoxy-amine adduct according to the present invention; enzyme-immobilized membranes obtained by crosslinking of the epoxy-amine adduct according to the present invention with a dialdehyde; and any other embodiments and uses.

The epoxy-amine adducts according to the present invention are usable as cement additives and agents for oil drilling, as described above. For example, the epoxy-amine adducts are usable typically in uses such as cement water-reducing admixtures; fluid-loss-control additives in cementing for petroleum drilling (oil production); and concrete admixtures. More specifically, the epoxy-amine adducts according to the present invention are usable typically in or for cement water-reducing agents using a hydroxyalkylated epoxy-amine adduct according to the present invention; concrete admixtures using a carboxyethylated epoxy-amine adduct according to the present invention; and any other embodiments and uses.

The epoxy-amine adducts according to the present invention are also usable as primers typically for metals, steel sheets, and resins so as to increase the adhesive strength between the metal and the resin, or between the resins.

In addition, the epoxy-amine adducts according to the present invention are usable typically in uses such as solid electrolyte compositions; metal ion bonding; stacking (stacking process) of monomolecular films; sustained-release microcapsule production; and antimicrobial treatment or microbe elimination in water. More specifically, the epoxy-amine adducts according to the present invention are usable typically in or for solid electrolyte compositions using or including a crosslinked derivative of the epoxy-amine adduct according to the present invention and a multifunctional epoxide; metal ion bonding using the epoxy-amine adduct according to the present invention or a derivative thereof; stacking (accumulation; stacking process) of monomolecular films by treatment of a solid substrate surface with the epoxy-amine adduct according to the present invention; production of sustained-release microcapsules by interfacial polymerization of the epoxy-amine adduct according to the present invention with a diisocyanate compound; antimicrobial treatment on or microbe elimination from water using a polystyrene grafted with the epoxy-amine adduct according to the present invention; and any other embodiments and uses.

Carbon-Fiber Treatment Agent

The epoxy-amine adducts according to the present invention may each be used to give a carbon-fiber treatment agent. As used herein, the term "carbon-fiber treatment agent" refers to a coating agent to be applied onto carbon fibers. Specifically, the carbon-fiber treatment agent according to the present invention is a coating agent for carbon fibers, where the coating agent includes the epoxy-amine adduct according to the present invention as an essential component. The carbon-fiber treatment agent may also be used as a binder, when applied to carbon fibers to give a nonwoven fabric so as to maintain the shape of the nonwoven fabric. The carbon-fiber treatment agent according to the present invention may also be used to give a fiber-reinforced composite by treating carbon fibers with the treatment agent to give a structure, and impregnating the structure with a matrix resin.

The carbon-fiber treatment agent according to the present invention has only to include the epoxy-amine adduct according to the present invention as an essential component. The carbon-fiber treatment agent may further include one or more additional components such as solvents and other additives, in addition to the epoxy-amine adduct according to the present invention, or may include the epoxy-amine adduct according to the present invention alone (may be the epoxy-amine adduct according to the present invention itself). However, the carbon-fiber treatment agent is different from the matrix resin which acts as a principal component of the fiber-reinforced composite, as described above. The carbon-fiber treatment agent according to the present invention may be, for example, in the form of a solution (e.g., aqueous solution) or a dispersion (e.g., water dispersion). A solvent (medium) for use in the formation of the solution or dispersion may be selected typically from the above-exemplified solvents. Examples of the other additives include, but are not limited to, lubricants such as fatty acids, amides, and esters; and coupling agents such as silane coupling agents and titanium coupling agents.

The contents (blending amounts) of the epoxy-amine adduct according to the present invention, the solvent, and other additives in the carbon-fiber treatment agent according to the present invention are not limited and are independently adjustable as appropriate.

The carbon-fiber treatment agent according to the present invention, when used to treat carbon fibers therewith, gives carbon fibers bearing the epoxy-amine adduct according to the present invention attached or deposited on their surface. The treatment with the carbon-fiber treatment agent according to the present invention may be performed by any technique not limited, and may be performed typically by the techniques exemplified as techniques for coating carbon fibers with the sizing agents according to the present invention.

EXAMPLES

The present invention will be illustrated in further detail with reference to several examples (working examples) below. It should be noted, however, that the examples are by no means intended to limit the scope of the present invention.

Example 1-1

Epoxy-Amine Adduct Production

Materials used herein included 3,4-epoxycyclohexylmethyl (3,4-epoxy)cyclohexanecarboxylate (trade name CELLOXIDE 2021P, supplied by Daicel Corporation) as an epoxide (A); and triethylenetetramine (trade name TETA, supplied by Huntsman Corporation) as an amine (B).

In a 1-L stainless reactor, 372.0 g of the amine (B) were charged, and 627.6 g of the epoxide (A) were added dropwise thereto at 160° C. in a nitrogen atmosphere over 60 minutes. The components were then stirred at 200° C. for 3 hours and further at 220° C. for 2 hours to react with each other, and yielded an epoxy-amine adduct (amine adduct).

After natural cooling, the contents were discharged from the reactor onto a release paper at such a stage that the contents still had fluidity (at 130° C. to 150° C.). The resulting article was further cooled to be solidified, was pulverized, and yielded 990 g of the epoxy-amine adduct.

Epoxy-Amine Adduct Aqueous Solution Production

Next, 40 g of the above-prepared epoxy-amine adduct and 60 g of pure water were placed in a 150-mL flask, were stirred to dissolve the epoxy-amine adduct, and yielded a 40% epoxy-amine adduct aqueous solution. The prepared aqueous solution was a homogeneous aqueous solution.

Sizing Treatment Liquid Preparation

Next, 62.5 g of the above-prepared 40% epoxy-amine adduct aqueous solution were combined with 500 g of ethanol, further combined with 462.5 g of pure water, and yielded a sizing treatment liquid (sizing agent). The impregnating ability of the sizing treatment liquid was evaluated by a procedure mentioned below. As a result, a fiber bundle was immediately wetted with the treatment liquid on surface and went down to the bottom (5 cm deep) of a glass vessel in about 4 seconds. This demonstrated that the treatment liquid offers very good immersing ability with respect to the fiber bundle. In this connection, preparation of a sizing treatment liquid was attempted by the above procedure, except using 500 g of pure water instead of the 500 g of ethanol and thereby diluting the aqueous solution with water alone. However, the resulting article was unusable as a treatment liquid because of precipitation of the epoxy-amine adduct.

Treatment Liquid Impregnating Ability Evaluation

The sizing treatment liquid (water-based dispersion) was charged into a glass vessel to a height of 5 cm from the bottom. A bundle of reinforcement fibers before treatment (an unsized carbon fiber bundle, trade names TENAX STS-24K N00, supplied by Toho Tenax Co., Ltd.), where fiber bundle had been cut to a length of 1 cm in the fiber direction, was placed on the treatment liquid, and how the fiber bundle surface was wetted with the liquid after the placement on the liquid was observed, and the time for the fiber bundle to go down to the bottom of the glass vessel was measured. On the basis of these, the impregnating ability of the treatment liquid was evaluated.

Sizing-Agent-Loaded Reinforcement Fiber Production

An untreated reinforcement fiber bundle (a carbon fiber bundle, trade name TENAX STS-24K N00, supplied by Toho Tenax Co., Ltd.) was continuously immersed in a bath of the above-prepared treatment liquid to allow the treatment liquid to be permeated among filaments (single yarns) in the fiber bundle. The resulting article was allowed to pass through a drying oven at 150° C. over 120 seconds, was wound using a winder, and yielded a sizing-agent-loaded reinforcement fiber bundle. The reinforcement fiber bundle immediately after going out of the drying oven had somewhat hard feel and texture, but, as passing through between rollers in the step of winding with the wider, became to have soft feel and texture suitable for processing. The resulting reinforcement fiber bundle offered low surface tack, and approximately no resin deposition on rollers was observed during the process. The prepared reinforcement fiber bundle had a mass of coating (mass of loading) of the treatment liquid in solids content of 1.3 parts by weight per 100 parts by weight of the reinforcement fibers.

A thermoplastic resin (polyamide (nylon 6) resin) for composites was placed on the treated reinforcement fiber bundle and subjected to a heat treatment at 280° C. for 10 minutes. As a result, the thermoplastic resin ball on the reinforcement fiber bundle spread, via wetting, along the longitudinal direction of the reinforcement fiber bundle. This demonstrated that the reinforcement fiber bundle has good wettability. The interfacial adhesion of the reinforcement fiber bundle with a thermoplastic resin was determined by the following procedure and was found to be a very high interfacial adhesion of 55 MPa.

Evaluation of Adhesion Between Sizing-Agent-Loaded Reinforcement Fibers and Matrix Resin The adhesion (adhesiveness) was evaluated using Evaluation Equipment for Interfacial Properties of Composite Materials HM410 (supplied by Tohei Sangyo Co., Ltd.) by the micro-droplet method. A monofilament of the reinforcement fibers (sizing-agent-loaded reinforcement fibers) was set in the evaluation equipment for interfacial properties of composite materials. A thermoplastic resin (matrix resin for composites) was melted on the equipment to form a drop on the reinforcement fiber filament, cooled down to room temperature, and yielded a measurement sample. The measurement sample was again placed in the equipment, the drop was held between a pair of blades in the equipment, the reinforcement fiber filament was allowed to travel on the equipment at a rate of 0.06 mm per minute, and a maximum pull-out load F was measured upon pulling out of the drop from the reinforcement fiber filament. The interfacial shear strength T was calculated according to an expression below to evaluate the adhesiveness between the matrix resin and the reinforcement fiber filament loaded with the sizing agent.

Interfacial shear strength $\tau$ (in MPa)=$F/\pi dl$ where F represents the maximum pull-out load, d represents the diameter of the reinforcement fiber filament, and l represents the diameter of the drop in the pull-out direction.

Composite Production

The above-prepared sizing-agent-loaded reinforcement fibers were shaped into a sheet, impregnated with a thermoplastic resin (polyamide (nylon 6) resin) as a matrix resin for composites, and yielded thermoplastic resin prepregs each having a mass per unit area (METSUKE) of 300 g/m$^2$ and a fiber content in volume of 50 volume percent. Ten plies of the prepared thermoplastic resin prepregs were stacked, heated at a pressure of 3 MPa for 5 minutes using a press (press machine) heated at 260° C., and yielded a composite (fiber-reinforced thermoplastic resin molded article) having a thickness of 2 mm and a fiber content in volume of 50 volume percent.

The prepared composite was cut, the cut section was polished, observed with a microscope, and found to include few voids (few voids, few vacancies). This indicated that the composite has excellent adhesion and satisfactory impregnating ability between the fibers and the matrix resin.

Example 1-2

Epoxy-Amine Adduct Production

Materials used herein included 3,4-epoxycyclohexylmethyl (3,4-epoxy)cyclohexanecarboxylate (trade name CELLOXIDE 2021P, supplied by Daicel Corporation) as an epoxide (A); and triethylenetetramine (trade name TETA, supplied by Huntsman Corporation) and isophoronediamine (trade name VESTAMIN IPD, supplied by Evonik Degussa Japan Co., Ltd.) as amines (B).

In a 1-L stainless reactor, a mixture of 228.0 g of triethylenetetramine and 171.0 g of isophoronediamine was placed, and 632.5 g of the epoxide (A) were added dropwise thereto at 160° C. in a nitrogen atmosphere over 60 minutes. The components were then stirred at 200° C. for 3 hours and further at 220° C. for 2 hours to react with each other, and yielded an epoxy-amine adduct (amine adduct).

After natural cooling, the contents were discharged from the reactor onto a release paper at such a stage that the contents still had fluidity (at 130° C. to 150° C.). The resulting article was further cooled to be solidified, was pulverized, and yielded 1000 g of the epoxy-amine adduct.

Epoxy-Amine Adduct Aqueous Solution Production

Next, 40 g of the above-prepared epoxy-amine adduct and 60 g of pure water were placed in a 150-mL flask, were stirred to dissolve the epoxy-amine adduct, and yielded a 40% epoxy-amine adduct aqueous solution. The prepared aqueous solution was a homogeneous aqueous solution.

Sizing Treatment Liquid Preparation

Next, 62.5 g of the above-prepared 40% epoxy-amine adduct aqueous solution were combined with 500 g of ethanol, further combined with 462.5 g of pure water, and yielded a sizing treatment liquid (sizing agent). The impregnating ability of the sizing treatment liquid was evaluated by a procedure similar to that in Example 1-1. As a result, the fiber bundle was immediately wetted on surface and went down to the bottom (5 cm deep) of the glass vessel in about 4 seconds. This demonstrated that the treatment liquid offers very good immersing ability with respect to the fiber bundle. In this connection, preparation of a treatment liquid was attempted by the above procedure, except using pure water instead of the ethanol and thereby diluting the aqueous solution with water alone. However, the resulting liquid was hardly usable to perform a homogenous treatment, because of precipitation of the epoxy-amine adduct.

Sizing-Agent-Loaded Reinforcement Fibers Production

An untreated reinforcement fiber bundle (a carbon fiber bundle, trade name TENAX STS-24K N00, supplied by Toho Tenax Co., Ltd.) was continuously immersed in a bath of the above-prepared treatment liquid to allow the treatment liquid to be permeated among filaments (single yarns) in the fiber bundle. The resulting article was allowed to pass through a drying oven at 150° C. over 120 seconds, was wound using a winder, and yielded a sizing-agent-loaded reinforcement fiber bundle. The reinforcement fiber bundle immediately after going out of the drying oven had somewhat hard feel and texture, but, as passing through between rollers in the step of winding with the wider, became to have soft feel and texture suitable for processing. The resulting reinforcement fiber bundle offered low surface tack, and approximately no resin deposition on rollers was observed during the process. The prepared reinforcement fiber bundle had a mass of loading of the treatment liquid in terms of solids content of 1.2 parts by weight per 100 parts by weight of the reinforcement fibers.

A thermoplastic resin (polyamide (nylon 6) resin) for composites was placed on the treated reinforcement fiber bundle and subjected to a heat treatment at 280° C. for 10 minutes. As a result, the thermoplastic resin ball on the reinforcement fiber bundle spread, via wetting, along the longitudinal direction of the reinforcement fiber bundle. This demonstrated that the reinforcement fiber bundle has good wettability. The interfacial adhesion of the reinforcement fiber bundle with a thermoplastic resin was determined by a procedure similar to that in Example 1-1 and was found to be a very high interfacial adhesion of 58 MPa.

Composite Production

Except using the above-prepared sizing-agent-loaded reinforcement fibers, a composite (fiber-reinforced thermoplastic resin molded article) was prepared by a procedure similar to that in Example 1-1. The composite had a thickness of 2 mm and a fiber content in volume of 50 volume percent. The prepared composite was cut, the cut section was polished, observed with a microscope, and found to include few voids (vacancies). This indicated that the composite has excellent adhesion and impregnating ability between the fibers and the matrix resin.

Example 1-3

Epoxy-Amine Adduct Production

Materials used herein included 3,4-epoxycyclohexylmethyl (3,4-epoxy)cyclohexanecarboxylate (trade name CELLOXIDE 2021P, supplied by Daicel Corporation) as an epoxide (A); and an amino-terminated polypropylene glycol (trade name JEFFAMINE D-230, supplied by Huntsman Corporation) and isophoronediamine (trade name VESTAMIN IPD, supplied by Evonik Degussa Japan Co., Ltd.) as amines (B).

In a 1-L stainless reactor, 120.0 g of the amino-terminated polypropylene glycol, 120.0 g of isophoronediamine, and 299.5 g of the epoxide (A) were placed. The components were stirred at 160° C. in a nitrogen atmosphere for 2 hours to react with each other, and yielded an epoxy-amine adduct (amine adduct).

After natural cooling, the contents were discharged from the reactor onto a release paper at such a stage that the contents still had fluidity (at 130° C. to 150° C.). The resulting article was further cooled to be solidified, was pulverized, and yielded 530 g of the epoxy-amine adduct.

Example 1-4

Epoxy-Amine Adduct Production

Materials used herein included 3,4-epoxycyclohexylmethyl (3,4-epoxy)cyclohexanecarboxylate (trade name CELLOXIDE 2021P, supplied by Daicel Corporation) as an epoxide (A); and an amino-terminated polypropylene glycol (trade name JEFFAMINE D-230, supplied by Huntsman Corporation) and isophoronediamine (trade name VESTAMIN IPD, supplied by Evonik Degussa Japan Co., Ltd.) as amines (B).

In a 1-L flask (reactor), 299.5 g of the epoxide (A) was placed, and a mixture of 120.0 g of the amino-terminated polypropylene glycol and 120.0 g of isophoronediamine was added dropwise thereto at 160° C. over 60 minutes. The components were then stirred at 160° C. in a nitrogen atmosphere for 2 hours to react with each other, and yielded an epoxy-amine adduct (amine adduct).

After natural cooling, the contents were discharged from the reactor onto a release paper at such a stage that the contents still had fluidity (at 130° C. to 150° C.). The resulting article was further cooled to be solidified, was pulverized, and yielded 530 g of the epoxy-amine adduct.

Example 1-5

Epoxy-Amine Adduct Production

Materials used herein included 3,4-epoxycyclohexylmethyl (3,4-epoxy)cyclohexanecarboxylate (trade name CELLOXIDE 2021P, supplied by Daicel Corporation) as an epoxide (A); and an amino-terminated polypropylene glycol (trade name JEFFAMINE D-230, supplied by Huntsman Corporation) and isophoronediamine (trade name VESTAMIN IPD, supplied by Evonik Degussa Japan Co., Ltd.) as amines (B).

In a 1-L flask (reactor), a mixture of 120.0 g of the amino-terminated polypropylene glycol and 120.0 g of isophoronediamine was placed, and 299.5 g of the epoxide (A) were added dropwise thereto at 160° C. over 60 minutes. The components were then stirred at 160° C. in a nitrogen atmosphere for 2 hours to react with each other, and yielded an epoxy-amine adduct (amine adduct).

After natural cooling, the contents were discharged from the reactor onto a release paper at such a stage that the contents still had fluidity (at 130° C. to 150° C.). The resulting article was further cooled to be solidified, was pulverized, and yielded 530 g of the epoxy-amine adduct.

Example 1-6

Epoxy-Amine Adduct Production

Materials used herein included 3,4-epoxycyclohexylmethyl (3,4-epoxy)cyclohexanecarboxylate (trade name CELLOXIDE 2021P, supplied by Daicel Corporation) as an epoxide (A); and an amino-terminated polypropylene glycol (trade name JEFFAMINE D-230, supplied by Huntsman Corporation) as an amine (B).

In a 1-L stainless reactor, 390.0 g of the amino-terminated polypropylene glycol were placed, and 409.8 g of the epoxide (A) were added dropwise thereto at 160° C. in a nitrogen atmosphere over 60 minutes. The components were then stirred at 200° C. for 3 hours and further at 220° C. for 2 hours to react with each other, and yielded an epoxy-amine adduct (amine adduct).

After natural cooling, the contents were discharged from the reactor onto a release paper at such a stage that the contents still had fluidity (at 130° C. to 150° C.). The resulting article was further cooled to be solidified, was pulverized, and yielded 790 g of the epoxy-amine adduct.

Epoxy-Amine Adduct Aqueous Solution Production

Next, 40 g of the above-prepared epoxy-amine adduct and 60 g of pure water were placed in a 150-mL flask, were stirred to dissolve the epoxy-amine adduct, and yielded a 40% epoxy-amine adduct aqueous solution. The prepared aqueous solution was a homogeneous aqueous solution.

Sizing Treatment Liquid Preparation

Next, 50 g of the above-prepared 40% epoxy-amine adduct aqueous solution was combined with 500 g of ethanol, further combined with 470 g of pure water, and yielded a sizing treatment liquid (sizing agent). The impregnating ability of the sizing treatment liquid was evaluated by a procedure similar to that in Example 1-1. As a result, the fiber bundle was immediately wetted on surface and went down to the bottom (5 cm deep) of the glass vessel in about 3 seconds. This demonstrated that the treatment liquid has very good immersing ability with respect to the fiber bundle. However, when a sizing treatment liquid was tried to prepare by the above procedure, except for using pure water instead of the 500 g of ethanol and thereby diluting the aqueous solution with water alone, the resulting liquid was hardly usable as a treatment liquid because of precipitation of the epoxy-amine adduct.

Sizing-Agent-Loaded Reinforcement Fibers Production

An untreated reinforcement fiber bundle (a carbon fiber bundle, trade name TENAX STS-24K N00, supplied by Toho Tenax Co., Ltd.) was continuously immersed in a bath of the above-prepared treatment liquid to allow the treatment liquid to be permeated among filaments (single yarns) in the fiber bundle. The resulting article was allowed to pass through a drying oven at 150° C. over 120 seconds, was wound using a winder, and yielded a sizing-agent-loaded reinforcement fiber bundle. The reinforcement fiber bundle immediately after going out of the drying oven had somewhat hard feel and texture, but, as passing through between rollers in the step of winding with the wider, became to have soft feel and texture suitable for processing. The resulting reinforcement fiber bundle offered low surface tack, and approximately no resin deposition on rollers was observed during the process. The prepared reinforcement fiber bundle had a mass of loading of the treatment liquid in terms of solids content of 0.9 part by weight per 100 parts by weight of the reinforcement fibers.

A thermoplastic resin (polyamide (nylon 6) resin) for composites was placed on the treated reinforcement fiber bundle and subjected to a heat treatment at 280° C. for 10 minutes. As a result, the thermoplastic resin ball on the reinforcement fiber bundle spread, via wetting, along the longitudinal direction of the reinforcement fiber bundle. This demonstrated that the reinforcement fiber bundle has good wettability. The interfacial adhesion of the reinforcement fiber bundle with a thermoplastic resin was determined by a procedure similar to that in Example 1-1 and was found to be a high interfacial adhesion of 51 MPa.

Composite Production

Except using the above-prepared sizing-agent-loaded reinforcement fibers, a composite (fiber-reinforced thermoplastic resin molded article) was prepared by a procedure similar to that in Example 1-1. The composite had a thickness of 2 mm and a fiber content in volume of 50 volume percent. The prepared composite was cut, and the cut section was polished and observed with a microscope. As a result, a certain quantity of voids (vacancies) was observed, where the voids were probably formed by some decomposed products, but the composite was found to offer excellent adhesion between the fibers and the matrix resin.

Example 1-7

Epoxy-Amine Adduct Production

Materials used herein included 3,4-epoxycyclohexylmethyl (3,4-epoxy)cyclohexanecarboxylate (trade name CELLOXIDE 2021P, supplied by Daicel Corporation) as an epoxide (A); and an amino-terminated polypropylene glycol (trade name JEFFAMINE D-230, supplied by Huntsman Corporation) and triethylenetetramine (trade name TETA, supplied by Huntsman Corporation) as amines (B).

In a 1-L stainless reactor, a mixture of 110.0 g of the amino-terminated polypropylene glycol and 110.0 g of triethylenetetramine was placed, and 298.8 g of the epoxide (A) was added dropwise thereto at 160° C. in a nitrogen atmosphere over 60 minutes. The components were then stirred at 200° C. for 3 hours and further at 220° C. for 2 hours to react with each other, and yielded an epoxy-amine adduct (amine adduct).

After natural cooling, the contents were discharged from the reactor onto a release paper at such a stage that the contents still had fluidity (at 130° C. to 150° C.). The resulting article was further cooled to be solidified, was pulverized, and yielded 510.0 g of the epoxy-amine adduct.

Example 1-8

Epoxy-Amine Adduct Production

Materials used herein included 3,4-epoxycyclohexylmethyl (3,4-epoxy)cyclohexanecarboxylate (trade name CELLOXIDE 2021P, supplied by Daicel Corporation) as an epoxide (A); and ethylenediamine (trade name EDA, supplied by Huntsman Corporation) as an amine (B).

In a 200-mL flask (reactor), 64.2 g of the epoxide (A) were placed, and 15.6 g of ethylenediamine were added dropwise thereto at 160° C. over 60 minutes. The components were then stirred at 160° C. in a nitrogen atmosphere for 2 hours to react with each other, and yielded an epoxy-amine adduct (amine adduct).

After natural cooling, the contents were discharged from the reactor onto a release paper at such a stage that the contents still had fluidity (at 130° C. to 150° C.). The resulting article was further cooled to be solidified, was pulverized, and yielded 79.0 g of the epoxy-amine adduct.

Example 1-9

Epoxy-Amine Adduct Production

Materials used herein included 3,4-epoxycyclohexylmethyl (3,4-epoxy)cyclohexanecarboxylate (trade name CELLOXIDE 20219, supplied by Daicel Corporation) as an epoxide (A); and tetraethylenepentamine (trade name TEPA, supplied by Huntsman Corporation) as an amine (B).

In a 200-mL flask (reactor), 59.6 g of the epoxide (A) were placed, and 45.6 g of tetraethylenepentamine were added dropwise thereto at 160° C. over 60 minutes. The components were then stirred at 160° C. in a nitrogen atmosphere for 2 hours to react with each other, and yielded an epoxy-amine adduct (amine adduct).

After natural cooling, the contents were discharged from the reactor onto a release paper at such a stage that the contents still had fluidity (at 130° C. to 150° C.). The resulting article was further cooled to be solidified, was pulverized, and yielded 105.0 g of the epoxy-amine adduct.

Epoxy-Amine Adduct Aqueous Solution Production

Next, 40 g of the above-prepared epoxy-amine adduct and 60 g of pure water were placed in a 150-mL flask, were stirred to dissolve the epoxy-amine adduct, and yielded a 40% epoxy-amine adduct aqueous solution. The prepared aqueous solution was a homogeneous aqueous solution.

Sizing Treatment Liquid Preparation

Next, 50 g of the above-prepared 40% epoxy-amine adduct aqueous solution were combined with 500 g of ethanol, further combined with 470 g of pure water, and yielded a sizing treatment liquid (sizing agent). The impregnating ability of the sizing treatment liquid was evaluated by a procedure similar to that in Example 1-1. As a result, the fiber bundle was immediately wetted on surface and went down to the bottom (5 cm deep) of the glass vessel in about 3 seconds. This demonstrated that the treatment liquid has very good immersing ability with respect to the fiber bundle. In this connection, preparation of a treatment liquid was attempted by the above procedure, except using pure water instead of the ethanol and thereby diluting the aqueous solution with water alone. However, the resulting treatment liquid was hardly usable for a homogeneous treatment, because of precipitation of the epoxy-amine adduct.

Sizing-Agent-Loaded Reinforcement Fibers Production

An untreated reinforcement fiber bundle (a carbon fiber bundle, trade name TENAX STS-24K N00, supplied by Toho Tenax Co., Ltd.) was continuously immersed in a bath of the above-prepared treatment liquid to allow the treatment liquid to be permeated among filaments (single yarns) in the fiber bundle. The resulting article was allowed to pass through a drying oven at 150° C. over 120 seconds, was wound using a winder, and yielded a sizing-agent-loaded reinforcement fiber bundle. The reinforcement fiber bundle immediately after going out of the drying oven had somewhat hard feel and texture, but, as passing through between rollers in the step of winding with the wider, became to have soft feel and texture suitable for processing. The resulting reinforcement fiber bundle offered low surface tack, and approximately no resin deposition on rollers was observed during the process. The prepared reinforcement fiber bundle had a mass of loading of the treatment liquid in terms of solids content of 0.9 part by weight per 100 parts by weight of the reinforcement fibers.

A thermoplastic resin (polyamide (nylon 6) resin) for composites was placed on the treated reinforcement fiber bundle and subjected to a heat treatment at 280° C. for 10 minutes. As a result, the thermoplastic resin ball on the reinforcement fiber bundle spread, via wetting, along the longitudinal direction of the reinforcement fiber bundle. This demonstrated that the reinforcement fiber bundle has good wettability. The interfacial adhesion of the reinforcement fiber bundle with a thermoplastic resin was determined by a procedure similar to that in Example 1-1 and was found to be a high interfacial adhesion of 50 MPa.

Composite Production

Except using the above-prepared sizing-treated reinforcement fibers, a composite (fiber-reinforced thermoplastic resin molded article) was prepared by a procedure similar to that in Example 1-1. The composite had a thickness of 2 mm and a fiber content in volume of 50 volume percent. The prepared composite was cut, the cut section was polished, observed with a microscope, and found to include few voids (vacancies). This indicated that the composite had excellent adhesion and impregnation ability between the fibers and the matrix resin.

Example 1-10

Epoxy-Amine Adduct Production

Materials used herein included 3,4-epoxycyclohexylmethyl (3,4-epoxy)cyclohexanecarboxylate (trade name CELLOXIDE 2021P, supplied by Daicel Corporation) as an epoxide (A); and an amino-terminated polypropylene glycol (trade name JEFFAMINE D-230, supplied by Huntsman Corporation) and tetraethylenepentamine (trade name TEPA, supplied by Huntsman Corporation) as amines (B).

In a 200-mL flask (reactor), 93.1 g of the epoxide (A) were placed, and 22.0 g of the amino-terminated polypropylene glycol and 36.0 g of tetraethylenepentamine were added dropwise thereto at 160° C. over 60 minutes. The components were then stirred at 160° C. in a nitrogen atmosphere for 2 hours to react with each other, and yielded an epoxy-amine adduct (amine adduct).

After natural cooling, the contents were discharged from the reactor onto a release paper at such a stage that the contents still had fluidity (at 130° C. to 150° C.). The resulting article was further cooled to be solidified, was pulverized, and yielded 150.0 g of the epoxy-amine adduct.

Example 1-11

Epoxy-Amine Adduct Production

Materials used herein included 3,4-epoxycyclohexylmethyl (3,4-epoxy)cyclohexanecarboxylate (trade name CELLOXIDE 2021P, supplied by Daicel Corporation) as an epoxide (A); and an amino-terminated polypropylene glycol (trade name JEFFAMINE D-2000, supplied by Huntsman Corporation) and triethylenetetramine (trade name TETA, supplied by Huntsman Corporation) as amines (B).

In a 1-L stainless reactor, a mixture of 205.8 g of the amino-terminated polypropylene glycol and 205.8 g of triethylenetetramine was placed, and 375.9 g of the epoxide (A) were added dropwise thereto at 160° C. in a nitrogen atmosphere over 60 minutes. The components were then stirred at 200° C. for 3 hours and further at 220° C. for 2 hours to react with each other, and yielded an epoxy-amine adduct (amine adduct).

After natural cooling, the contents were discharged from the reactor onto a release paper at such a stage that the contents still had fluidity (at 130° C. to 150° C.). The resulting article was further cooled to be solidified, was pulverized, and yielded 780.0 g of the epoxy-amine adduct.

Example 1-12

Aqueous solutions of the epoxy-amine adducts prepared in Examples 1-1, 1-3 to 1-5, 1-7, 1-8, 1-10, and 1-11 were each prepared by the following procedure.

In a 150-mL flask, 40 g of the epoxy-amine adduct and 60 g of pure water were placed, and the components were stirred to dissolve the epoxy-amine adduct, and yielded a 40% epoxy-amine adduct aqueous solution. All the aqueous solutions were homogeneous aqueous solutions.

Comparative Example 1-1

Components, i.e., 30.0 parts by weight of a bisphenol-A epoxy resin (trade name EPOTOHTO YD128, supplied by supplied by Nippon Steel Chemical Co., Ltd.) and 41.3 parts by weight of an amino-terminated polypropylene glycol (trade name JEFFAMINE D-230, supplied by Huntsman Corporation) were mixed, followed by stirring at 160° C. for 2 hours to react the two components with each other. This gave a resin having approximately no thermoplasticity.

Evaluations

The epoxy-amine adducts prepared in Examples 1-1 to 1-11 were subjected to evaluations as follows.

(1) Glass Transition Temperature

The glass transition temperature (Tg) of each of the epoxy-amine adducts prepared in Examples 1-1 to 1-11 was measured using a differential scanning calorimeter (DSC) (supplied by Seiko Instruments Inc.). The measurement was performed in a nitrogen stream in the following manner. A sample was heated from 25° C. up to 200° C. to 230° C. at a rate of temperature rise of 20° C. per minute and then cooled down to −100° C. at a cooling rate of 20° C. per minute (the process up to this was defined as a "first scan"). The sample was successively heated up to 350° C. at a rate of temperature rise of 10° C. per minute and then cooled down to 25° C. at a cooling rate of 20° C. per minute (the process from the completion of the first scan up to this was defined as a "second scan"). The glass transition temperature was determined on the basis of a DSC curve in the temperature rise in the second scan. Results are presented in Table 1.

(2) 5% Weight Loss Temperature ($Td_5$)

The decomposition temperature (5% weight loss temperature ($Td_5$)) of each of the epoxy-amine adducts prepared in Examples 1-1 to 1-11 was measured using a simultaneous thermogravimetric analyzer (TG/DTA) (supplied by Seiko Instruments Inc.). The measurement was performed by heating each sample from 25° C. up to 400° C. at a rate of temperature rise of 10° C. per minute in a nitrogen stream. Results are presented in Table 1.

TABLE 1

| | Example 1-1 | Example 1-2 | Example 1-3 | Example 1-4 | Example 1-5 | Example 1-6 | Example 1-7 | Example 1-8 | Example 1-9 | Example 1-10 | Example 1-11 |
|---|---|---|---|---|---|---|---|---|---|---|---|
| Glass transition temperature (° C.) | 45.5 | 79.9 | 52.1 | 61.4 | 64.8 | 11.7 | 35.0 | 61.6 | 34.9 | 43.1 | 51.5 |
| 5% Weight loss temperature (° C.) | 321.8 | 317.6 | 299.9 | 298.9 | 304.5 | 299.6 | 306.9 | 297.5 | 304.0 | 297.9 | 314.8 |

The epoxy-amine adducts prepared in Examples 1-1 to 1-11, as having thermoplasticity, were easily blendable with another component (such as a thermoplastic resin). The epoxy-amine adducts prepared in Examples 1-1 to 1-11, as containing a —NH— group or groups in the molecule, had high reactivity with reactive groups such as hydroxy groups, carboxy groups, and epoxy groups (in particular, glycidyl group), and contributed to better adhesion between the resin and the additive material (e.g., fillers and reinforcement fibers such as carbon fibers) and better adhesiveness to the adherend. In addition, the epoxy-amine adducts prepared in the examples had heat resistance and water solubility at excellent levels. In particular, the epoxy-amine adducts prepared in Examples 1-1 to 1-5 and 1-7 to 1-11 had somewhat high glass transition temperatures.

In contrast, the resin prepared in Comparative Example 1-1, as having no thermoplasticity, was hardly blendable with another component.

Example 2-1

Epoxy-Amine Adduct Production

Materials used herein included 3,4-epoxycyclohexylmethyl (3,4-epoxy)cyclohexanecarboxylate (trade name CELLOXIDE 2021P, supplied by Daicel Corporation) as an epoxide (A); and triethylenetetramine (trade name TETA, supplied by Huntsman Corporation) and isophoronediamine (trade name VESTAMIN IPD, supplied by Evonik Degussa Japan Co., Ltd.) as amines (B).

In a 1-L stainless reactor, a mixture of 198.0 g of triethylenetetramine and 148.5 g of isophoronediamine was placed, and 532.0 g of the epoxide (A) were added dropwise thereto at 160° C. in a nitrogen atmosphere over 60 minutes. The components were then stirred at 200° C. for 3 hours and further at 220° C. for 2 hours to react with each other, and yielded an epoxy-amine adduct (amine adduct).

After natural cooling, the contents were discharged from the reactor onto a release paper at such a stage that the contents still had fluidity (at 130° C. to 150° C.). The resulting article was further cooled to be solidified, was pulverized, and yielded 870.0 g of the epoxy-amine adduct.

Urethane-Modified Epoxy-Amine Adduct Production

Next, 100 g of the above-prepared epoxy-amine adduct and 100 g of ethanol were placed in a 500-mL flask (reactor), stirred to dissolve the epoxy-amine adduct, and yielded a 50% epoxy-amine adduct ethanol solution.

The above-prepared ethanol solution was then heated up to 60° C., 71.7 g of a urethane diacrylate (trade name EBECRYL 230, supplied by DAICEL-ALLNEX LTD., having a molecular weight of 5000 and a glass transition temperature of −50° C.) were added dropwise, stirred for 4 hours, and yielded 271.7 g of an ethanol solution of a urethane-modified epoxy-amine adduct (an adduct between the epoxy-amine adduct and EBECRYL 230).

Sizing Treatment Liquid Preparation

Next, 39.6 g of the above-prepared urethane-modified epoxy-amine adduct ethanol solution was combined with 985.4 g of ethanol and yielded a sizing treatment liquid (sizing agent). The impregnating ability of the treatment liquid was evaluated by a procedure similar to that in Example 1-1. As a result, the fiber bundle was immediately wetted on surface and went down to the bottom (5 cm deep) of the glass vessel in about 2 seconds. This demonstrated that the treatment liquid has very good immersing ability with respect to the fiber bundle. In this connection, a treatment liquid, when prepared by diluting the urethane-modified epoxy-amine adduct ethanol solution with water, was hardly usable for a homogeneous treatment, because of precipitation of the urethane-modified epoxy-amine adduct.

Sizing-Agent-Loaded Reinforcement Fibers Production

An untreated reinforcement fiber bundle (a carbon fiber bundle, trade name TENAX STS-24K N00, supplied by Toho Tenax Co., Ltd.) was continuously immersed in a bath of the above-prepared treatment liquid to allow the treatment liquid to be permeated among filaments (single yarns) in the fiber bundle. The resulting article was allowed to pass through a drying oven at 150° C. over 120 seconds, was wound using a winder, and yielded a sizing-agent-loaded reinforcement fiber bundle. The reinforcement fiber bundle immediately after going out of the drying oven (dryer) had feel and texture equivalent to those of the reinforcement fiber bundle immediately after being wound with the winder, where the feel and texture were softer and more suitable for processing as compared with the sizing-agent-loaded reinforcement fibers prepared in Example 1-6. Meanwhile, the reinforcement fiber bundle had tackiness on surface, caused slight fluffing on rollers during the process, but the fluffing was at such a trivial level as not adversely affect the process. However, the reinforcement fiber bundle, when subjected to a process performed at an ambient temperature of 50° C. or higher, frequently caused fluffing and resin deposition on the process rollers. The prepared reinforcement fiber bundle had a mass of loading of the treatment liquid in terms of solids content of 1.4 parts by weight per 100 parts by weight of the reinforcement fibers.

A thermoplastic resin (polyamide (nylon 6) resin) for composites was placed on the treated reinforcement fiber bundle and subjected to a heat treatment at 280° C. for 10 minutes. As a result, the thermoplastic resin ball on the reinforcement fiber bundle spread, via wetting, along the longitudinal direction of the reinforcement fiber bundle. This demonstrated that the reinforcement fiber bundle has good wettability. The interfacial adhesion of the reinforcement fiber bundle with a thermoplastic resin was determined by a procedure similar to that in Example 1-1 and was found to be a high interfacial adhesion of 53 MPa.

Composite Production

Except using the above-prepared sizing-agent-loaded reinforcement fibers, a composite (fiber-reinforced thermoplastic resin molded article) was prepared by a procedure similar to that in Example 1-1. The composite had a thickness of 2 mm and a fiber content in volume of 50 volume percent. The prepared composite was cut, the cut section was polished, observed with a microscope, and found to include few voids (vacancies). This demonstrated that the composite has excellent adhesion and satisfactory impregnating ability between the fibers and the matrix resin.

Example 2-2

Epoxy-Amine Adduct Production

Materials used herein included 3,4-epoxycyclohexylmethyl (3,4-epoxy)cyclohexanecarboxylate (trade name CELLOXIDE 2021P, supplied by Daicel Corporation) as an epoxide (A); and triethylenetetramine (trade name TETA, supplied by Huntsman Corporation) as an amine (B).

In a 1-L stainless reactor, 300.0 g of the amine (B) were placed, and 506.1 g of the epoxide (A) were added dropwise thereto at 160° C. in a nitrogen atmosphere over 60 minutes. The components were then stirred at 200° C. for 3 hours and further at 220° C. for 2 hours to react with each other, and yielded an epoxy-amine adduct (amine adduct).

After natural cooling, the contents were discharged from the reactor onto a release paper at such a stage that the contents still had fluidity (at 130° C. to 150° C.). The resulting article was further cooled to be solidified, was pulverized, and yielded 800 g of the epoxy-amine adduct.

Urethane-Modified Epoxy-Amine Adduct Production

Next, 100 g of the above-prepared epoxy-amine adduct and 100 g of ethanol were placed in a 500-mL flask (reactor), stirred to dissolve the epoxy-amine adduct, and yielded a 50% epoxy-amine adduct ethanol solution.

The above-prepared ethanol solution was then heated up to 60° C., and 32.7 g of a urethane diacrylate (trade name EBECRYL 230, supplied by DAICEL-ALLNEX LTD., having a molecular weight of 5000 and a glass transition temperature of −50° C.) were added thereto, stirred for 4 hours, and yielded 232.7 g of an ethanol solution of a urethane-modified epoxy-amine adduct (adduct between the epoxy-amine adduct and EBECRYL 230).

Sizing Treatment Liquid Preparation

Next, 43.9 g of the above-prepared urethane-modified epoxy-amine adduct ethanol solution were combined with 981.1 g of ethanol and yielded a sizing treatment liquid (sizing agent). The impregnating ability of the treatment liquid was evaluated by a procedure similar to that in Example 1-1. As a result, the fiber bundle was immediately wetted on surface and went down to the bottom (5 cm deep) of the glass vessel in about 2 seconds. This demonstrated that the treatment liquid has very good immersing ability with respect to the fiber bundle. In this connection, a treatment liquid, when prepared by diluting the urethane-modified epoxy-amine adduct ethanol solution with water, was hardly usable for a homogeneous treatment, because of precipitation of the urethane-modified epoxy-amine adduct.

Sizing-Agent-Loaded Reinforcement Fibers Production

An untreated reinforcement fiber bundle (a carbon fiber bundle, trade name TENAX STS-24K N00, supplied by Toho Tenax Co., Ltd.) was continuously immersed in a bath of the above-prepared treatment liquid to allow the treatment liquid to be permeated among filaments (single yarns) in the fiber bundle. The resulting article was allowed to pass through a drying oven at 150° C. over 120 seconds, was wound using a winder, and yielded a sizing-agent-loaded reinforcement fiber bundle. The reinforcement fiber bundle immediately after going out of the drying oven (dryer) had feel and texture equivalent to those of the reinforcement fiber bundle immediately after being wound with the winder, where the feel and texture were softer and more suitable for processing as compared with the sizing-agent-loaded reinforcement fibers prepared in Example 1-6. Meanwhile, the reinforcement fiber bundle had tackiness on surface, caused slight fluffing on rollers during the process, but the fluffing was at such a trivial level as not adversely affect the process. However, the reinforcement fiber bundle, when subjected to a process performed at an ambient temperature of 50° C. or higher, frequently caused fluffing and resin deposition on the process rollers. The prepared reinforcement fiber bundle had a mass of loading of the treatment liquid in terms of solids content of 1.5 parts by weight per 100 parts by weight of the reinforcement fibers.

A thermoplastic resin (polyamide (nylon 6) resin) for composites was placed on the treated reinforcement fiber bundle and subjected to a heat treatment at 280° C. for 10 minutes. As a result, the thermoplastic resin ball on the reinforcement fiber bundle spread, via wetting, along the longitudinal direction of the reinforcement fiber bundle. This demonstrated that the reinforcement fiber bundle has good wettability. The interfacial adhesion of the reinforcement fiber bundle with a thermoplastic resin was determined by a procedure similar to that in Example 1-1 and was found to be a high interfacial adhesion of 54 MPa.

Composite Production

Except using the above-prepared sizing-agent-loaded reinforcement fibers, a composite (fiber-reinforced thermoplastic resin molded article) was prepared by a procedure similar to that in Example 1-1. The composite had a thickness of 2 mm and a fiber content in volume of 50 volume percent. The prepared composite was cut, the cut section was polished, observed with a microscope, and found to include few voids (vacancies). This demonstrated that the composite has excellent adhesion and satisfactory impregnating ability between the fibers and the matrix resin.

Example 2-3

Epoxy-Amine Adduct Production

Materials used herein included 3,4-epoxycyclohexylmethyl (3,4-epoxy)cyclohexanecarboxylate (trade name CELLOXIDE 2021P, supplied by Daicel Corporation) as an epoxide (A); and triethylenetetramine (trade name TETA, supplied by Huntsman Corporation) and isophoronediamine (trade name VESTAMIN IPD, supplied by Evonik Degussa Japan Co., Ltd.) as amines (B).

In a 1-L stainless reactor, a mixture of 213.6 g of triethylenetetramine and 160.2 g of isophoronediamine was placed, and 542.7 g of the epoxide (A) were added dropwise thereto at 160° C. in a nitrogen atmosphere over 60 minutes. The components were then stirred at 200° C. for 3 hours and further at 220° C. for 2 hours to react with each other, and yielded an epoxy-amine adduct (amine adduct).

After natural cooling, the contents were discharged from the reactor onto a release paper at such a stage that the contents still had fluidity (at 130° C. to 150° C.). The resulting article was further cooled to be solidified, was pulverized, and yielded 910 g of the epoxy-amine adduct.

Urethane-Modified Epoxy-Amine Adduct Production

Next, 50 g of the above-prepared epoxy-amine adduct and 50 g of ethanol were placed in a 150-mL flask (reactor), stirred to dissolve the epoxy-amine adduct, and yielded a 50% epoxy-amine adduct ethanol solution.

The above-prepared ethanol solution was then combined with 21.2 g of a urethane diacrylate (trade name EBECRYL 270, supplied by DAICEL-ALLNEX LTD., having a molecular weight of 1500 and a glass transition temperature of −27° C.) added dropwise at room temperature, stirred for 4 hours, and yielded 121.2 g of an ethanol solution of a urethane-modified epoxy-amine adduct (adduct between the epoxy-amine adduct and EBECRYL 270).

Example 2-4

Epoxy-Amine Adduct Production

Materials used herein included 3,4-epoxycyclohexylmethyl (3,4-epoxy)cyclohexanecarboxylate (trade name CELLOXIDE 2021P, supplied by Daicel Corporation) as an epoxide (A); and triethylenetetramine (trade name TETA, supplied by Huntsman Corporation) as an amine (B).

In a 1-L stainless reactor, 360.0 g of the amine (B) were placed, and 556.2 g of the epoxide (A) were added dropwise thereto at 160° C. in a nitrogen atmosphere over 60 minutes. The components were then stirred at 200° C. for 3 hours and further at 220° C. for 2 hours to react with each other, and yielded an epoxy-amine adduct (amine adduct).

After natural cooling, the contents were discharged from the reactor onto a release paper at such a stage that the contents still had fluidity (at 130° C. to 150° C.). The resulting article was further cooled to be solidified, was pulverized, and yielded 910 g of the epoxy-amine adduct.

Urethane-Modified Epoxy-Amine Adduct Production

Next, 50 g of the above-prepared epoxy-amine adduct and 50 g of ethanol were placed in a 150-mL flask (reactor), stirred to dissolve the epoxy-amine adduct, and yielded a 50% epoxy-amine adduct ethanol solution.

To the ethanol solution, 21.8 g of a urethane diacrylate (trade name EBECRYL 270, supplied by DAICEL-ALLNEX LTD., having a molecular weight of 1500 and a glass transition temperature of −27° C.) were added dropwise at room temperature, stirred for 4 hours, and yielded 121.8 g of an ethanol solution of a urethane-modified epoxy-amine adduct (adduct between the epoxy-amine adduct and EBECRYL 270).

Evaluations

The urethane-modified epoxy-amine adducts prepared in Examples 2-1 to 2-4 were subjected to evaluations as follows. Measurement samples for the glass transition temperature and the 5% weight loss temperature were prepared by removing ethanol from the ethanol solutions prepared in the examples.

(1) Glass Transition Temperature

The glass transition temperature (Tg) of each of the urethane-modified epoxy-amine adducts prepared in Examples 2-1 to 2-4 was measured by a procedure similar to that in the epoxy-amine adducts prepared in Examples 1-1 to 1-11. Results are presented in Table 2.

The urethane-modified epoxy-amine adducts prepared in Examples 2-1 and 2-2 each had two glass transition temperatures.

(2) 5% Weight Loss Temperature ($Td_5$)

The decomposition temperature (5% weight loss temperature ($Td_5$)) of each of the urethane-modified epoxy-amine adducts prepared in Examples 2-1 to 2-4 was measured by a procedure similar to that in the epoxy-amine adducts prepared in Examples 1-1 to 1-11. Results are presented in Table 2.

(3) Toughness (Flexibility)

Each of the 50% ethanol solutions of the urethane-modified epoxy-amine adducts prepared in Examples 2-1 to 2-4 was applied onto a polyethylene (PE) film using a bar coater, from which ethanol was volatilized. The resulting article was further heated and dried at 40° C. and yielded a laminate including the PE film and, disposed on the film, a layer (about 2 μm thick) of the urethane-modified epoxy-amine adduct.

Next, the laminate was bent at a radius of curvature of about 10 mm so that the layer faced outside, how the layer was upon bending was observed, and the toughness was evaluated according to criteria below. Results are presented in Table 2.

Good (good toughness): the layer did not crack upon bending; and

Poor (poor toughness): the layer cracked upon bending.

TABLE 2

|  | Example 2-1 | Example 2-2 | Example 2-3 | Example 2-4 |
|---|---|---|---|---|
| Glass transition temperature (° C.) | −45.0/52.8 | −48.2/40.2 | 60.4 | 32.5 |
| 5% Weight loss temperature (° C.) | 298.8 | 291.2 | 274.4 | 267.6 |
| Toughness | Good | Good | Good | Good |

The urethane-modified epoxy-amine adducts prepared in Examples 2-1 to 2-4 (urethane-modified epoxy-amine adducts according to the present invention) offered excellent toughness, had solubility in solvents and thermoplasticity, and were easily blendable with another component (e.g., a thermoplastic resin). The urethane-modified epoxy-amine adducts, as having a —NH— group or groups in the molecule, were highly reactive with reactive groups such as hydroxy groups, carboxy groups, and epoxy groups (in particular, glycidyl group), and contributed to better adhesion between a resin and an additive material (e.g., fillers and reinforcement fibers such as carbon fibers) and better adhesiveness to an adherend. The urethane-modified epoxy-amine adducts had high decomposition temperatures and offered excellent heat resistance. In addition, the urethane-modified epoxy-amine adducts had a somewhat high glass transition temperature (higher one) and thereby also had excellent handleability.

In contrast, the resin prepared in Comparative Example 1-1 had approximately no thermoplasticity and was hardly blendable with another component, as described above.

Example 3-1

Epoxy-Amine Adduct Production

By a procedure similar to that in Example 2-1, 870.0 g of an epoxy-amine adduct were produced.

Lactone-Modified Epoxy-Amine Adduct Production

Next, 220 g of the above-prepared epoxy-amine adduct were placed in a reactor, combined with 118.1 g of ε-caprolactone, and heated up to 150° C. to be dissolved. After the dissolution, the components were heated up to 180° C. and stirred for 5 hours to form a lactone-modified epoxy-amine adduct (adduct between the epoxy-amine adduct and ε-caprolactone).

After natural cooling, the contents were discharged from the reactor onto a release paper at such a stage that the contents still had fluidity (at 130° C. to 150° C.). The resulting article was further cooled to be solidified, was pulverized, and yielded 319.5 g of the lactone-modified epoxy-amine adduct.

Example 3-2

Epoxy-Amine Adduct Production

By a procedure similar to that in Example 2-2, 800 g of an epoxy-amine adduct were produced.

Lactone-Modified Epoxy-Amine Adduct Production

Next, 300 g of the above-prepared epoxy-amine adduct were placed in a reactor, combined with 100.6 g of ε-caprolactone, and heated up to 150° C. to be dissolved. After the dissolution, the components were heated up to 180° C. and stirred for 5 hours to form a lactone-modified epoxy-amine adduct (adduct between the epoxy-amine adduct and ε-caprolactone).

After natural cooling, the contents were discharged from the reactor onto a release paper at such a stage that the contents still had fluidity (at 130° C. to 150° C.). The resulting article was further cooled to be solidified, was pulverized, and yielded 400.6 g of the lactone-modified epoxy-amine adduct.

Lactone-Modified Epoxy-Amine Adduct Aqueous Solution Preparation

In a 150-mL flask, 40 g of the above-prepared lactone-modified epoxy-amine adduct and 60 g of pure water were placed, stirred to dissolve the lactone-modified epoxy-amine adduct, and yielded a 40% lactone-modified epoxy-amine adduct aqueous solution. The prepared aqueous solution was a homogeneous aqueous solution.

Sizing Treatment Liquid Preparation

Next, 62.5 g of the above-prepared 40% lactone-modified epoxy-amine adduct aqueous solution were diluted with 962.5 g of pure water and yielded a sizing treatment liquid (sizing agent). The treatment liquid was a pale yellow, transparent aqueous solution. The impregnating ability of the treatment liquid was evaluated by a procedure similar to that in Example 1-1. As a result, the fiber bundle was immediately wetted on surface and went down to the bottom (5 cm deep) of the glass vessel in about 7 seconds. This demonstrated that the treatment liquid has good immersing ability with respect to the fiber bundle.

Sizing-Agent-Loaded Reinforcement Fibers Production

An untreated reinforcement fiber bundle (a carbon fiber bundle, trade name TENAX STS-24K N00, supplied by Toho Tenax Co., Ltd.) was continuously immersed in a bath of the above-prepared treatment liquid to allow the treatment liquid to be permeated among filaments (single yarns) in the fiber bundle. The resulting article was allowed to pass through a drying oven at 150° C. over 120 seconds, was wound using a winder, and yielded a sizing-agent-loaded reinforcement fiber bundle. The reinforcement fiber bundle immediately after going out of the drying oven (dryer) had feel and texture equivalent to those of the reinforcement fiber bundle immediately after being wound with the winder, where the feel and texture were softer and more suitable for processing as compared with the sizing-agent-loaded reinforcement fibers prepared in Example 1-6. Meanwhile, the reinforcement fiber bundle had slight tackiness on surface, and deposits such as fluffs were observed on rollers during the process, while the deposition was at such a level as not adversely affect the process. The prepared reinforcement fiber bundle had a mass of loading of the treatment liquid in terms of solids content of 1.5 parts by weight per 100 parts by weight of the reinforcement fibers.

A thermoplastic resin (polyamide (nylon 6) resin) for composites was placed on the treated reinforcement fiber bundle and subjected to a heat treatment at 280° C. for 10 minutes. As a result, the thermoplastic resin ball on the reinforcement fiber bundle spread, via wetting, along the longitudinal direction of the reinforcement fiber bundle. This demonstrated that the reinforcement fiber bundle has good wettability. The interfacial adhesion of the reinforcement fiber bundle with a thermoplastic resin was determined by a procedure similar to that in Example 1-1 and was found to be a high interfacial adhesion of 51 MPa.

Composite Production

Except using the above-prepared sizing-agent-loaded reinforcement fibers, a composite (fiber-reinforced thermoplastic resin molded article) was prepared by a procedure similar to that in Example 1-1. The composite had a thickness of 2 mm and a fiber content in volume of 50 volume percent. The prepared composite was cut, the cut section was polished, observed with a microscope, and found to include few voids (vacancies). This demonstrated that the composite has excellent adhesion and satisfactory impregnating ability between the fibers and the matrix resin.

Evaluations

The lactone-modified epoxy-amine adducts prepared in Examples 3-1 and 3-2 were subjected to evaluations as follows.

(1) Glass Transition Temperature

The glass transition temperature (Tg) of each of the lactone-modified epoxy-amine adducts prepared in Examples 3-1 and 3-1 was measured by a procedure similar to that in the epoxy-amine adducts prepared in Examples 1-1 to 1-11. Results are presented in Table 3.

(2) 5% Weight Loss Temperature ($Td_5$)

The decomposition temperature (5% weight loss temperature ($Td_5$)) of each of the lactone-modified epoxy-amine adducts prepared in Examples 3-1 and 3-1 was measured by a procedure similar to that in the epoxy-amine adducts prepared in Examples 1-1 to 1-11. Results are presented in Table 3.

(3) Toughness (Flexibility)

Each of the lactone-modified epoxy-amine adducts prepared in Examples 3-1 and 3-1 was dissolved in ethanol to give a 40% solution, the solution was applied onto a polyethylene (PE) film using a bar coater, from which the solvent was volatilized. The resulting article was further heated to 40° C. and dried, and yielded a laminate including the PE film and, disposed thereon, a layer of the lactone-modified epoxy-amine adduct, where the layer had a thickness of about 2 μm.

Next, the laminate was bent at a radius of curvature of about 10 mm so that the layer faced outward, how the layer was upon bending was observed, and the toughness was evaluated according to criteria below. Results are presented in Table 3.

Good (good toughness): the layer did not crack or break upon bending; and

Poor (poor toughness): the layer cracked or broken upon bending.

TABLE 3

|  | Example 3-1 | Example 3-2 |
| --- | --- | --- |
| Glass transition temperature (° C.) | 32.0 | 32.9 |
| 5% Weight loss temperature (° C.) | 291.4 | 300.4 |
| Toughness | Good | Good |

The lactone-modified epoxy-amine adducts prepared in Examples 3-1 and 3-1 (lactone-modified epoxy-amine adducts according to the present invention) offered excellent toughness, had solvent solubility and thermoplasticity, and were easily blendable with another component (e.g., a thermoplastic resin). The lactone-modified epoxy-amine adducts, as having a —NH— group or groups in the molecule, were highly reactive with reactive groups such as hydroxy groups, carboxy groups, and epoxy groups (in particular, glycidyl group), and contributed to better adhesion between a resin and an additive material (e.g., fillers and reinforcement fibers such as carbon fibers) and better adhesiveness to an adherend. Further, the lactone-modified epoxy-amine adducts had high decomposition temperatures and offered excellent heat resistance. In addition, the lactone-modified epoxy-amine adducts had somewhat high glass transition temperatures equal to or higher than room temperature and offered excellent handleability.

In contrast, the resin prepared in Comparative Example 1-1 had approximately no thermoplasticity and was hardly blendable with another component, as described above.

Example 4-1

Epoxy-Amine Adduct Salt Production

Initially, 1000 g of an epoxy-amine adduct were produced by a procedure similar to that in Example 1-2.

Next, 100 g of a 40% aqueous solution of the above-prepared epoxy-amine adduct were placed in a 300-mL flask (reactor). Into the aqueous solution with stirring, 11 g of carbon dioxide gas were blown over 5 hours, and yielded a carbonate of the epoxy-amine adduct (as a 40% aqueous solution).

The reaction endpoint (completion point of the carbon dioxide gas blowing) was set as such a time point that the pH of the aqueous solution reached equilibration at 8 or less and that, the aqueous solution, when diluted to 2%, did not suffer from precipitation.

Sizing Treatment Liquid Preparation

Next, 50 g of the above-prepared 40% epoxy-amine adduct carbonate aqueous solution were combined with (diluted with) 970 g of pure water and yielded a sizing treatment liquid (sizing agent). The treatment liquid was a pale yellow, transparent aqueous solution without precipitation of the epoxy-amine adduct. The impregnating ability of the treatment liquid was evaluated by a procedure similar to that in Example 1-1. As a result, the fiber bundle was immediately wetted on surface and went down to the bottom (5 cm deep) of the glass vessel in about 5 seconds. This demonstrated that the treatment liquid has very good immersing ability with respect to the fiber bundle.

Sizing-Agent-Loaded Reinforcement Fibers Production

An untreated reinforcement fiber bundle (a carbon fiber bundle, trade name TENAX STS-24K N00, supplied by Toho Tenax Co., Ltd.) was continuously immersed in a bath of the above-prepared treatment liquid to allow the treatment liquid to be permeated among filaments (single yarns) in the fiber bundle. The resulting article was allowed to pass through a drying oven at 150° C. over 120 seconds, was wound using a winder, and yielded a sizing-agent-loaded reinforcement fiber bundle. The reinforcement fiber bundle immediately after going out of the drying oven had somewhat hard feel and texture, but, as passing through between rollers in the step of winding with the wider, became to have soft feel and texture suitable for processing. The resulting reinforcement fiber bundle offered low surface tack, and approximately no resin deposition on rollers was observed during the process. The prepared reinforcement fiber bundle had a mass of loading of the treatment liquid in terms of solids content of 1.2 parts by weight per 100 parts by weight of the reinforcement fibers.

A thermoplastic resin (polyamide (nylon 6) resin) for composites was placed on the treated reinforcement fiber bundle and subjected to a heat treatment at 280° C. for 10 minutes. As a result, the thermoplastic resin ball on the reinforcement fiber bundle spread, via wetting, along the longitudinal direction of the reinforcement fiber bundle. This demonstrated that the reinforcement fiber bundle has good wettability. The interfacial adhesion of the reinforcement fiber bundle with a thermoplastic resin was determined by a procedure similar to that in Example 1-1 and was found to be a very high interfacial adhesion of 58 MPa.

Composite Production

Except using the above-prepared sizing-agent-loaded reinforcement fibers, a composite (fiber-reinforced thermoplastic resin molded article) was prepared by a procedure similar to that in Example 1-1. The composite had a thickness of 2 mm and a fiber content in volume of 50 volume percent. The prepared composite was cut, the cut section was polished, observed with a microscope, and found to include few voids (vacancies). This demonstrated that the composite has excellent adhesion and satisfactory impregnating ability between the fibers and the matrix resin.

Example 4-2

Epoxy-Amine Adduct Salt Production

An epoxy-amine adduct was produced by the same procedure as in Example 4-1.

Next, 100 g of a 40% aqueous solution of the above-prepared epoxy-amine adduct were placed in a 300-mL flask (reactor), 4 g of acetic acid were added to the aqueous solution, stirred for 30 minutes to be reacted, and yielded an epoxy-amine adduct acetate (as a 40% aqueous solution).

Sizing Treatment Liquid Preparation

Next, except using the above-prepared epoxy-amine adduct acetate, a sizing treatment liquid (sizing agent) was prepared by the same procedure as in Example 4-1. The treatment liquid was a pale yellow, transparent aqueous solution. The impregnating ability of the treatment liquid was evaluated by a procedure similar to that in Example 1-1. As a result, the fiber bundle was immediately wetted on surface and went down to the bottom (5 cm deep) of the glass vessel in about 5 seconds. This demonstrated that the treatment liquid has very good immersing ability with respect to the fiber bundle.

Sizing-Agent-Loaded Reinforcement Fibers Production

Except using the above-prepared sizing treatment liquid, a sizing-agent-loaded reinforcement fiber bundle was prepared by the same procedure as in Example 4-1. The reinforcement fiber bundle immediately after going out of the drying oven had somewhat hard feel and texture, but, as passing through between rollers in the step of winding with the wider, became to have soft feel and texture suitable for processing. The resulting reinforcement fiber bundle offered low surface tack, and approximately no resin deposition on rollers was observed during the process. The prepared reinforcement fiber bundle had a mass of loading of the treatment liquid in terms of solids content of 1.2 parts by weight per 100 parts by weight of the reinforcement fibers.

A thermoplastic resin (polyamide (nylon 6) resin) for composites was placed on the treated reinforcement fiber bundle and subjected to a heat treatment at 280° C. for 10 minutes. As a result, the thermoplastic resin ball on the reinforcement fiber bundle spread, via wetting, along the longitudinal direction of the reinforcement fiber bundle. This demonstrated that the reinforcement fiber bundle has good wettability. The interfacial adhesion of the reinforcement fiber bundle with a thermoplastic resin was determined by a procedure similar to that in Example 1-1 and was found to be a very high interfacial adhesion of 57 MPa.

Composite Production

Except using the above-prepared sizing-agent-loaded reinforcement fibers, a composite (fiber-reinforced thermoplastic resin molded article) was prepared by the same procedure as in Example 1-1. The composite had a thickness of 2 mm and a fiber content in volume of 50 volume percent. The prepared composite was cut, the cut section was polished, observed with a microscope, and found to include few voids (vacancies). This demonstrated that the composite has excellent adhesion and satisfactory impregnating ability between the fibers and the matrix resin.

Evaluations

The epoxy-amine adduct salts prepared in Examples 4-1 and 4-2 were subjected to evaluations as follows.

(1) Water Solubility Evaluation

Initially, a 40% aqueous solution of the epoxy-amine adduct synthesized in Example 4-1 was prepared. The aqueous solution was transparent, in which the epoxy-amine adduct was dissolved. The aqueous solution was then diluted with water to a concentration of 2%. As a result, the solution became cloudy because of precipitation of the epoxy-amine adduct.

In contrast, the 40% aqueous solutions of the epoxy-amine adduct salts prepared in Examples 4-1 and 4-2 were each diluted with water to a concentration of 2%. As a result, the 2% aqueous solutions of the epoxy-amine adduct salts prepared in Examples 1 and 2 remained transparent. This demonstrated that conversion into salts allows the epoxy-amine adducts to have significantly better water solubility.

The resin obtained in Comparative Example 4-1 was not dissolved in water at all.

Example 5-1

In 60 parts by weight of ion-exchanged water, 40 parts by weight of the epoxy-amine adduct prepared in Example 1-2 were dissolved to give a solution. Next, 3 parts by weight of trade name NEWCOL 170 (a nonionic surfactant, supplied by NIPPON NYUKAZAI CO., LTD., having an active ingredient content of 100 weight percent) and 40 parts by weight of trade name NEWCOL 707SF (an anionic surfactant, supplied by NIPPON NYUKAZAI CO., LTD., having an active ingredient content of 30 weight percent) were added to and dissolved in the solution. Next, 400 parts by weight of ion-exchanged water were added dropwise to the solution with stirring and mixing over about 10 minutes. After the completion of dropwise addition, the components were forcedly emulsified using a homomixer at 10000 rpm for one minute and yielded an epoxy-amine adduct water-dispersed resin composition having a solids content in weight of 12%, a viscosity of 5 mPa·s, and a pH of 9.8.

The prepared epoxy-amine adduct water-dispersed resin composition was combined with 20 parts by weight of a urethane resin emulsion (trade name UCOAT UX-200, supplied by Sanyo Chemical Industries, Ltd., having a non-volatile content of 30 weight percent), stirred, and yielded a target water-dispersed resin composition (water dispersion of the epoxy-amine adduct and the urethane resin).

Example 5-2

In 60 parts by weight of ion-exchanged water, 40 parts by weight of the epoxy-amine adduct prepared in Example 1-2 were dissolved to give a solution. Next, 3 parts by weight of trade name NEWCOL 170 (a nonionic surfactant, supplied by NIPPON NYUKAZAI CO., LTD., having an active ingredient content of 100 weight percent) and 40 parts by weight of trade name NEWCOL 707SF (an anionic surfactant, supplied by NIPPON NYUKAZAI CO., LTD., having an active ingredient content of 30 weight percent) were added to and dissolved in the solution. Subsequently, 400 parts by weight of ion-exchanged water were added dropwise to the solution with stirring and mixing over about 10 minutes. After the completion of dropwise addition, the components were forcedly emulsified using a homomixer at 10000 rpm for one minute and yielded an epoxy-amine adduct water-dispersed resin composition having a solid content in weight of 12%, a viscosity of 5 mPa·s, and a pH of 9.8.

The prepared epoxy-amine adduct water-dispersed resin composition was combined with 20 parts by weight of a urethane resin emulsion (trade name PERMARIN UA-368, supplied by Sanyo Chemical Industries, Ltd., having a non-volatile content of 50 weight percent), stirred, and yielded a target water-dispersed resin composition (water dispersion of the epoxy-amine adduct and the urethane resin).

Comparative Example 5-1

A procedure similar to that in Example 5-1 was performed, except using a cycloaliphatic epoxy resin (trade name CELLOXIDE 2021P, supplied by Daicel Corporation), instead of the epoxy-amine adduct. As a result, no water-dispersed resin composition was obtained because the cycloaliphatic epoxy resin failed to be stably dispersed in water.

Evaluations

Each of the water-dispersed resin compositions prepared in Examples 5-1 and 5-2 was diluted with water to a non-volatile content of about 2 weight percent and yielded a sizing agent. Carbon fibers, which had been subjected to a removal treatment with acetone, were immersed in the sizing agent and heat-treated at a temperature of 200° C. for 90 seconds. Subsequently, the fibers were immersed in a bisphenol-A epoxy resin (trade name EPOTOHTO YD128, supplied by Nippon Steel Chemical Co., Ltd.), retrieved, subjected to a treatment at 100° C. for 30 minutes, and yielded a carbon fiber bundle (prepreg) which had approximately no tack.

INDUSTRIAL APPLICABILITY

The epoxy-amine adducts according to the present invention are usable typically as or for various additives; adhesives; paints; encapsulants (sealants); sizing agents; and any other uses. Non-limiting examples of the additives include adhesion promoters (adhesion improvers) for improving adhesion between resins and additive materials in polymer composites; adhesiveness promoters (adhesiveness improvers) for improving adhesiveness to adherends; compatibility improvers (compatibilizers) for improving solubility between two or more different components (in particular, two or more different polymers) with each other; dispersibility improvers for improving dispersibility of additive materials in polymer composites; flow improvers; flow suppressants; plasticizers; and crosslinking agents typically for epoxy resins.

The invention claimed is:

1. An epoxy-amine adduct being a compound selected from the group consisting of:
   a compound I containing two or more amino groups per molecule; and
   a salt of the compounds I,
   the compound I being an adduct between an epoxide (A) containing two or more cycloaliphatic epoxy groups per molecule and an amine (B) containing two or more amino groups per molecule,
   the compound I comprising:
   a constitutional unit represented by Formula (I);
   a constitutional unit represented by Formula (II); and
   at least one constitutional unit selected from the group consisting of:
   constitutional units represented by Formula (III); and
   constitutional units represented by Formula (IV),
   the compounds I containing amino groups at both ends, Formulae (I), (II), (III), and (IV) expressed as follows:

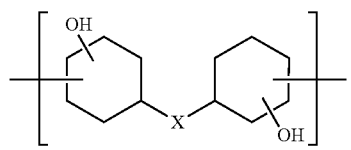
(I)

wherein X is selected from the group consisting of a single bond and a divalent group containing one or more atoms,

(II)

wherein $R^2$ and $R^3$ are, identically or differently in each occurrence, selected from the group consisting of a linear, branched, or cyclic divalent aliphatic hydrocarbon group, and a divalent group including a linear or branched aliphatic hydrocarbon group or groups and an alicyclic hydrocarbon group or groups linked to each other directly or through a heteroatom-containing linkage group; and q represents an integer of 1 or more,

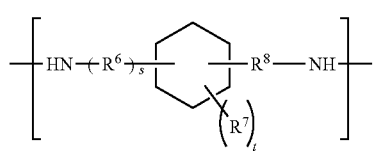
(III)

wherein $R^6$ and $R^8$ are, identically or differently in each occurrence, selected from the group consisting of $C_1$-$C_4$ alkylene and $C_6$-$C_{12}$ arylene; s represents 0 or 1; $R^7$ is, independently in each occurrence, selected from the group consisting of a monovalent organic group, an oxygen-containing group, a sulfur-containing group, a nitrogen-containing group, and halogen; and t represents an integer of 0 to 10,

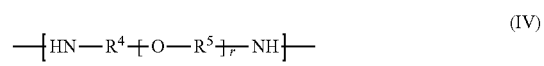
(IV)

wherein $R^4$ and $R^5$ are, identically or differently in each occurrence, selected from the group consisting of a linear, branched, or cyclic divalent aliphatic hydrocarbon group, and a divalent group including a linear or branched aliphatic hydrocarbon group or groups and an alicyclic hydrocarbon group or groups linked to each other; and r represents an integer of 1 or more.

2. The epoxy-amine adduct according to claim 1, which is the salt of the compound I containing two or more amino groups per molecule, and which is a salt between the compound I and an acid II-3.

3. The epoxy-amine adduct according to claim 2, which is selected from the group consisting of a carbonate and an organic acid salt.

4. A thermoplastic resin composition comprising:
   the epoxy-amine adduct according to claim 1; and
   a thermoplastic resin.

5. The thermoplastic resin composition according to claim 4, as a resin composition for fiber-reinforced composites.

6. A fiber-reinforced composite comprising:
   the thermoplastic resin composition according to claim 4; and
   a carbon fiber.

7. A water-based paint comprising
   the epoxy-amine adduct according to claim 1.

8. An aqueous solution comprising
   the epoxy-amine adduct according to claim 1.

9. A water-dispersed resin composition comprising:
   the epoxy-amine adduct according to claim 1; and
   a urethane resin.

10. The water-dispersed resin composition according to claim 9, further comprising a surfactant.

11. A carbon-fiber sizing agent comprising
    the water-dispersed resin composition according to claim 9.

12. The water-dispersed resin composition according to claim 10,
    wherein the surfactant comprises at least one surfactant selected from the group consisting of:
    anionic surfactants; and
    nonionic surfactants.

13. A method for producing a water-dispersed resin composition, the method comprising
    mixing a urethane resin emulsion with a water dispersion containing the epoxy-amine adduct according to claim 1.

14. The method according to claim 13 for producing a water-dispersed resin composition,
    wherein the water dispersion containing the epoxy-amine adduct further comprises a surfactant.

15. The method according to claim 14 for producing a water-dispersed resin composition, wherein the surfactant comprises at least one surfactant selected from the group consisting of:
anionic surfactants; and
nonionic surfactants.

16. A carbon-fiber sizing agent comprising
the epoxy-amine adduct according to claim 1.

17. A water-based paint comprising
the carbon-fiber sizing agent according to claim 16.

18. An aqueous solution comprising
the carbon-fiber sizing agent according to claim 16.

19. A water-dispersed resin composition comprising:
the carbon-fiber sizing agent according to claim 16; and
a urethane resin.

20. The water-dispersed resin composition according to claim 19, further comprising
a surfactant.

21. The water-dispersed resin composition according to claim 20,
wherein the surfactant comprises at least one surfactant selected from the group consisting of:
anionic surfactants; and
nonionic surfactants.

22. The carbon-fiber sizing agent according to claim 16, wherein the epoxy-amine adduct is soluble in water.

23. A sizing-agent-coated carbon fiber comprising:
a carbon fiber; and
the carbon-fiber sizing agent according to claim 16 disposed on or over the carbon fiber.

24. A fiber-reinforced composite comprising
the sizing-agent-coated carbon fiber according to claim 23.

25. A prepreg comprising
the sizing-agent-coated carbon fiber according to claim 23.

26. A fiber-reinforced composite comprising:
the sizing-agent-coated carbon fiber according to claim 23; and
a thermoplastic resin.

27. A carbon fiber bundle comprising:
a bundle of carbon fibers; and
the carbon-fiber sizing agent according to claim 16 disposed on or over the carbon fibers.

28. A carbon-fiber treatment agent comprising
the epoxy-amine adduct according to claim 1.

29. A prepreg comprising:
the epoxy-amine adduct according to claim 1;
a thermoplastic resin; and
a carbon fiber.

30. A fiber-reinforced composite derived from the prepreg according to claim 29.

* * * * *